US012578434B2

(12) United States Patent
Hanzawa et al.

(10) Patent No.: US 12,578,434 B2
(45) Date of Patent: Mar. 17, 2026

(54) LIGHT SOURCE DEVICE AND ELECTRONIC APPARATUS

(71) Applicant: SONY SEMICONDUCTOR SOLUTIONS CORPORATION, Kanagawa (JP)

(72) Inventors: Fumihiko Hanzawa, Tokyo (JP); Masashi Nakamura, Tokyo (JP); Hideaki Mogi, Kanagawa (JP); Go Asayama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 912 days.

(21) Appl. No.: 17/791,651

(22) PCT Filed: Dec. 24, 2020

(86) PCT No.: PCT/JP2020/048575
§ 371 (c)(1),
(2) Date: Jul. 8, 2022

(87) PCT Pub. No.: WO2021/145190
PCT Pub. Date: Jul. 22, 2021

(65) Prior Publication Data
US 2023/0054053 A1 Feb. 23, 2023

(30) Foreign Application Priority Data
Jan. 16, 2020 (JP) ................................. 2020-005387

(51) Int. Cl.
*G01S 7/481* (2006.01)
*H04N 9/31* (2006.01)
(52) U.S. Cl.
CPC ............ *G01S 7/4815* (2013.01); *G01S 7/481* (2013.01); *H04N 9/3194* (2013.01)

(58) Field of Classification Search
CPC .... G01S 7/4815; G01S 7/4814; G01S 7/4817; G01S 7/4813; G01S 7/481; G01S 7/4811;
(Continued)

(56) References Cited

U.S. PATENT DOCUMENTS

2002/0036903 A1 3/2002 Okuyama
2004/0036990 A1 2/2004 Hanano
(Continued)

FOREIGN PATENT DOCUMENTS

JP 3048353 6/2000
JP 2002-328331 11/2002
(Continued)

OTHER PUBLICATIONS

International Search Report and Written Opinion prepared by the Japan Patent Office on Feb. 17, 2021, for International Application No. PCT/JP2020/0448575, 3 pgs.

*Primary Examiner* — Sanjiv D. Patel
(74) *Attorney, Agent, or Firm* — SHERIDAN ROSS P.C.

(57) ABSTRACT

An image can be projected in a wide angular range while an increase in a beam diameter is suppressed. A light source device according to the present disclosure includes: a plurality of light emitting elements divided into a plurality of regions; and an optical unit that includes a plurality of first lens groups having a first focal length and corresponding to the regions of the light source unit on a one-to-one basis, and a second lens group having a second focal length and emitting light having passed through the first lens groups. In the optical unit, for each of the regions, the first focal length is smaller than zero, the second focal length is larger than zero, and each composite focal length of each of the first lens groups and the second lens group is larger than the second focal length.

20 Claims, 34 Drawing Sheets

(58) Field of Classification Search
     CPC ... G01S 7/3812; G02B 13/18; G02B 13/0045;
          G02B 15/1461; G02B 1/041; G02B
          15/177; G02B 15/144113; G02B
          15/143507; G02B 15/144105; G02B
          15/173; G02B 15/143103; G02B
          15/145113; G02B 15/143105; G02B
          15/143503; G02B 15/28; G02B
          15/145117; G02B 15/145101; G02B
          15/144109; G02B 15/144111; G02B
          15/144511; G02B 15/145111; G02B
          15/1451; G02B 15/145121; G02B
          15/145129; G02B 15/17; G02B 9/14;
          G02B 9/06; G02B 7/02; G02B 9/58;
                                      G02B 9/36
     See application file for complete search history.

(56)                 References Cited

U.S. PATENT DOCUMENTS

2010/0014274 A1     1/2010  Shyu

2010/0231862 A1     9/2010  Itoh et al.
2012/0182371 A1     7/2012  Nobayashi
2016/0223811 A1     8/2016  Plotkin et al.
2018/0329065 A1*   11/2018  Pacala ................... G01S 7/4865
2019/0179028 A1*    6/2019  Pacala ................... G01S 7/4863

FOREIGN PATENT DOCUMENTS

JP        2003-330111       11/2003
JP         2004157213  A     6/2004
JP        2004-526194        8/2004
JP        2006-332696       12/2006
JP        2007-257782       10/2007
JP        2012-144012        8/2012
JP        2014-522507        9/2014
JP        2015-022244        2/2015
TW         201638621  A     11/2016
WO    WO 2007/108504        9/2007

* cited by examiner

FIG. 9

PROJECTION SURFACE

LIGHT SOURCE SURFACE (a)

LIGHT SOURCE DEVICE AND ELECTRONIC APPARATUS

CROSS REFERENCE TO RELATED APPLICATIONS

This application is a national stage application under 35 U.S.C. 371 and claims the benefit of PCT Application No. PCT/JP2020/048575, having an international filing date of 24 Dec. 2020, which designated the United States, which PCT application claimed the benefit of Japanese Patent Application No. 2020-005387, filed 16 Jan. 2020, the entire disclosures of each of which are incorporated herein by reference.

TECHNICAL FIELD

The present disclosure relates to a light source device and an electronic apparatus.

BACKGROUND ART

In recent years, a multifunctional mobile phone terminal (hereinafter, a smartphone) or a tablet personal computer (hereinafter, a tablet PC) often incorporates a mechanism such as a structured light that projects light onto a target and detects reflected light from the target to perform distance measurement. In this case, generally, a laser diode such as a vertical cavity surface emitting laser (VCSEL) or an edge emitting laser (EEL) is used as a light source, and the laser light emitted from the light source is incident as substantially parallel light on a diffractive optical element (DOE) by a projection lens to generate a projection pattern. One of the projection patterns is a pattern (referred to as a dot pattern) using dots.

In a case where the dot pattern is used as the projection pattern, the area of a light receiving element necessary for detecting a signal can be decreased by narrowing the beam diameter in which the dot is projected onto the target, so that the influence of the noise caused by ambient light can be suppressed, and the distance measurement can be performed with higher accuracy. At this time, it is desirable that each dot configuring the projection pattern can be projected at a longer distance (for example, several meters to several tens of meters) in a wider angular range.

CITATION LIST

Patent Document

Patent Document 1: Japanese Published Patent Publication No. 2004-526194
Patent Document 2: Japanese Patent Application Laid-Open No. 2006-332696

SUMMARY OF THE INVENTION

Problems to be Solved by the Invention

When projection is performed in a wide angular range, energy is dispersed in a wide range, so that the amount of projection light per unit area of the object decreases, and the amount of reflected light from the target also decreases. In the projection at a long distance, a sufficient light receiving signal cannot be obtained on a light receiving side, and highly accurate distance measurement becomes difficult.

Furthermore, the beam diameter of the laser light projected on a projection surface is proportional to the size of a light source region in a light emitting element, and is inversely proportional to the focal length of an optical system. The beam diameter of the projection surface is generally determined by a geometrical ray projection magnification, but is also affected by spread of a light flux due to diffraction of light. Conventionally, in order to project laser light with a small beam diameter, in particular, in the case of using a light source having a size of a light source region such as a vertical cavity surface emitting laser (VCSEL), it has been difficult to project the laser light while maintaining a small beam system up to a long distance at a projection magnification and a diffraction spread angle. Therefore, conventionally, it has been difficult to execute distance measurement at a long distance with high accuracy in a wide angular range.

An object of the present disclosure is to provide a light source device and an electronic apparatus capable of projecting a projection image by laser light in a wide angular range while suppressing an increase in a beam diameter.

Solutions to Problems

A light source device according to the present disclosure includes: a light source unit that includes a plurality of light emitting elements and is divided into a plurality of regions having at least one light emitting element in one region; and an optical unit that includes a plurality of first lens groups having a first focal length and corresponding to the plurality of regions of the light source unit on a one-to-one basis, each of the plurality of first lens groups including one or more lenses, and a second lens group having a second focal length and emitting light having passed through the plurality of first lens groups, the second lens group including one or more lenses. In the optical unit, for each of the plurality of regions, the first focal length is smaller than zero, the second focal length is larger than zero, and each composite focal length of each of the plurality of first lens groups and the second lens group is larger than the second focal length.

BRIEF DESCRIPTION OF DRAWINGS

FIG. 9 is a diagram schematically illustrating a relationship between each light source region of a light source unit and an image corresponding to each light source region on a projection surface according to the first embodiment.

FIG. 25 is a diagram for comparing the light source device according to the existing technology with the light source device according to the third embodiment.

MODE FOR CARRYING OUT THE INVENTION

Hereinafter, embodiments of the present disclosure will be described in detail on the basis of the drawings. Note that, in the following embodiments, the same parts are denoted by the same reference signs, and redundant description will be omitted.

Hereinafter, the embodiments of the present disclosure will be described in the following order.

1. Configuration applicable to each embodiment
1-0-1. Description of existing technology
2. First Embodiment
2-0-1. Configuration of light source device according to first embodiment
2-0-2. Description of principle of first embodiment
2-0-3. Arrangement of light emitting elements according to first embodiment
2-0-4. Description of conditions for each lens group according to first embodiment
2-1. Specific example of first embodiment
2-2. First modification of first embodiment
2-3. Second modification of first embodiment
3. Second Embodiment
4. Third Embodiment
4-1. Creation method according to third embodiment 4-1-1. Configuration example of light emitting element
applicable to third embodiment 4-1-2. First creation method 4-1-3. Second creation method 4-1-4. Third creation method 4-1-5. Fourth creation method 4-1-6. Fifth creation method 4-2. First modification 4-2-1. First example of providing functional film 4-2-2. Second example of providing functional film 4-2-3. Third example of providing functional film 4-2-4. Fourth example of providing functional film 4-2-5. Fifth example of providing functional film 4-2. Second modification 4-3. Third modification 4-4. Fourth modification 4-5. Fifth modification

1. Configuration Applicable to Each Embodiment

First, an example of a device configuration applicable to each embodiment of the present disclosure will be described. A light source device using a light emitting element according to each embodiment in the present disclosure is suitable for use as a light source of a distance measuring device that performs distance measurement by projecting light onto an object and receiving the reflected light, for example.

Prior to the description of each embodiment of the present disclosure, in order to facilitate understanding, a technology for performing distance measurement by detecting reflected light will be described as one of technologies applicable to each embodiment. As a distance measurement method in this case, a direct time of flight (ToF) method is applied. The direct ToF method is a method in which the reflected light obtained when the light emitted from the light source is reflected by the object is received by a light receiving element, and distance measurement is performed on the basis of time of a difference between a light emission timing and a light reception timing.

The present invention is not limited thereto, and an indirect ToF method for performing distance measurement on the basis of a phase difference between the light emission timing and the light reception timing can also be applied to each embodiment.

Figure 1:
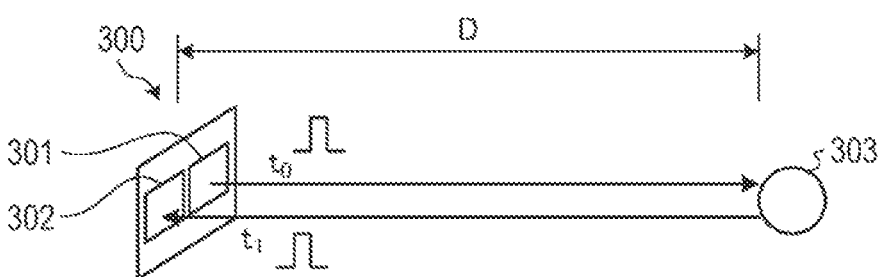
FIG. 1 is a diagram schematically illustrating distance measurement by a direct ToF method applicable to an embodiment.

The distance measurement by the direct ToF method will be schematically described with reference to FIGS. 1 and 2. FIG. 1 is a diagram schematically illustrating the distance measurement by the direct ToF method applicable to each embodiment. A distance measuring device 300 includes a light source unit 301 and a light receiving unit 302. The light source unit 301 is, for example, a laser diode, and is driven to emit laser light in a pulsed manner. The light emitted from the light source unit 301 is reflected by an object 303 and received by the light receiving unit 302 as reflected light. The light receiving unit 302 includes a light receiving element that converts light into an electrical signal by photoelectric conversion, and outputs a signal corresponding to the received light.

Here, a time (light emission timing) at which the light source unit 301 emits light is a time $t_0$, and a time (light reception timing) at which the light receiving unit 302 receives the reflected light obtained when the light emitted from the light source unit 301 is reflected by the object 303 is a time $t_1$. Assuming that a constant c is a light velocity $(2.9979 \times 10^8$ [m/sec]), a distance D between the distance measuring device 300 and the object 303 is calculated by following Expression (1).

$$D = (c/2) \times (t_1 - t_0) \tag{1}$$

The distance measuring device 300 repeatedly executes the above-described processing a plurality of times. The light receiving unit 302 may include a plurality of light receiving elements, and the distance D may be calculated on the basis of each light reception timing at which the reflected light is received by each light receiving element. The distance measuring device 300 classifies a time $t_m$ (referred to as a light receiving time $t_m$) from the time $t_0$ of the light emission timing to the light reception timing at which the light is received by the light receiving unit 302 on the basis of a class (bins) and generates a histogram.

Note that the light received by the light receiving unit 302 during the light receiving time $t_m$ is not limited to the reflected light obtained when the light emitted by the light source unit 301 is reflected by the object. For example, the ambient light around the distance measuring device 300 (light receiving unit 302) is also received by the light receiving unit 302.

Figure 2:
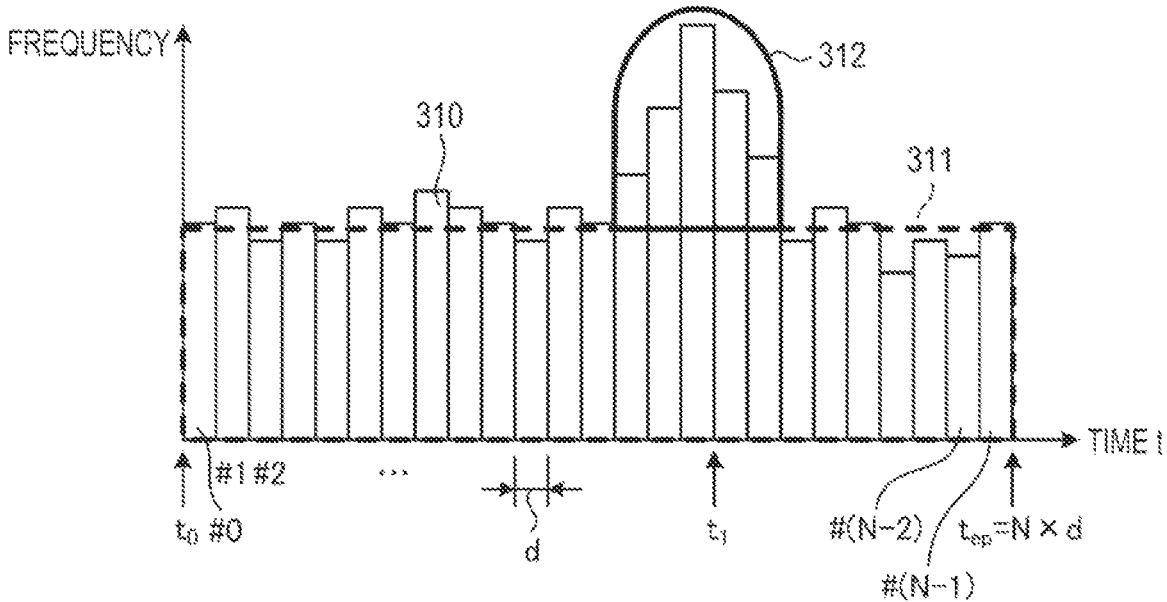
FIG. 2 is a diagram illustrating an example of a histogram based on a time at which a light receiving unit receives light, which is applicable to the embodiment.

FIG. 2 is a diagram illustrating an example of a histogram based on the time at which the light receiving unit 302 receives light, which is applicable to the embodiment. In FIG. 2, a horizontal axis represents a bin, and a vertical axis represents a frequency for each bin. The bin is obtained by classifying the light receiving time $t_m$ for each predetermined unit time d. Specifically, bin #0 is $0 \le t_m < d$, bin #1 is $d \le t_m \le 2 \times d$, bin #2 is $2 \times d \le t_m < 3 \times d$, . . . , bin #(N−2) is $(N-2) \times d \le t_m < (N-1) \times d$. In a case where the exposure time of the light receiving unit 302 is defined as a time $t_{ep}$, it is satisfied that $t_{ep} = N \times d$.

The distance measuring device 300 counts the number of times of acquiring the light receiving time $t_m$ on the basis of the bin, obtains a frequency 310 for each bin, and generates a histogram. Here, the light receiving unit 302 also receives light other than the reflected light obtained by reflecting the light emitted from the light source unit 301. Examples of such light other than the target reflected light include the above-described ambient light. A portion indicated by a range 311 in the histogram includes an ambient light component based on the ambient light. The ambient light is light randomly incident on the light receiving unit 302, and is noise for the target reflected light.

On the other hand, the target reflected light is light received according to a specific distance, and appears as an active light component 312 in the histogram. The bin corresponding to the frequency of peaks in the active light component 312 is the bin corresponding to the distance D of the object 303. By acquiring a representative time (for example, the time at the center of the bin) of the bin as the above-described time $t_1$, the distance measuring device 300 can calculate the distance D to the object 303 according to above-described Expression (1). As described above, by using a plurality of light reception results, it is possible to execute appropriate distance measurement for random noise.

Figure 3:
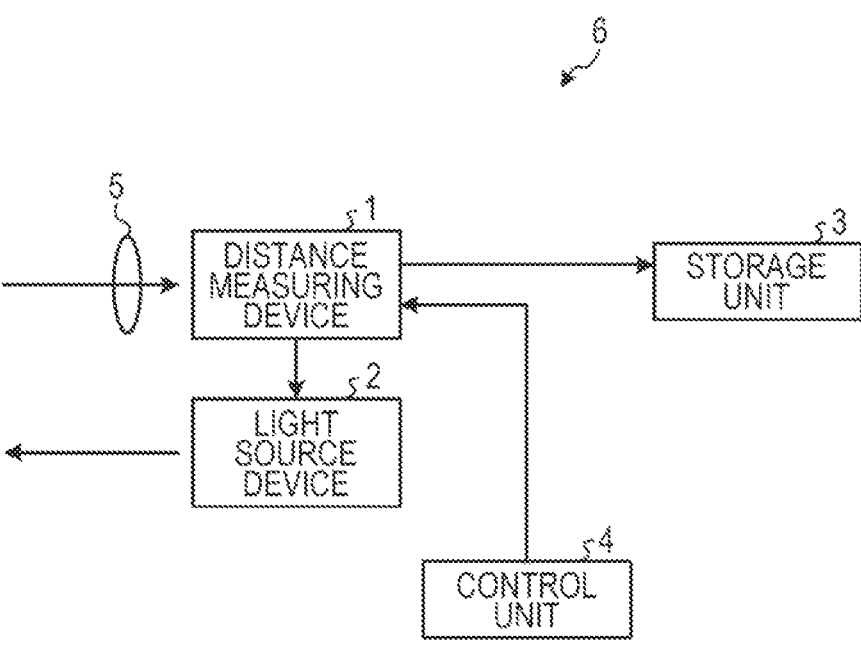
FIG. 3 is a block diagram illustrating a configuration of an example of an electronic apparatus using a distance measuring device according to the embodiment.

FIG. 3 is a block diagram illustrating a configuration of an example of an electronic apparatus using the distance measuring device according to the embodiment. In FIG. 3, an electronic apparatus 6 includes a distance measuring device 1, a light source device 2, a storage unit 3, a control unit 4, and an optical system 5.

The light source device 2 corresponds to the light source unit 301 described above, and includes a light source unit including a light emitting element that generates light used for distance measurement and an optical system that derives the light emitted from the light emitting element to the outside. The light source device 2 may further include a drive circuit for driving the light emitting element. The light emitting element included in the light source device 2 is a laser diode, and is driven to emit laser light in a pulsed manner, for example.

In the present disclosure, a vertical cavity surface emitting laser (VCSEL) as a surface light source is used as the light emitting element included in the light source device 2, and a VCSEL array in which VCSELs are arranged in an array is applied as the light source unit included in the light source device 2. The VCSEL array includes a plurality of light emitting elements (VCSEL) each corresponding to a channel, and can emit a plurality of laser lights generated by the plurality of respective light emitting elements in parallel.

Note that in the VCSEL array, a surface on which the laser emission surface of each light emitting element is arranged is defined as a light emitting surface. Furthermore, a region where the light emitting element (VCSEL) emits laser light is defined as a light source region, and a center point of the light source region is defined as a light emission point.

The distance measuring device 1 includes a plurality of light receiving elements corresponding to the light receiving unit 302 described above. The plurality of light receiving elements is arranged in, for example, a two-dimensional lattice shape to form a light receiving surface. The optical system 5 guides light incident from the outside to the light receiving surface included in the distance measuring device 1.

The control unit 4 controls the overall operation of the electronic apparatus 6. The control unit 4 includes, for example, a central processing unit (CPU), a read only memory (ROM), a random access memory (RAM), and an interface for communicating with each unit of the electronic apparatus 6, and operates using the RAM as a work memory to control the overall operation of the electronic apparatus 6 according to a program stored in advance in the ROM. For example, the control unit 4 supplies a light emission trigger, which is a trigger for causing the light source device 2 to emit light, to the distance measuring device 1. The distance measuring device 1 causes the light source device 2 to emit light at the timing based on the light emission trigger, and stores a time $t_{em}$ indicating the light emission timing. Furthermore, the control unit 4 sets a pattern at the time of distance measurement for the distance measuring device 1 in response to an instruction from the outside, for example.

The distance measuring device 1 counts the number of times of acquiring time information (light receiving time $t_m$) indicating a timing at which light is received on the light receiving surface within a predetermined time range, obtains a frequency for each bin, and generates the above-described histogram. The distance measuring device 1 further calculates the distance D to the object on the basis of the generated histogram. Information indicating the calculated distance D is stored in the storage unit 3.

1-0-1. Description of Existing Technology

Figure 4:
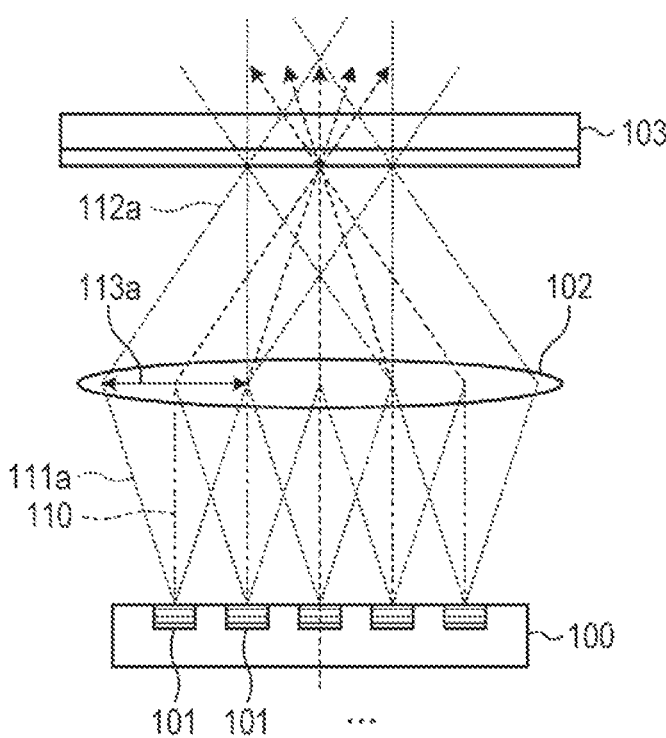
FIG. 4 is a schematic diagram illustrating a configuration of an example of a light source device according to an existing technology.

Here, prior to describing the present disclosure, in order to facilitate understanding, a light source device according to an existing technology will be described schematically. FIG. 4 is a schematic diagram illustrating a configuration of an example of a light source device according to an existing technology. The light source device illustrated in FIG. 4 includes a VCSEL array 100, a projection lens 102, and a diffractive optical element (DOE) 103.

In FIG. 4, the VCSEL array 100 includes a plurality of mesa (MESA) shaped light emitting elements 101 that each generate light. Each laser light (laser beam) 111a generated by each light emitting element 101 is incident on the projection lens 102 along an optical axis 110. Each laser light 111a incident on the projection lens 102 is made a collimated beam 112a of substantially parallel light by the projection lens 102, and is incident on the DOE 103. Each collimated beam 112a incident on the DOE 103 and on the projection lens 102 is emitted as a predetermined projection pattern by the DOE 103.

As illustrated in FIG. 4, the laser light 111a is incident on the projection lens 102 with a beam diameter 113a. The collimated beam 112a is emitted with a beam diameter proportional to the beam diameter 113a from the projection lens 102.

Here, the collimated beam 112a incident on the DOE 103 needs to have a beam diameter of a certain degree or more in order to obtain a diffraction effect with the fine uneven structure of the DOE. For example, in a case where the beam diameter of the collimated beam 112a incident on the DOE 103 is excessively small, there is a possibility that the diffraction effect cannot be obtained in the DOE 103, and a desired projection pattern is not obtained.

Figure 5:
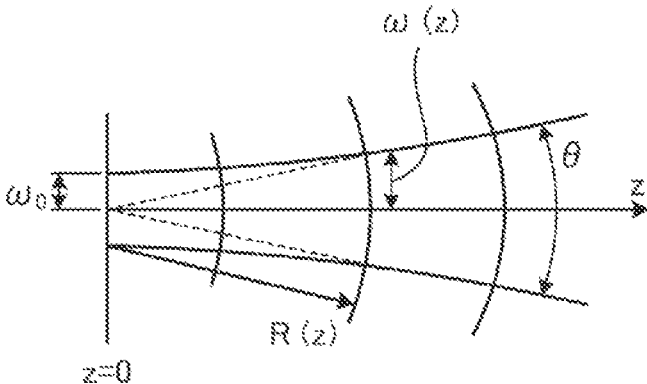
FIG. 5 is a schematic diagram illustrating an example of distance dependence of a beam diameter in a Gaussian beam.

The distance dependence of the beam diameter of the laser light will be described with reference to FIG. 5. FIG. 5 is a schematic diagram illustrating an example of the distance dependence of the beam diameter in a Gaussian beam. A position z at which the beam diameter is minimized is defined as z=0, and a beam radius $\omega_0$ at the position is defined as a beam waist. In this case, a beam radius $\omega(z)$ at the position z (z>0) can be expressed by following Expression (2). Note that in Expression (2), a value $\lambda$ is the wavelength of the beam.

$$\omega^2(z)=\omega_0^2\{1+[\lambda z/(\pi\omega_0^2)]^2\} \tag{2}$$

Therefore, it can be seen that when the beam radius $\omega_0$ at the beam waist increases, the spread angle of the beam at the position z decreases, and the beam diameter can be kept small to a farther place. The diffraction of this beam is applied to a geometrical ray projection magnification and affects the size of the beam diameter.

Here, in the VCSEL, when it is considered that a virtual beam waist exists in front of the light emitting surface, and the Gaussian beam spreads therefrom to have the size of the light source region on the light emitting surface, the beam projected from the VCSEL can be regarded as a pseudo Gaussian beam.

Here, a case will be considered in which the above-described VCSEL array is applied as the light emitting element serving as the light source and distance measurement is executed using the direct ToF method. Furthermore, the light source device is assumed to be a dot projector that projects light (laser beam) emitted from the light source in a dot shape onto the object. The dot projector has a basic configuration in which an array pattern of light emission points from the light emitting surface is enlarged and projected by a projection lens without using a scanning mechanism such as a micro electro mechanical systems (MEMS) mirror. When a dot-shaped light spot is projected on the object in a state where the light from each light emitting element becomes substantially collimated light, a beam diameter can be kept as small as possible within a range of a projection distance.

Under the projection condition of the collimated light, the shape of the light source is enlarged and projected on the projection surface, and thus a dot diameter is proportional to the size of the light source region of one light emitting element and is inversely proportional to the focal length of the projection lens. The direct ToF method is a method excellent in distance measurement at a long distance, the method having a characteristic of less decrease in accuracy at a long distance as compared with, for example, a triangulation method, from the principle of measuring the propagation time of light to the object.

In the dot projector, widening a projection angle enables distance measurement in a wider region, which is preferable. On the other hand, in the existing technology, when the projection angle is widened, the energy of the laser is dispersed in a wide range, so that the amount of distance measurement light per unit area projected on the object is reduced, and the distance that can be measured is shortened. That is, according to the existing technology, it has been difficult to achieve a wide projection angle while maintaining a long distance measurement performance.

More specifically, when the laser light emitted from the light emitting element is projected onto the object, the laser light is projected onto the object at a projection magnification at which the light source region of the light emitting element is present. In a case where the laser light emitted from the light emitting element of surface emitting light such as the VCSEL is made substantially parallel light by using the projection lens and projected onto the object, the beam diameter of the projection surface is generally determined by a value obtained by multiplying the size of the light source region of the light emitting element by the geometrical ray projection magnification obtained from the focal length of the optical system and the distance to the projection surface. Moreover, as described with reference to FIG. 5, the beam diameter of the projection surface is determined by a geometrical ray optical magnification and the element spread by the diffraction of the laser light. When the beam diameter increases, there is a possibility that the distance measurement performance deteriorates.

As a method of widening the projection angle, a method using the DOE and a method using the projection lens having a shorter focal length can be considered. Among them, in the method using the DOE, the projection angle is enlarged, but the DOE divides the incident light by using a diffraction phenomenon, so that light quantity attenuation per dot on the projection surface is accompanied according to the number of divisions. Therefore, in order to project the dot with a sufficient amount of light up to a long distance, it is necessary to increase the power of the light source, and a large amount of power is required to drive the laser light source.

On the other hand, in the method using a projection lens having a shorter focal length, the focal length is shortened so that the light source region of each light emitting element is enlarged and projected, and the beam diameter increases.

Figure 6:
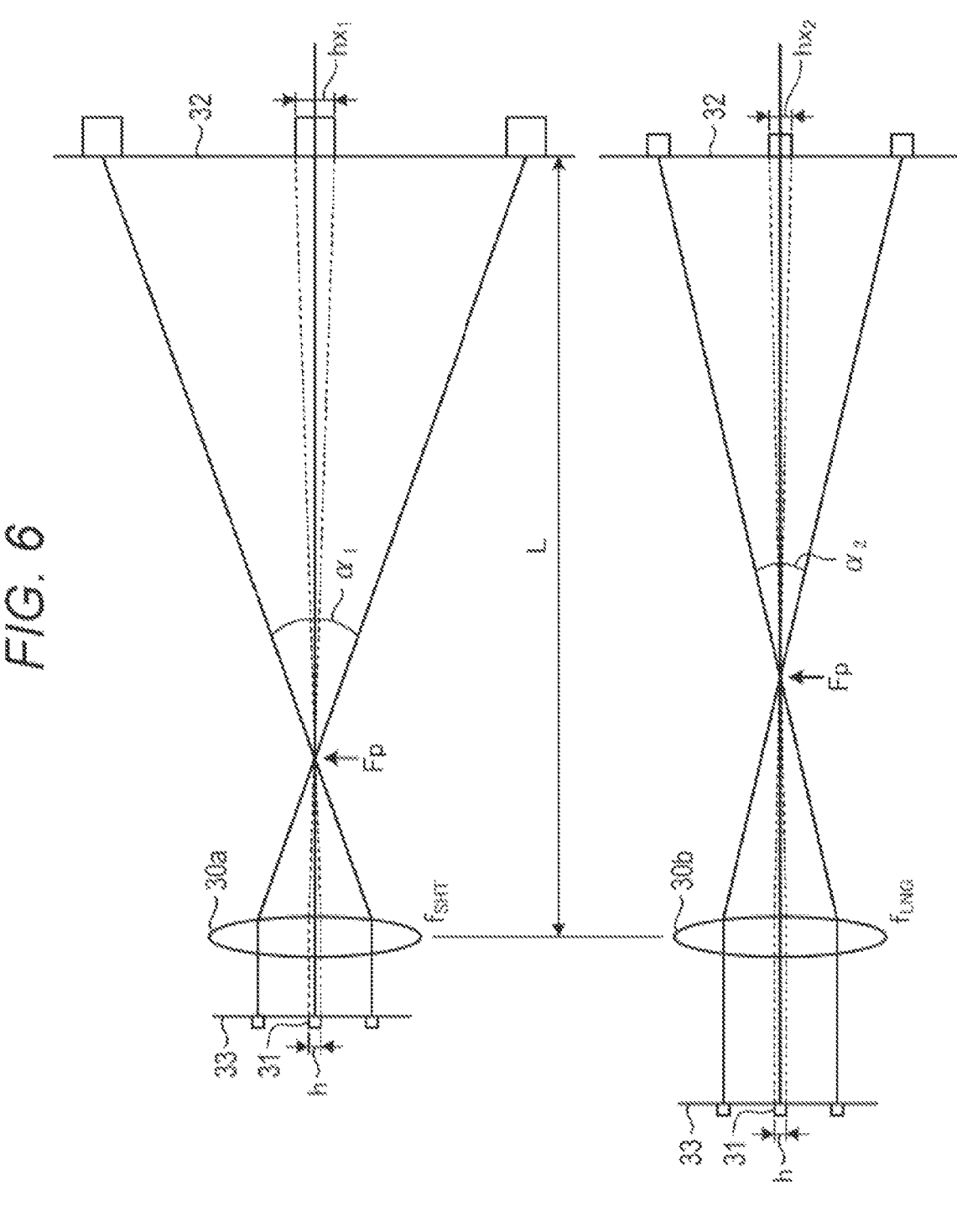
FIG. 6 is a diagram schematically illustrating a relationship between a focal length and the beam diameter.

FIG. 6 is a diagram schematically illustrating a relationship between the focal length and the beam diameter. Section (a) in FIG. 6 illustrates an example using a projection lens 30a having a focal length $f_{SHT}$. Furthermore, section (b) of FIG. 6 illustrates an example using a projection lens 30b having a focal length $f_{LNG}$ longer than the focal length $f_{SHT}$. At this time, in sections (a) and (b), the area of the light source region of the light emitting elements 31 is the same. In the drawing, a position Fp indicates a focal position. In a distance between the light emitting surface 33 on which the light emitting element 31 is arranged and each of the projection lenses 30a and 30b, the distance for the long-focus projection lens 30b is longer than the distance for the short-focus projection lens 30a.

Furthermore, an angle $\alpha_1$ represents the projection angle of the projection lens 30a, and an angle $\alpha_2$ represents the projection angle of the projection lens 30b (referred to as a projection angle $\alpha_1$ and a projection angle $\alpha_2$, respectively). The projection angle $\alpha 1$ of the short-focus projection lens 30a is larger than the projection angle $\alpha_2$ of the long-focus projection lens 30b, and it can be seen that, for example, a wider range of projection can be performed on the projection surface 32. Note that the projection angles $\alpha_1$ and $\alpha_2$ are angles formed in a direction in which the beam by the VCSEL at the end of the VCSEL array advances from the position Fp which is the focal position, for example.

Here, a beam diameter hx in the projection surface 32 is expressed by following Expression (3) from the relationship of the geometrical ray projection magnification. Note that in Expression (3), the diameter of the light source region of the light emitting element 31 is defined as a diameter h, and the distance from the projection lens 30a or 30b to the projection surface 32 is defined as a distance L. Furthermore, $f_{cs}$ represents the focal length of the projection lens 30a or 30b.

$$hx=h\times(L/f_{cs}) \tag{3}$$

According to Expression (3), in a case where the diameter h and the distance L are fixed values, the beam diameter hx is inversely proportional to the focal length $f_{cs}$. Therefore, the beam diameter $hx_1$ by the short-focus projection lens 30a illustrated in section (a) is larger than the beam diameter $hx_2$ by the long-focus projection lens 30b illustrated in section (b). As described above, in a case where a short-focus lens is used as the projection lens, projection can be performed in a wider range, but the beam diameter increases.

When the diameter of the projected beam increases, the amount of noise light other than the reflected light of the laser light emitted from the light source also increases in the light receiving unit that receives the reflected light. Therefore, it is difficult to widen a distance range in which the distance can be measured, and it is also difficult to measure the region to be measured in a pinpoint manner.

Furthermore, a technology is proposed in which the laser light emitted from each light emitting element included in the VCSEL array is collimated by a plurality of microlenses directly arranged on the VCSEL array (for example, Patent Document 2). This technology is used, for example, to project a projection pattern onto the object. In general, a microlens has a small lens diameter, and thus a light flux diameter limited by the lens diameter also decreases to be a size close to the lens diameter. Therefore, as described with reference to FIGS. 5 and 6, the spread angle of the light flux increases due to the diffraction effect of the beam, and the beam diameter increases at a long distance. Therefore, it is difficult to propagate a beam while maintaining a small beam diameter up to a long projection distance.

In this regard, in a system, such as a structured light, which has a relatively high density of a projection pattern and about several meters of a projection distance, a method may be used in which a projection lens having a larger focal length than a microlens is used as a lens common to a plurality of light emitting elements (for example, all light emitting elements included in the VCSEL array). In this method, it is possible to keep the divergent angle of the projection beam small, but the device becomes large as compared with the method using the above-described microlens.

2. First Embodiment

2-0-1. Configuration of Light Source Device According to First Embodiment

Figure 7:
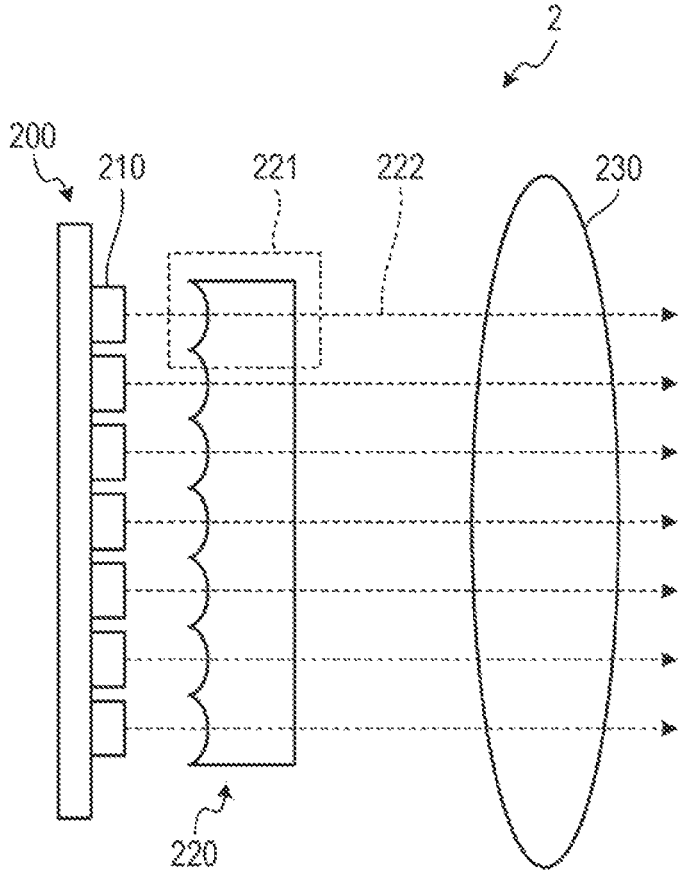
FIG. 7 is a schematic diagram illustrating a configuration of an example of a light source device according to a first embodiment of the present disclosure.

Next, a first embodiment of the present disclosure will be described. An object of the present disclosure is to enable distance measurement in a wide angular range without deteriorating a distance measurement distance and a distance measurement accuracy. FIG. 7 is a schematic diagram illustrating a configuration of an example of a light source device according to the first embodiment of the present disclosure. In FIG. 7, the light source device 2 includes a light source unit 200, a microlens array 220, and a projection lens 230.

The light source unit 200 is a VCSEL array in which light emitting elements 210, which are VCSELs, are arranged in an array. In the light source unit 200, the light emitting surface is divided into n regions, and one light emitting element 210 is arranged in each of the divided regions. The invention is not limited thereto, and two or more light emitting elements 210 may be arranged in each of the divided regions. Hereinafter, the regions obtained by dividing the light emitting surface of the light source unit 200 are appropriately referred to as light source regions.

The microlens array 220 as a first optical element includes a plurality of concave lenses 221. Each of the plurality of concave lenses 221 included in the microlens array 220 is arranged on a one-to-one basis with each light source region of the light source unit 200. The concave lenses 221 which are a first lens group may include one lens, or may include a combination of a plurality of lenses arranged in the traveling direction of the light beam. The microlens array 220 is configured as a coupled body of n concave lenses 221 which are the first lens group. Furthermore, the plurality of first lens groups, that is, the concave lens 221 included in the microlens array 220 may have a plurality of different focal lengths as long as conditions described later are satisfied.

In the following description, it is assumed that each light source region of the light source unit 200 includes one light emitting element 210. Each concave lens 221 included in the microlens array 220 is arranged in a one-to-one relationship with each light emitting element 210.

The projection lens 230 may include one lens or may include a combination of a plurality of lenses. The projection lens 230 is configured as a second lens group including one or a plurality of lenses.

The laser light 222 emitted from each light emitting element 210 is incident on the projection lens 230 via each corresponding concave lens 221 in the microlens array 220, and is emitted from the projection lens 230 to the outside of the light source device 2. By inserting the concave lens 221 between each light emitting element 210 and the projection lens 230, the laser light 222 emitted from each light emitting element 210 can be projected over a wide range to a long distance while maintaining a small beam diameter.

2-0-2. Principle Description of First Embodiment

Next, the reason why it is possible to perform distance measurement in a wide angular range without deteriorating the distance measurement distance and the distance measurement accuracy by using the concave lens 221 in the first embodiment will be described.

Figure 8:
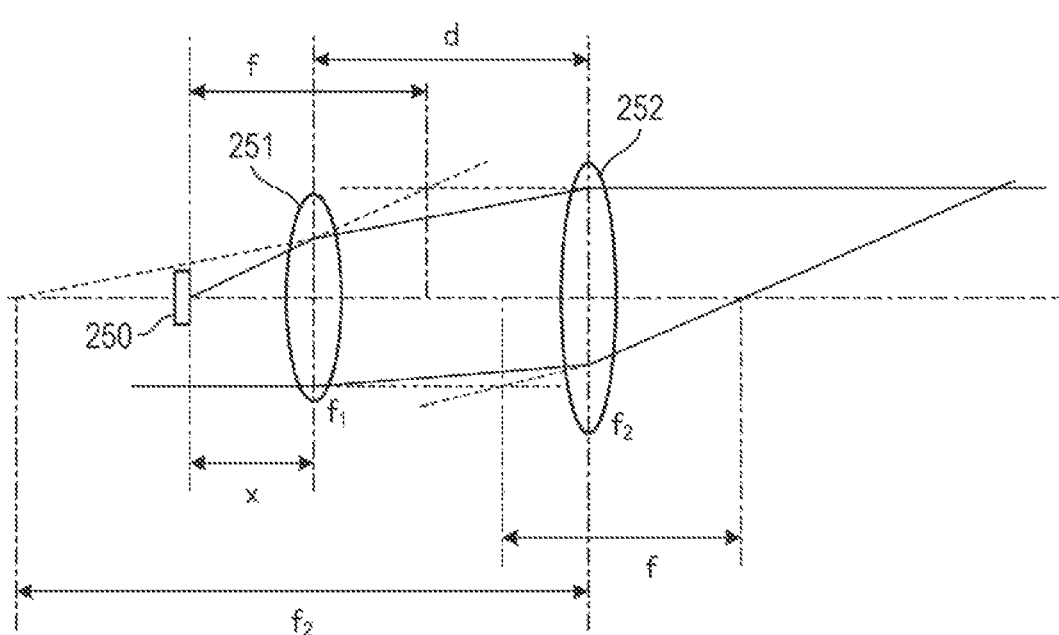
FIG. 8 is a diagram for explaining each unit in a case where two lenses are combined.

In the first embodiment, as described with reference to FIG. 7, the concave lens 221 and the projection lens 230 which is a convex lens are combined. FIG. 8 is a diagram for explaining each unit in a case where two lenses are combined. In the example of FIG. 8, two lenses 251 and 252 are arranged with optical axes aligned. The light emitting element 250 is arranged on the left side of the lens 251 in the drawing, and the light emitted from the light emitting element 250 travels from left to right and passes through the lenses 251 and 252.

The lens 251 corresponds to each of concave lenses 221 included in the first lens group illustrated in FIG. 7, and has a focal length $f_1$. The lens 252 corresponds to the projection lens 230 which is the second lens group illustrated in FIG. 7 and has a focal length $f_2$. A distance between the lens 251 and the lens 252 is a distance d, and a distance between (the light emitting surface of) the light emitting element 250 and the lens 251 is a distance x. A composite focal length f between the lens 251 and the lens 252 is defined by a principal point position on the right side and a principal point position on the left side.

In such an arrangement of the lenses 251 and 252, in the first embodiment, the characteristics (focal lengths) and the arrangement of the lenses 251 and 252 are determined such that following Expressions (4) and (5) are established for the focal lengths $f_1$ and $f_2$ and the composite focal length f.

$$f_1 < 0 \tag{4}$$

$$0 < f_2 < f \tag{5}$$

Hereinafter, these Expression (4) and (5) will be described. Referring to FIG. 7, it is assumed that the microlens array 220 includes n concave lenses 221 as a first lens group, and the light source unit 200 includes n light emitting elements 210 in a one-to-one relationship with respect to each of the n concave lenses 221. In each light emitting element 210, the light emitting surface is arranged perpendicular to the optical axis of the corresponding concave lens 221. Light is emitted by each light emitting element 210 and is emitted from each concave lens 221 included in the microlens array 220.

Following Expression (6) represents a condition necessary for forming a spot image formed by a synthesis optical system including the first lens group and the second lens group to be smaller than a spot image formed only by the second lens group. Note that, it is obvious that Expression (6) is established from Expression (3) described above.

$$f_2 < |f| \tag{6}$$

Expression (6) can also be expressed by another expression method as in following Expression (7). Note that in Expression (7), a symbol "$\wedge$" indicates a logical product.

$$(f = kf_2) \wedge (|k| > 1) \tag{7}$$

In Expression (7), a value k can be considered as a magnification factor of the focal length in a case where the optical system including only the second lens group is changed to the synthesis optical system by synthesis of the first lens group and the second lens group. For example, when the value k>1, the composite focal length f by the synthesis optical system of the first lens group and the second lens group becomes k times longer than the focal length $f_2$ by the optical system including only the second lens group. Therefore, by using this synthesis optical system, the projected dot (beam diameter) can be narrowed down to $1/|k|$ as compared with a case where the optical system including only the second lens group is used.

Similarly, each region (light source region) obtained by dividing the light emitting surface of the light source unit 200 into n regions is projected after being reduced to $1/|k|$ times as compared with the case of using the optical system including only the second lens group in the projection surface. Therefore, the image of each light source region is reduced in size without having an overlapping region on the projection surface.

Hereinafter, the value k is referred to as a focal length magnification factor k.

Figure 9:
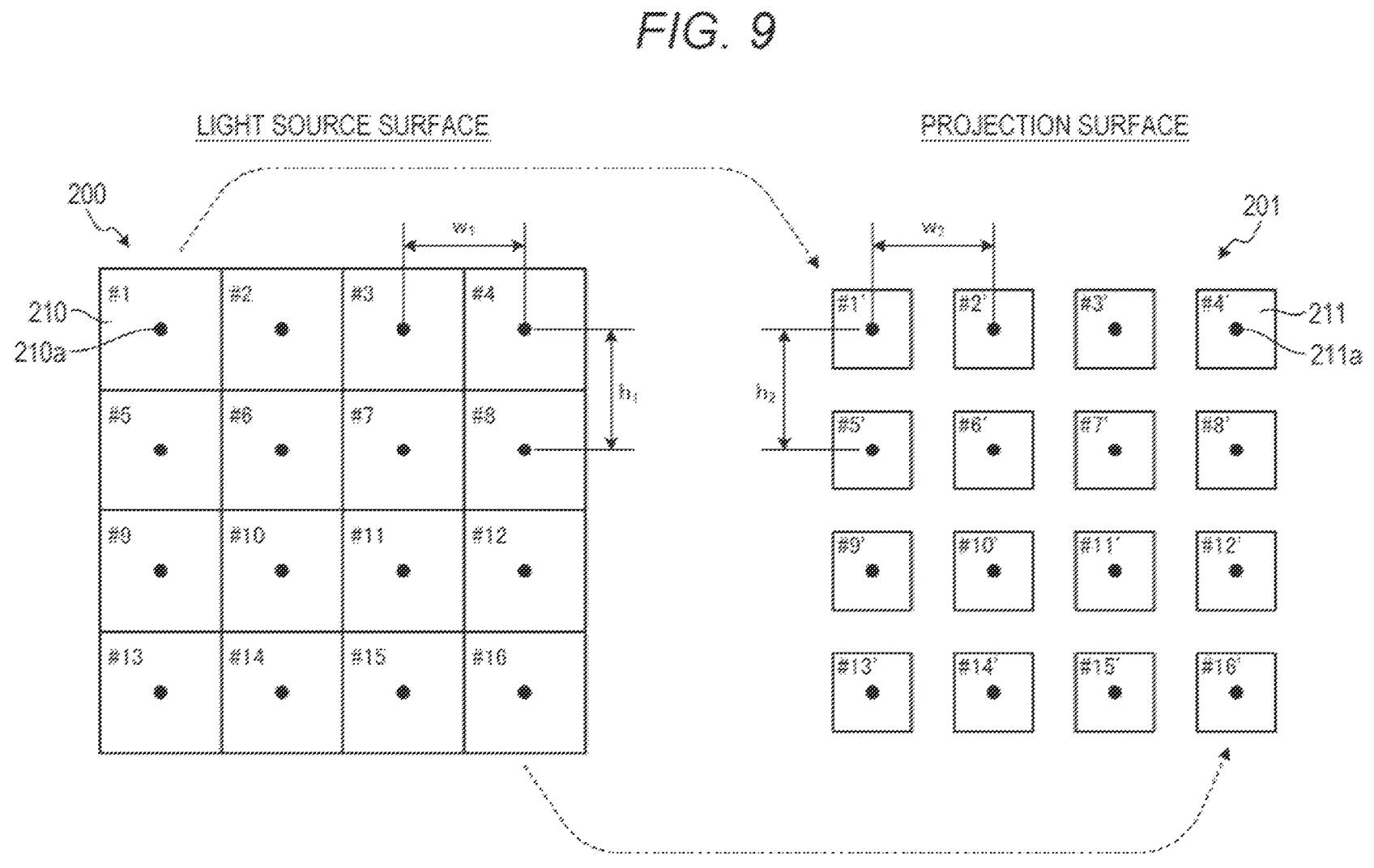

FIG. 9 is a diagram schematically illustrating a relationship between each light source region of the light source unit 200 and the image corresponding to each light source region on the projection surface according to the first embodiment. The left side of FIG. 9 illustrates an example of the light source unit 200. In this example, the light source unit 200 is divided into sixteen light source regions #1 to #16 each including one light emitting element 210. In each of the light source regions #1 to #16, each light emitting element 210 emits laser light from each light source region with a light emitting unit 210$a$ as a center. The light emitting elements 210 are arranged at intervals of a width $w_1$ and a height $h_1$ in the drawing. Therefore, each of the light source regions #1 to #16 has the width $w_1$ and the height $h_1$.

The right side of FIG. 9 illustrates a state in which each laser light emitted from each light emitting element 210 passes through each concave lens 221 included in the first lens group and further passes through the second lens group to be projected onto the projection surface 201. On projection surface 201, the light source regions #1 to #16 are reduced by the first lens group to be projected as projection regions #1' to #16'. In each of the projection regions #1' to #16', each point 211$a$ corresponds to each light emitting unit 210$a$ of each of the light source regions #1 to #16.

In the example of FIG. 9, since the projection angle itself does not change, the interval (a width $w_2$ and a height $h_2$) at which the projection regions 211 are projected is equal to the interval (the width $w_1$ and the height $h_1$) of the light emitting elements 210 in the light source unit 200. On the other hand, as described above, each projection region 211 is projected after the size of each of the light source regions #1 to #16 is reduced to 1/|k| times as compared with a case where the optical system including only the second lens group is used. Thus, each projection region is projected in a state where the dot (beam diameter) is narrowed.

As described above, under the condition that above-described Expressions (4) and (5) are satisfied, the light emitted from each of the light source regions #1 to #16 (each light emitting element 210) passes through each concave lens 221, and is further projected through the projection lens 230. Therefore, it is possible to project the projection regions 211 with the beam diameters narrowed on the projection surface while maintaining the intervals between the light source regions #1 to #16.

That is, the diameter of the beam projected by the enlargement of each of the light source regions #1 to #16 is determined by the composite focal length f obtained by combining the focal length $f_1$ of each of the concave lenses 221 included in the first lens group and the focal length $f_2$ of the projection lens 230. Furthermore, the projection angle of the light emitted from each of the light source regions #1 to #16 of the light source unit 200 is determined by the focal length $f_2$ of the second lens group (projection lens 230).

2-0-3. Arrangement of Light Emitting Elements According to First Embodiment

Next, the arrangement of the light emitting elements 210 in the light source unit 200 according to the first embodiment will be described. Expression (4) described above is a condition necessary for forming a dot on the object in a favorable state even in a case where the light emitting elements 210 are arranged at a high density in the light source unit 200. Under the condition that Expression (4) is satisfied, each light source region by each light emitting element 210 is formed as an image, on the projection surface 201, at a magnification of 1/|k| times in the horizontal and vertical directions as compared with the case of using the optical system including only the second lens group.

In a case where the light emitting elements 210 are arranged at a high density in the light source unit 200, it is necessary to prevent the light emitting element 210 (referred to as a target light emitting element) from entering the effective diameter of the adjacent light emitting element 210. A conditional expression for preventing that the laser lights spreading at a certain numerical aperture (NA) from the light emitting units of the target light emitting elements overlap at a position of a distance x (see FIG. 8) to the optical surface closest to the light source of the first lens group is expressed by following Expression (8). Note that, in Expression (8), p represents a distance (pitch) between the plurality of light emitting elements 210, and an interval between the concave lenses 221 included in the first lens group (microlens array 220) is equal to the pitch p.

$$p > 2 \times x \times \tan(\arcsin(NA)) \tag{8}$$

When the NA of the light source and the pitch p of each light emitting element 210 are determined, a possible range of the distance x from the light emitting surface of the light source unit 200 to the first lens group is determined. Actually, it is necessary to determine the distance x according to the densification of the light source unit 200, that is, the VCSEL array.

2-0-4. Description of Condition for Each Lens Group According to First Embodiment Next, the conditions for the first lens group and the second lens group according to the first embodiment will be described more specifically.

For the focal length $f_2$ of the second lens group, assuming the composite focal length f and the focal length magnification factor k of the synthesis optical system of the first lens group and the second lens group, these can be expressed as ($f = k f_2$)/$\wedge$|>1) as described using the Expression (7).

Referring to FIG. 8, the composite focal length f is expressed by following Expression (9) using the focal length $f_1$ of the first lens group (concave lens 221), the focal length $f_2$ of the second lens group (projection lens 230), and the distance d between the first lens group and the second lens group.

[Mathematical formula 1]

$$f = \frac{f_1 \cdot f_2}{f_1 + f_2 - d} \tag{9}$$

When a distance from the light emitting surface of the light source unit 200 to the first lens group (microlens array 220) is defined as the distance x, Expression (9) can be expressed by following Expression (10).

[Mathematical formula 2]

$$x = \frac{f_1 \cdot f_2 - f_1 \cdot d}{f_1 + f_2 - d} \tag{10}$$

From Expression (9) and Expression (7) described above, following Expression (11) is derived.

[Mathematical formula 3]

$$\frac{f_1 \cdot f_2}{f_1 + f_2 - d} = kf_2 \tag{11}$$

When the distance d is deleted from Expressions (10) and (11), the distance x can be expressed by following Expression (12).

[Mathematical formula 4]

$$x = (1-k)f_1 \tag{12}$$

Here, in order to position the first lens group in a direction in which light travels from the light source unit 200, x>0 needs to be satisfied. Therefore, from Expression (12), the focal length magnification factor k in each of a case where the first lens group has a positive refractive power (focal length $f_1 > 0$) and a case where the first lens group has a negative refractive power (focal length $f_1 < 0$) is derived as in following Expressions (13) and (14).

A case where the first lens group has a positive
refractive power ($f_1 > 0$):$k < -1$      (13)

A case where the first lens group has a negative
refractive power ($f_1 < 0$):$k > 1$      (14)

Here, the distance x and the absolute value |k| of the focal length magnification factor k are fixed values, the focal length in a case where the first lens group has a positive refractive power is $f_{1p}$, and the focal length in a case where the first lens group has a negative refractive power is $f_{1n}$. In this case, following Expression (15) can be derived from above-described Expression (12). Therefore, it can be seen that in a case where the first lens group has a negative refractive power, the absolute value of the focal length of the first lens group is larger compared to a case where the first lens group has a positive refractive power.

$$f_{1p} < |f_{1n} \tag{15}$$

As a result, in each lens included in the first lens group, when the condition of the focal length $f_1 < 0$ is satisfied, the absolute value of the focal length $f_{1n}$ in a case where the first lens group is configured using a negative refractive power can be made larger than the focal length $f_{1p}$ in a case where the first lens group is configured using a refractive power of sex. Therefore, when the first lens group is configured using a negative refractive power, in general, as compared with a case where the first lens group is configured using a convex lens, the amount of occurrence of spherical aberration and the eccentricity sensitivity of the lens can be suppressed to be lowered as much as the absolute value of the focal length increases, and thus it is possible to perform projection in a state where the beam diameter is also small and narrowed. Furthermore, in the case of the configuration using a convex lens, it is necessary to increase the curvature of the optical surface from which light is emitted in the lens, which is a factor of increasing the manufacturing sensitivity.

As described above, when the focal length $f_1$ of the first lens group is set as in following Expression (16), a longer focal length can be obtained than in the case of $f_1 > 0$. Note that Expression (16) is the same as Expression (4) described above, but is described again for the sake of explanation.

$$f_1 < 0 \tag{16}$$

Furthermore, in a case where the focal length $f_1$ of the first lens group is $f_1 < 0$, it is satisfied that the focal length magnification factor k>1, and thus following Expression (17) can be derived for the focal length $f_2$ and the composite focal length f of the second lens group from above-described Expression (12).

$$f_2 < f \tag{17}$$

The conditions of above-described Expressions (4) and (5) can be derived for the first lens group and the second lens group from above-described Expressions (16) and (17).

As described above, in the first embodiment, in the optical system using the microlens array 220 which is the coupled body of the first lens group and the projection lens 230 which is the second lens group, when the concave lens 221 is used for the first lens group, the composite focal length can be made longer compared to the optical system including only the second lens group, and the dot can be projected without narrowing the spot interval in a state where the enlargement of the beam diameter is suppressed. Therefore, by using the light source device 2 according to the first embodiment, a wide projection angle can be realized while maintaining the distance measurement performance in a long distance.

2-1. Specific Example of First Embodiment

Next, a specific example of the light source device 2 according to the first embodiment will be described. The specific example described later is based on a simulation result in a case where the first lens group and the second lens group are designed according to above-described Expressions (4) and (5).

Figure 10:
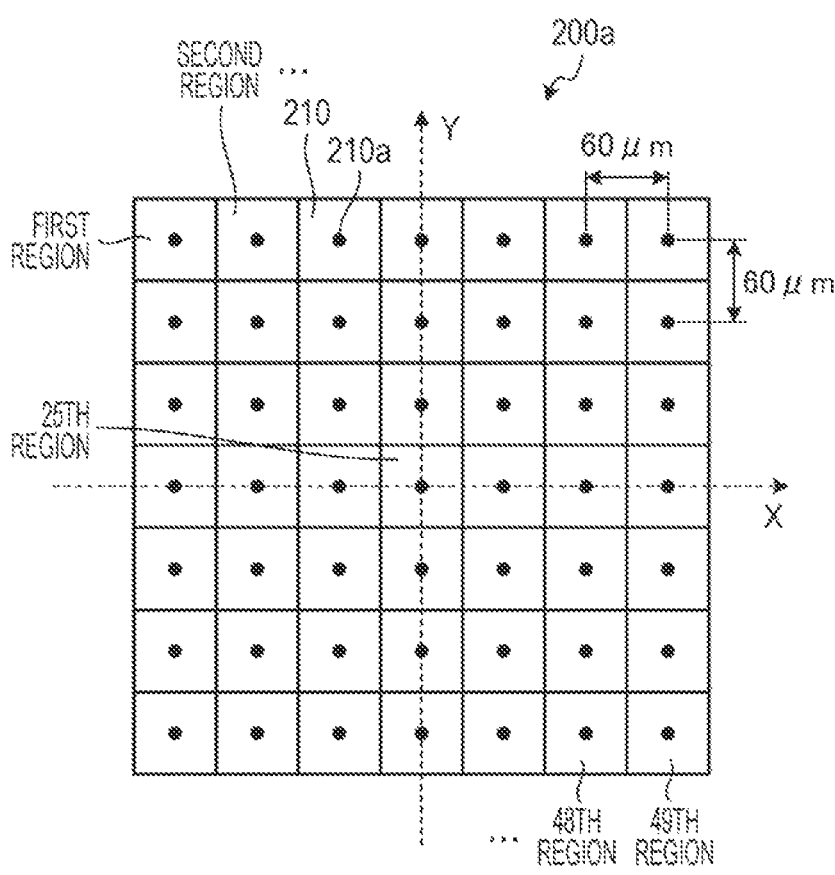
FIG. 10 is a diagram illustrating a configuration example of the light source unit assumed in a first specific example of the first embodiment.

The specific example of the first embodiment will be described in comparison with an example in a case where the first embodiment is not applied, that is, an example in which the first lens group is not used. FIG. 10 is a diagram schematically illustrating an example of a light source unit 200*a* assumed in the specific example of the first embodiment.

In FIG. 10, in the light source unit 200*a*, a total of 49 light emitting elements 210, each of which is the VCSEL, are arranged in a 7×7 arrangement in a square arrangement at intervals of 60 [μm] in length and width. In each light emitting element 210, the upper left corner of the 7×7 array is set as a first region, and thereafter, a second region, . . . , a 48th region, and a 49th region are sequentially numbered. With the light emitting element 210 in the 25th region positioned at the center as an origin, a Z axis is an optical axis, a X axis and a Y axis are included in the plane of the light emitting surface, and the X, Y, and Z axes are orthogonal to each other. Furthermore, in each light emitting element 210, the light emitting unit 210*b* has a circular shape with a diameter of 10 [μm], and a laser light having a wavelength of 940 [nm] is emitted at a spread angle of NA=0.2 with the light emitting unit 210*a* as the center.

The light source unit 200*a* is arranged such that the coordinates (X, Y) of the first region of each light emitting element 210=(−180, 180) [μm, μm], the coordinates (X, Y) of the second region=(−120, 180) [μm, μm], . . . , the coordinates (X, Y) of the 25th region=(0, 0) [μm, μm], . . . , the coordinates (X, Y) of the 48th region=(120, −180) [μm, μm], and the coordinates (X, Y) of the 49th region=(180, −180) [μm, μm]. In the example of FIG. 10, one light emitting element 210 is arranged in one light source region, but two or more light emitting elements 210 may be included in one light source region.

When a projection angle in the X direction is denoted by θ(H), a projection angle in the Y direction is denoted by θ(V), and a projection angle in a diagonal direction is denoted by θ(D), the optical system of the dot projector is obtained in which a dot is projected on the object at a projection angle of (θ(H),θ(V),θ(D))=(20.4,20.4,28.6) [deg].

Figure 11:
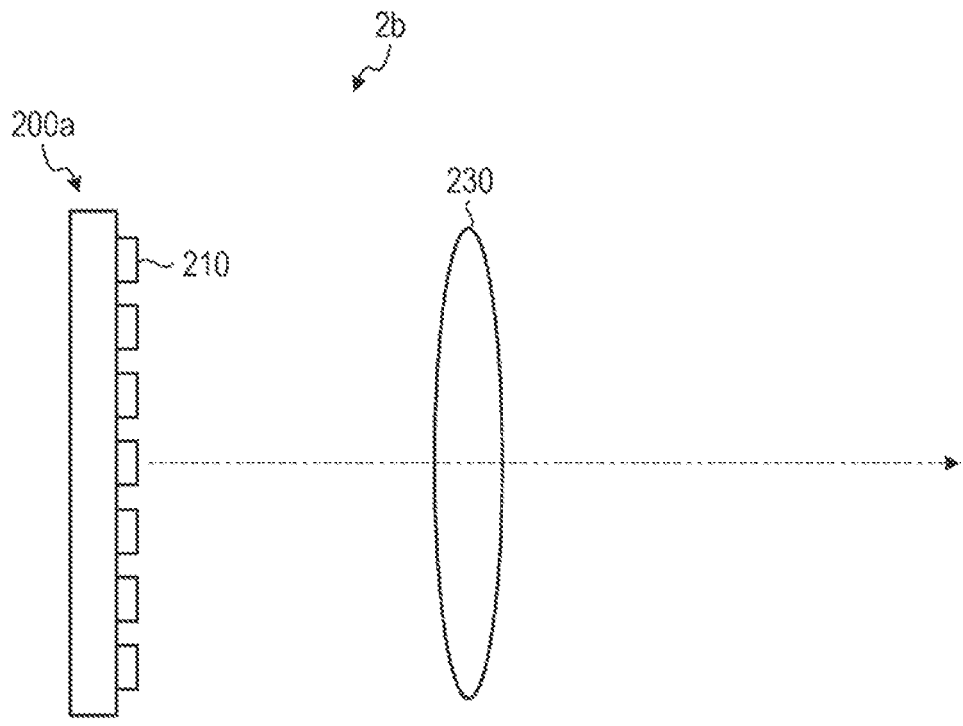
FIG. 11 is a diagram illustrating an example in which only a second lens group is arranged without arranging a first lens group in the first specific example.

First, for comparison with the first embodiment, an example of the case of a light source device 2b in which the first lens group G1 is not arranged but only the second lens group G2 (projection lens 230) is arranged as illustrated in FIG. 11 will be described. The second lens group G2 is a single lens and has the focal length $f_2=1.0$ [mm].

Table 1 shows the lens data in the configuration of FIG. 11 and Table 2 shows the aspherical coefficients of the lens. Table 1 shows a surface number, a curvature radius R [mm], a thickness [mm], a refractive index nd, and an Abbe number vd for each of a light source surface, each optical surface of the second lens group G2, and the projection surface. Furthermore, Table 2 shows a conic coefficient K and aspherical coefficients A4 and A6 for the second surface. A zeroth surface is the light source surface. The light from the light source is brought into a substantially parallel light state by the second lens group G2 and is projected as a spot on a third surface which is the projection surface 10 m ahead.

TABLE 1

| Surface/Group | Surface number | R [mm] | d [mm] | nd | vd |
|---|---|---|---|---|---|
| Light source surface | 0 | ∞ | 0.720975 | | |
| G2 | 1 | ∞ | 0.5 | 1.81 | 41.0 |
| | 2 | −0.79132 | 10000 | | |
| Projection surface | 3 | ∞ | 0 | | |

TABLE 2

| Coefficient | Second surface |
|---|---|
| K | −1.518495 |
| A4 | −0.226060 |
| A6 | 0.0603271 |

Figure 12:
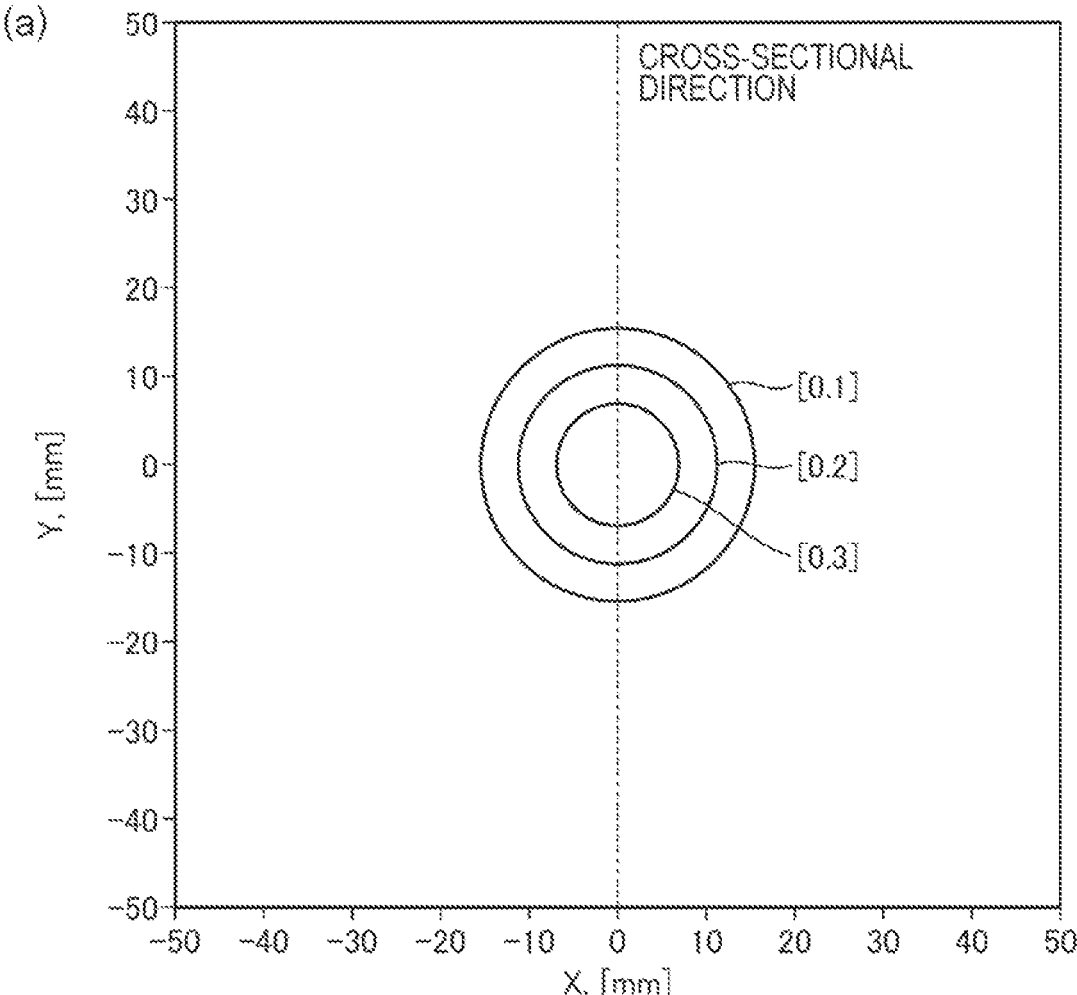
FIG. 12 is a diagram illustrating an example of a simulation result in a case where a first lens group is not used in the first specific example.
Figure 12:
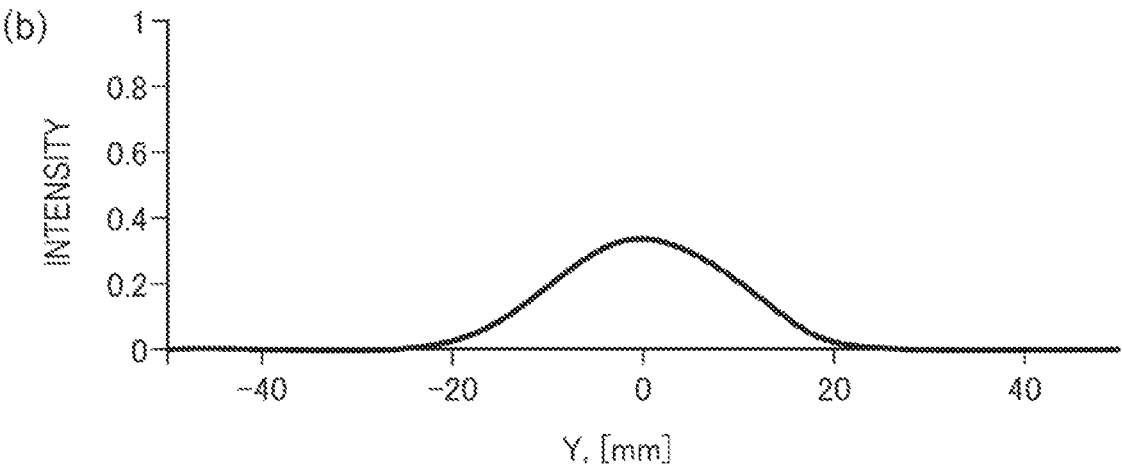

FIG. 12 is a diagram illustrating a simulation calculation result of the spot of the 25th region which is projected 10 m ahead under the configuration of FIG. 11 and the conditions of Tables 1 and 2. Section (a) in FIG. 12 illustrates a spot shape, a size, and a light intensity by using contour lines on an XY coordinate diagram of the projection surface. The numerical value in parentheses [ ] indicates the light intensity of each contour line and is normalized to a predetermined value. Section (b) in FIG. 12 illustrates the cross-sectional profile of the light intensity in a Y-axis direction. The beam diameter having an intensity of $1/e^2$ at the center of the spot is approximately 36 [mm] in the X direction and approximately 36 [mm] in the Y direction.

Next, an example of the case of a light source device 2c in which the first lens group (microlens array 220) including the concave lens 221 and the second lens group (projection lens 230a) are arranged as illustrated in FIG. 7 according to the first embodiment will be described.

The first lens group G1 is the microlens array 220 in which the concave lenses 221, which are plano-concave lenses, that correspond to the light emitting elements 210 on a one-to-one basis, are arranged in a 7×7 array. The first lens group G1 is arranged such that the concave surface side of each concave lens 221 faces the light emitting element 210 side (VCSEL side). Each concave lens 221 included in the first lens group G1 has the focal length $f_1=-0.1$ [mm] (<0) and has a negative refractive power. The composite focal length f of each concave lens 221 of the first lens group G1 and the second lens group G2 (projection lens 230a) is 1.5 [mm], and the focal length magnification factor k is 1.5.

Although the 49 concave lenses 221 included in the first lens group G1 function even when the concave lenses are separated from each other, it is advantageous to use one microlens array element in which the lenses are formed in an array in one optical material in terms of element manufacturing, cost, module assembly, and the like.

Table 3 shows the lens data in the configuration of FIG. 7 and Table 4 shows the aspherical coefficients of the lens. The meaning of Table 3 is similar to that of Table 1 described above, and the data of the first lens group G1 is added. Furthermore, Table 4 shows each of the conic coefficient K and the aspherical coefficients A4 and A6 for the fourth surface.

TABLE 3

| Surface/Group | Surface number | R [mm] | d [mm] | nd | vd |
|---|---|---|---|---|---|
| Light source surface | 0 | ∞ | 0.05 | | |
| G1 | 1 | −0.04512 | 0.2 | 1.458 | 65.4 |
| | 2 | ∞ | 0.5497 | | |
| G2 | 3 | ∞ | 0.5 | 1.81 | 41.0 |
| | 4 | −0.79132 | 10000 | | |
| Projection surface | 5 | ∞ | 0 | | |

TABLE 4

| Coefficient | Fourth surface |
|---|---|
| K | −1.518495 |
| A4 | −0.226060 |
| A6 | 0.0603271 |

Note that in the first embodiment, each concave lens 221 included in the first lens group G1 is a spherical lens, but this is not limited to this example, and an aspherical lens may be used to obtain a more excellent aberration performance, or the other optical surface may have a spherical or aspherical shape.

Figure 13:
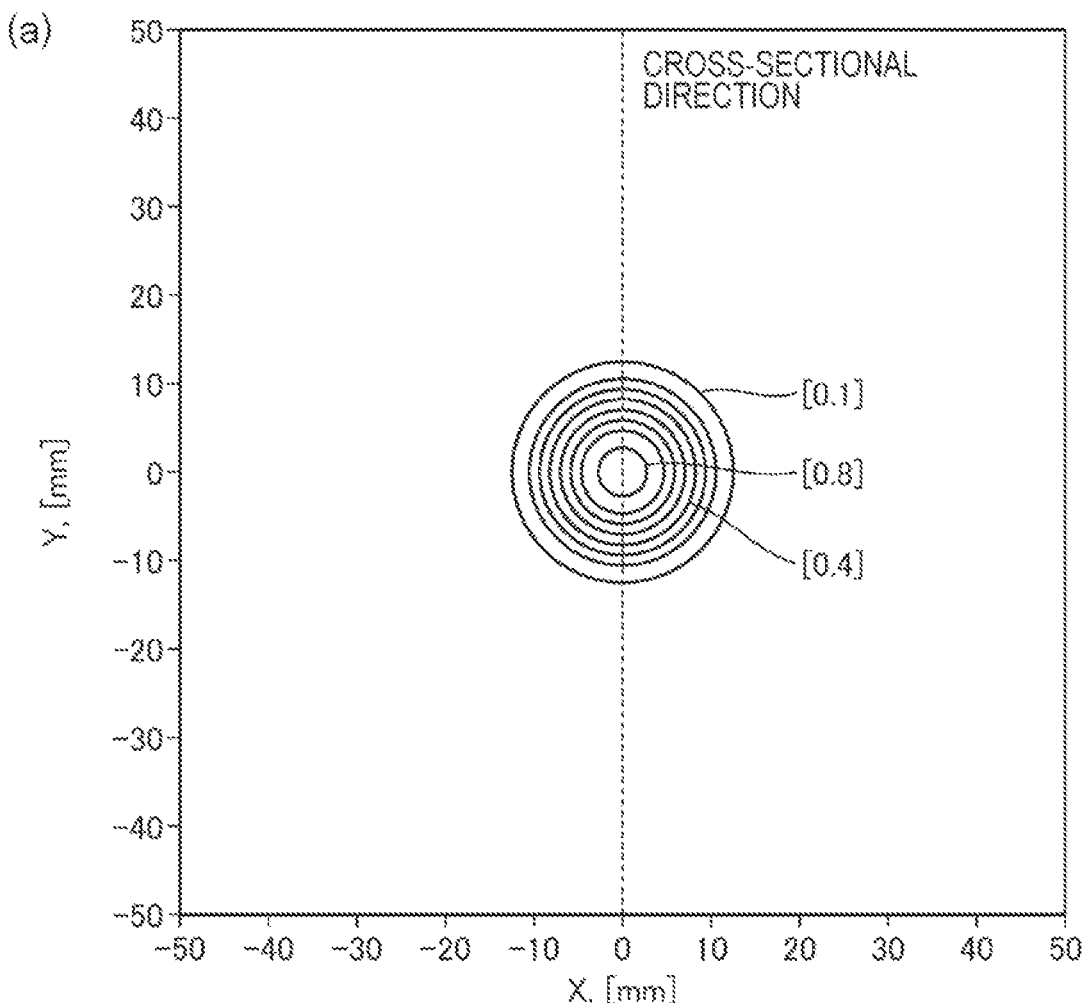
FIG. 13 is a diagram illustrating an example of a simulation result in a case where the first lens group is used in the first specific example.
Figure 13:
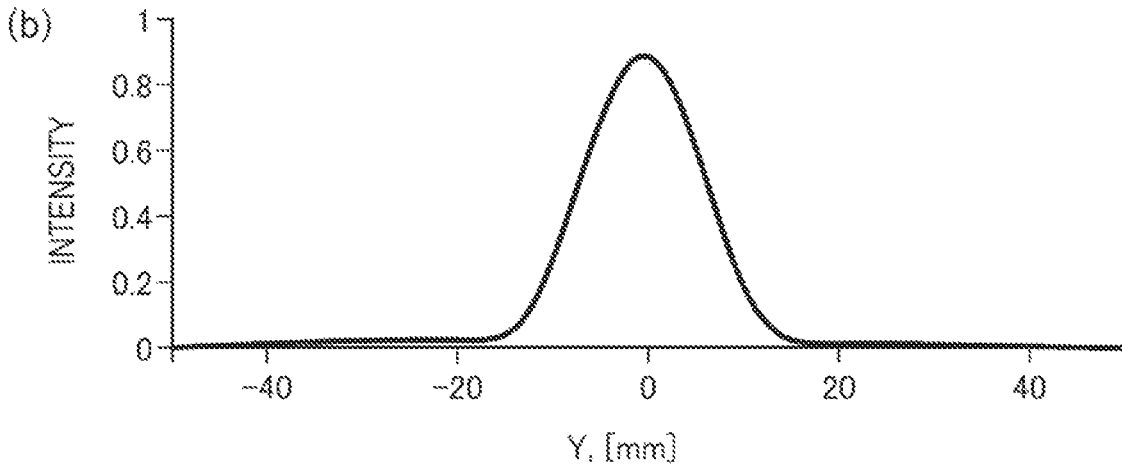

FIG. 13 is a diagram illustrating a simulation calculation result of the spot of the 25th region which is projected 10 m ahead under the configuration of FIG. 7 and the conditions of Tables 3 and 4. Section (a) in FIG. 13 illustrates a spot shape, a size, and a light intensity by using contour lines on an XY coordinate diagram of the light emitting surface. The numerical value in parentheses [ ] indicates the light intensity of each contour line and is normalized to a predetermined value. Section (b) in FIG. 13 illustrates the cross-sectional profile of the light intensity in the Y-axis direction. The beam diameter having an intensity of $1/e^2$ at the center of the spot is approximately 23 [mm] in the X direction and approximately 23 [mm] in the Y direction. As compared with the case of using FIG. 11, Table 1, and Table 2, it can be seen that the light is narrowed to a small region, and the light intensity at the center of the spot is also high.

2-2. First Modification of First Embodiment

Next, a first modification of the first embodiment will be described. The first modification of the first embodiment is an example of further executing correction of the off-axis imaging characteristic of the second lens group G2 as the projection lens with respect to the configuration of the first embodiment. In this correction, the off-axis imaging characteristic of the projection lens 230 is corrected by changing the shape of each concave lens 221 included in the microlens array 220 according to the distance (image height) from the position of the optical axis of the projection lens 230. Hereinafter, unless otherwise specified, "the correction of the off-axis imaging characteristic" will be described as "off-axis correction" or "the correction of the off-axis characteristic".

As a method for realizing a wide visual field for the light projected from the light source unit 200 onto the projection surface, a method of expanding the light source surface by increasing the number of light emitting elements 210 of the light source unit 200 can be considered. In this case, the increase in the area of the light source surface increases the difficulty of lens design for maintaining the off-axis characteristic of the projection lens 230 excellent. Furthermore, in addition to the projection lens 230, the number of lenses configuring the projection lens is also increased in order to improve the imaging characteristic of the peripheral portion of the light source surface of each light emitting element 210. At this time, it is desirable that a surface having a negative refractive power exists in the vicinity of the light emitting element 210. However, when there is a concave lens-shaped lens in the vicinity of the light emitting element 210, there is a possibility that the outer peripheral portion of the lens hits the substrate on which the light emitting element 210 is formed.

In this regard, in the first modification of the first embodiment, the design of the first lens group G1 is changed between a region on the optical axis and in the vicinity of the optical axis (collectively referred to as "on-axis") of the projection lens 230 and a region outside the vicinity of the optical axis (an off-axis region). Therefore, the off-axis characteristic of second lens group G2 can be improved. In the second lens group G2, an image quality is degraded due to off-axis aberration in a portion having a high image height. On the other hand, when the first lens group G1 is designed to correct the off-axis aberration by the first lens group G1, an excellent imaging quality can be secured even at a position with a high image height.

In the first modification of the first embodiment, in each concave lens 221 included in the first lens group G1, the concave lens 221 by a spherical lens is used on the axis. On the other hand, in the first lens group, in the off-axis region, the concave lens 221 which is not a spherical lens is used in accordance with the image height of the projection lens 230. As an example of such a lens, an anamorphic lens can be applied. When two axes of the anamorphic lens are a u axis and a v axis, the u axis and the v axis of the first lens group G1 are aligned with the sagittal direction and the meridional direction of the second lens group G2. By changing curvature radii in a u-axis direction and a v-direction, it is possible to improve the degree of condensing of the spot.

Note that although the anamorphic lens is applied to the off-axis region of the first lens group in the above description, a free-form surface lens may be used for the second lens group in order to enhance the off-axis correction effect.

Figure 14:
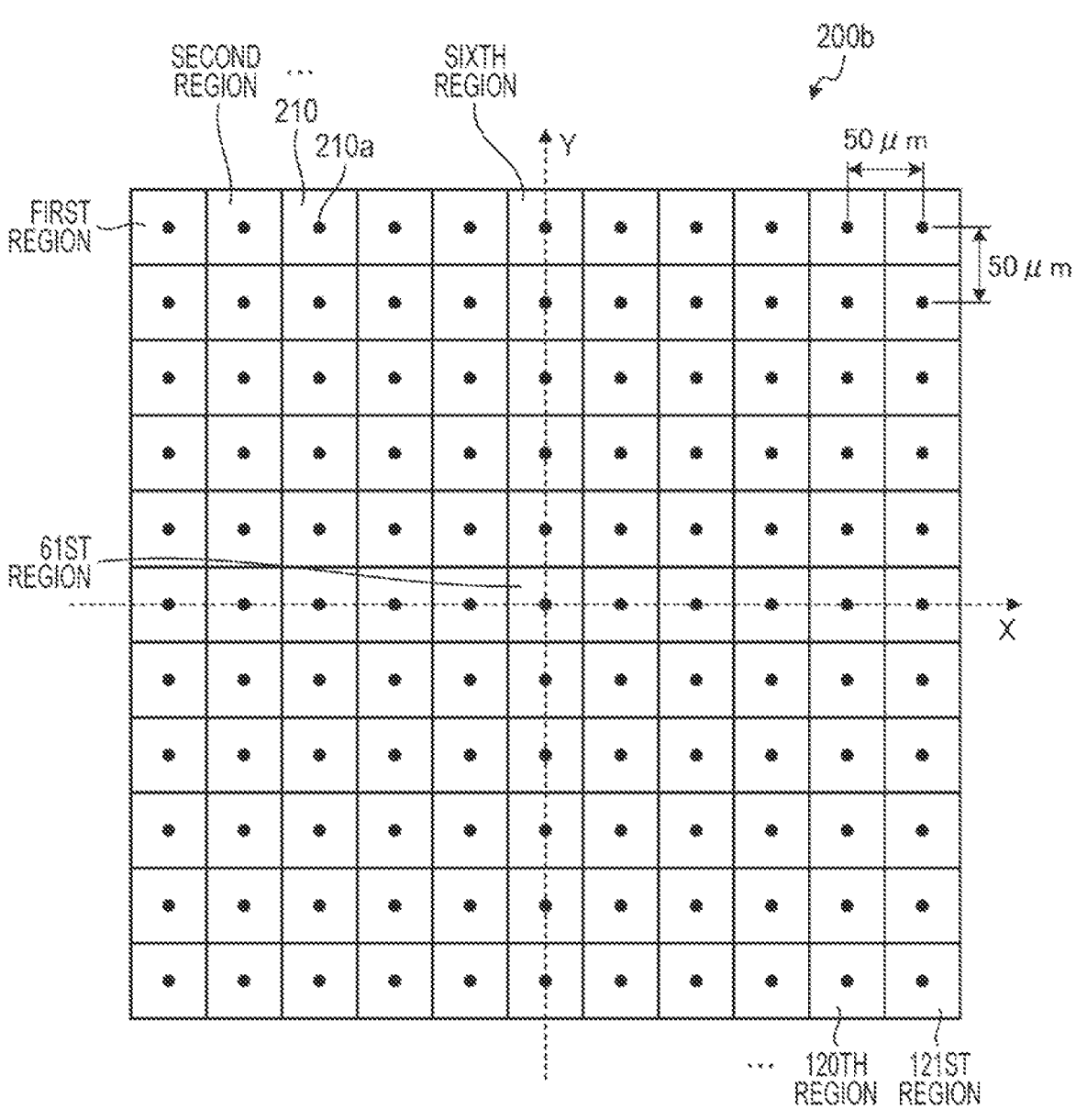
FIG. 14 is a diagram illustrating a configuration example of the light source unit assumed in a modification of the first embodiment.

The first modification of the first embodiment will be described in comparison with an example in which the first lens group is not used. FIG. 14 is a diagram illustrating a configuration example of a light source unit 200b which is assumed in the first modification of the first embodiment and is a VCSEL array.

In FIG. 14, in the light source unit 200b, a total of 121 light emitting elements 210, each of which is the VCSEL, are arranged in an 11×11 arrangement in a square arrangement at intervals of 50 [μm] in length and width. In each light emitting element 210, the upper left corner of the 11×11 array is set as the first region, and thereafter, the second region, . . . , a 120th region, and a 121st region are sequentially numbered. With the light emitting element 210 in the 61st region positioned at the center as an origin, the Z axis is an optical axis, the X axis and the Y axis are included in the plane of the light emitting surface, and the X, Y, and Z axes are orthogonal to each other. In each light emitting element 210, the light emitting unit 210b has a circular shape with a diameter of 8 [μm], and a laser light having a wavelength of 940 [nm] is emitted at a spread angle of NA=0.15 from the light emitting unit 210b.

The light emitting surface of the light source unit 200b is divided into n=121 regions, and one light emitting element 210 (the VCSEL in this example) is included in each region. An arrangement is made such that the coordinates (X, Y) of the first region of the light emitting element 210=(−250, 250) [μm, μm], the coordinates (X, Y) of the second region= (−200, 250) [μm, μm], . . . , the coordinates (X, Y) of the 61st region=(0, 0) [μm, μm], . . . , the coordinates (X, Y) of the 120th region=(200, −250) [μm, μm], and the coordinates (X, Y) of the 121st region=(250, −250) [μm, μm]. In the example of FIG. 14, one light emitting element 210 is arranged in one light source region, but two or more light emitting elements 210 may be included in one light source region.

When a projection angle in the X direction is denoted by θ(H), a projection angle in the Y direction is denoted by θ(V), and a projection angle in the diagonal direction is denoted by θ(D), a dot is projected on the object at a projection angle of (θ(H), θ(V), θ(D))=(53.1, 53.1, 70.5) [deg].

Figure 15:
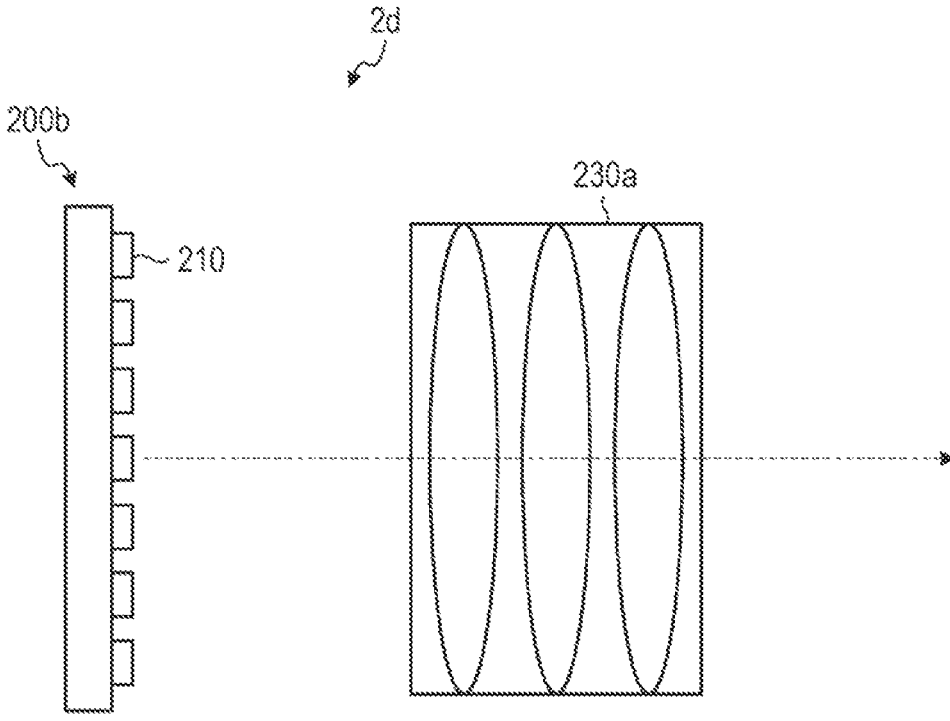
FIG. 15 is a diagram illustrating an example in which only the second lens group is arranged without arranging the first lens group in the modification of the first embodiment.

First, for comparison with the first embodiment, an example of the case of a light source device 2d in which the first lens group G1 is not arranged but only the second lens group G2 (projection lens 230a) is arranged as illustrated in FIG. 15 will be described. In this example, the second lens group G2 is a set of three lenses and the focal length f₂=0.5 [mm]. Note that in FIG. 15, the second lens group G2 is illustrated to include three convex lenses, but this is for the purpose of illustration, and the invention is not limited to this example. Furthermore, it is assumed that the above-described 61st region is on the optical axis of the projection lens 230a.

Table 5 shows the lens data in the configuration of FIG. 15 and Table 6 shows the aspherical coefficients of the lens. Table 5 shows the surface number, the curvature radius R [mm], the thickness [mm], the refractive index nd, and the Abbe number vd for each of the light source surface, the optical surfaces (the first surface to the sixth surface) of the second lens group G2, and the projection surface. Furthermore, Table 2 shows each of the conic coefficient K and aspherical coefficients A4, A6, A8, A10, and A12 for each of the first surface to the sixth surface. A zeroth surface is the light source surface. The light from the light source is brought into a substantially parallel light state by the second lens group G2 and is projected as a spot on the third surface that is the projection surface 10 [m] ahead.

TABLE 5

| Surface/Group | Surface number | R [mm] | d [mm] | nd | vd |
|---|---|---|---|---|---|
| Light source surface | 0 | ∞ | 0.87157 | | |
| G2 | 1 | 1.66776 | 0.3 | 1.661 | 20.4 |
| | 2 | −1.61537 | 0.51038 | | |
| | 3 | 0.91318 | 0.78609 | 1.661 | 20.4 |
| | 4 | −1.92577 | 0.46051 | | |
| | 5 | −0.39981 | 0.3 | 1.661 | 20.4 |
| | 6 | 26.92023 | 10000 | | |
| Projection surface | 7 | ∞ | 0 | | |

TABLE 6

| Surface/Group | First surface | Second surface | Third surface | Fourth surface | Fifth surface | Sixth surface |
|---|---|---|---|---|---|---|
| K | 0 | 0 | 0 | 0 | 0 | 0 |
| A4 | $-0.123454 \times 1$ | $0.961436 \times 10^{-1}$ | $-0.135963 \times 1$ | $-0.809979 \times 10^{-1}$ | $-0.913087 \times 1$ | $-0.494484 \times 1$ |
| A6 | $-0.130343E \times 1$ | $-0.341606 \times 1$ | $-0.536728E \times 1$ | $-0.108100 \times 10^{1}$ | $0.497380 \times 10^{1}$ | $0.210988 \times 10^{1}$ |
| A8 | $-0.126474 \times 10^{1}$ | $0.172892 \times 1$ | $0.748327 \times 1$ | $-0.897326 \times 10^{1}$ | $-0.100000 \times 10^{2}$ | $-0.666618 \times 10^{1}$ |
| A10 | $0.693736 \times 10^{1}$ | $0.103258 \times 10^{-1}$ | $-0.873461 \times 10^{1}$ | $0.597652 \times 10^{2}$ | $-0.100000 \times 10^{3}$ | $0.124103 \times 10^{2}$ |
| A12 | $-0.241810 \times 10^{2}$ | $-0.100000 \times 10^{2}$ | $0.100000 \times 10^{2}$ | $-0.100028 \times 10^{1}$ | $-0.100000 \times 10^{2}$ | $-0.100000 \times 10^{2}$ |

Figure 16:
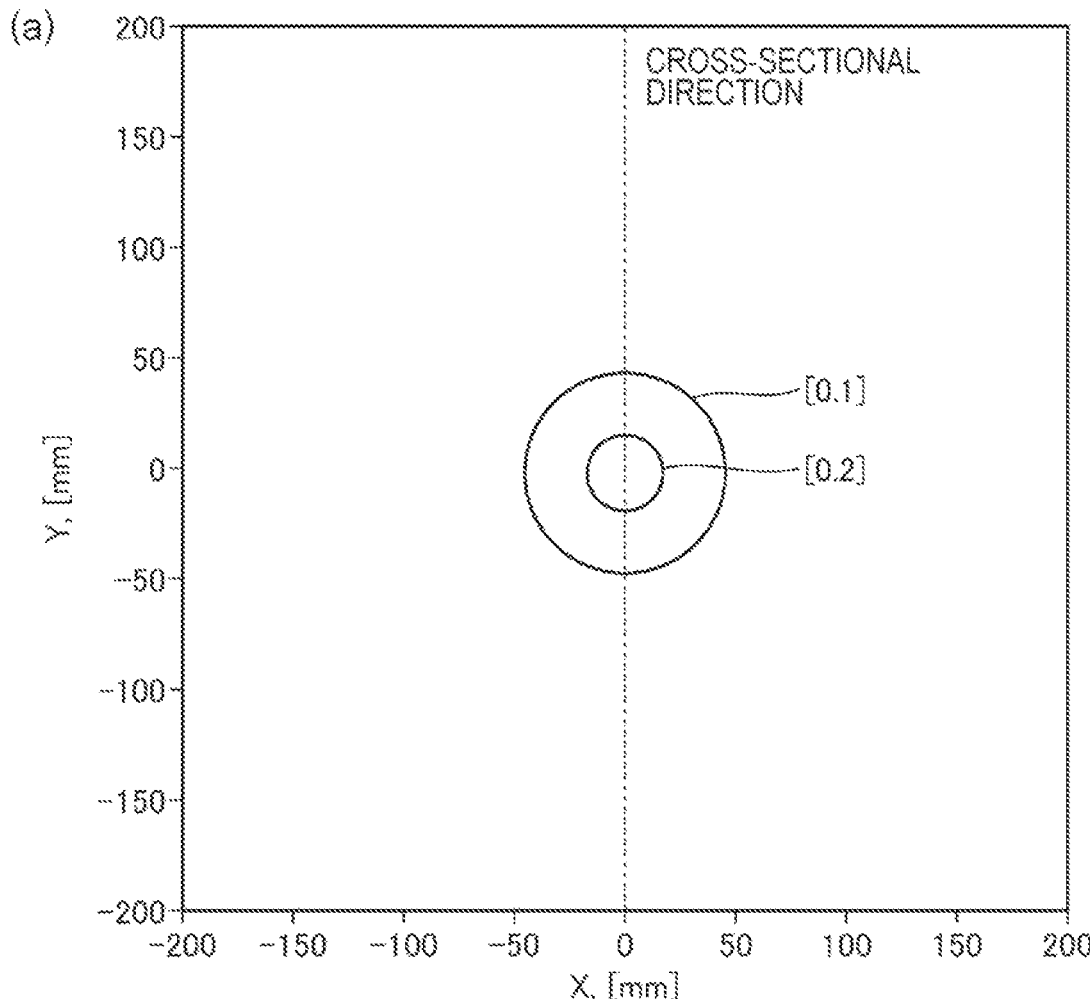
FIG. 16 is a diagram illustrating an example of a simulation result in a case where the first lens group is not used and off-axis correction is not performed in the modification of the first embodiment.
Figure 16:
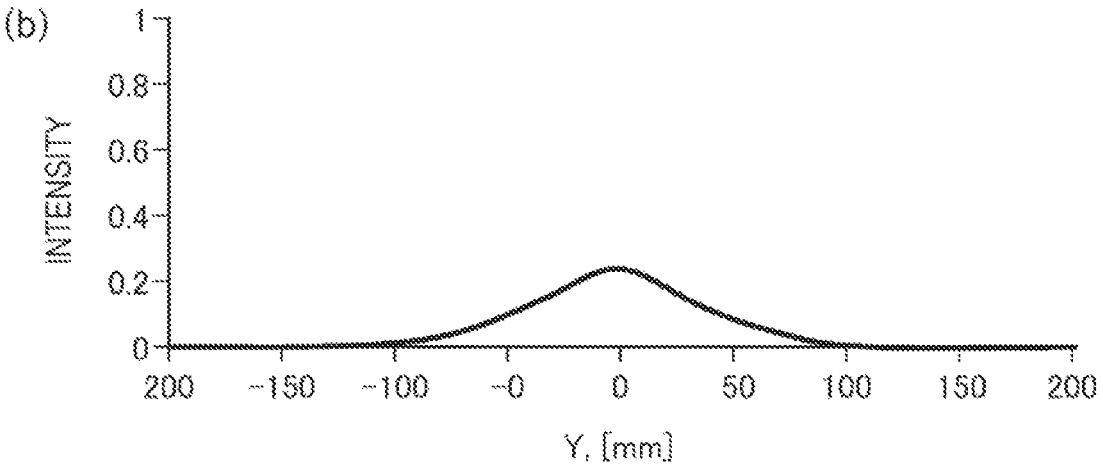

FIG. 16 is a diagram illustrating a simulation calculation result of the spot of the 61st region which is projected 10 m ahead under the configuration of FIG. 15 and the conditions of Tables 5 and 6. Section (a) in FIG. 16 illustrates the spot shape, the size, and the light intensity by using contour lines on the XY coordinate diagram of the light emitting surface. The numerical value in parentheses [ ] indicates the light intensity of each contour line and is normalized to a predetermined value. Section (b) in FIG. 16 illustrates the cross-sectional profile of the light intensity in the Y-axis direction. In Section (b) of FIG. 16 and the following similar diagrams, the vertical axis indicates a predetermined normalized light intensity, and the horizontal axis indicates the position in the Y-axis direction. The beam diameter having an intensity of $1/e^2$ at the center of the spot is approximately 154 [mm] in the X direction and approximately 154 [mm] in the Y direction. Hereinafter, in the same light source region, normalization is performed with the same light intensity.

Figure 17:
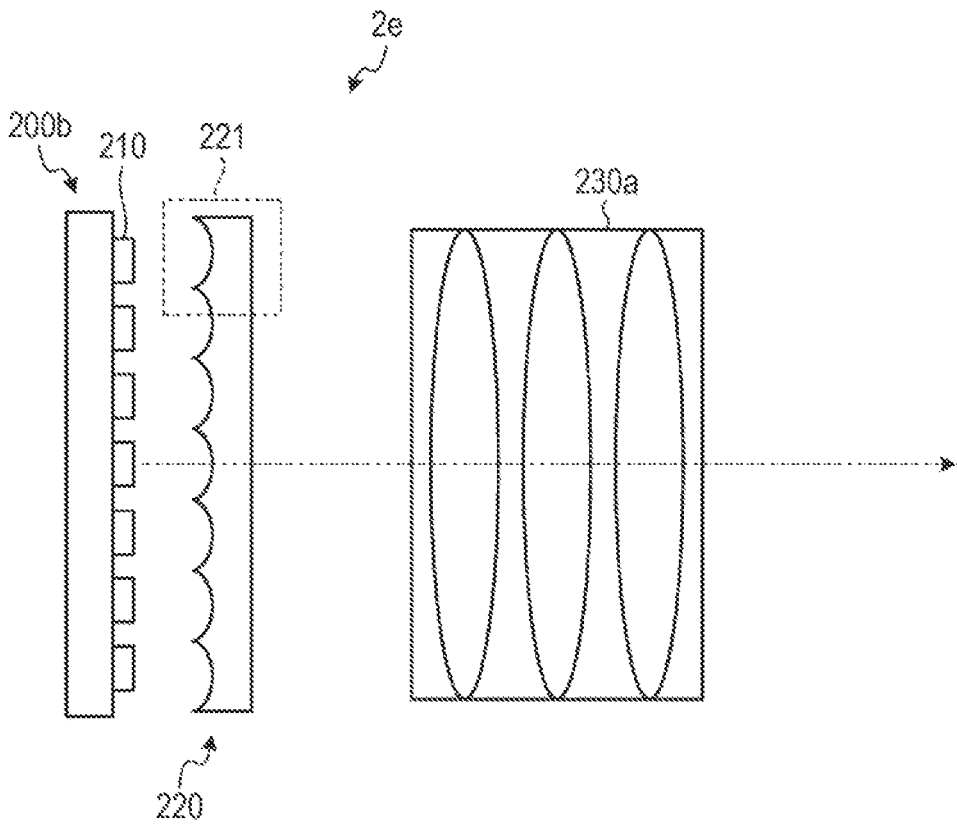
FIG. 17 is a diagram illustrating an example in which the first lens group and the second lens group are arranged in the modification of the first embodiment.

Next, an example of the case of a light source device 2e in which the first lens group (microlens array 220) including the concave lens 221 and the second lens group (projection lens 230a) are arranged as illustrated in FIG. 17 according to the first embodiment will be described.

The first lens group G1 is the microlens array 220 in which the concave lenses 221, which correspond to the light emitting elements 210 on a one-to-one basis and are plano-concave lenses, are arranged in an 11×11 array. The first lens group G1 is arranged such that the concave surface side of each concave lens 221 faces the light emitting element 210 side (VCSEL side). Each concave lens 221 included in the first lens group G1 has the focal length $f_1 = -0.05$ [mm] (<0) and has a negative refractive power. The composite focal length f of each concave lens 221 of the first lens group G1 and the second lens group G2 (projection lens 230a) is 0.85 [mm], and the focal length magnification factor k is 1.7.

Table 7 and Table 8 show the lens data in the configuration of FIG. 17, and Table 9 shows the aspherical coefficients in the lens of Table 7. Table 7 corresponds to the 61st region in FIG. 14 and has a meaning similar to Table 5 described above, and the data of the first lens group G1 is added. Table 8 corresponds to the sixth region in FIG. 14 and is an example in which the off-axis correction is performed using an anamorphic lens. The meaning of Table 8 is substantially similar to that of Table 7, and the curvature radius on each of the u axis and the v axis is shown. Furthermore, Table 9 is similar to Table 6 described above, and thus the description thereof is omitted here.

TABLE 7

| Surface/Group | Surface number | R [mm] | d [mm] | nd | vd |
|---|---|---|---|---|---|
| Light source surface | 0 | ∞ | 0.035 | | |
| G1 | 1 | −0.02256 | 0.2 | 1.458 | 65.4 |
| | 2 | ∞ | 0.71317 | | |
| G2 | 3 | 1.66776 | 0.3 | 1.661 | 20.4 |
| | 4 | −1.61537 | 0.51038 | | |
| | 5 | 0.91318 | 0.78609 | 1.661 | 20.4 |
| | 6 | −1.92577 | 0.46051 | | |
| | 7 | −0.39981 | 0.3 | 1.661 | 20.4 |
| | 8 | 26.92023 | 10000 | | |
| Projection surface | 9 | ∞ | 0 | | |

TABLE 8

| Surface/Group | Surface number | R [mm] | d [mm] | nd | vd |
|---|---|---|---|---|---|
| Light source surface | 0 | ∞ | 0.035 | | |
| G1 | 1 | u Axis: −0.02256 v Axis: −0.01513 | 0.2 | 1.458 | 65.4 |
| | 2 | ∞ | 0.71317 | | |
| G2 | 3 | 1.66776 | 0.3 | 1.661 | 20.4 |
| | 4 | −1.61537 | 0.51038 | | |
| | 5 | 0.91318 | 0.78609 | 1.661 | 20.4 |
| | 6 | −1.92577 | 0.46051 | | |
| | 7 | −0.39981 | 0.3 | 1.661 | 20.4 |
| | 8 | 26.92023 | 10000 | | |
| Projection surface | 9 | ∞ | 0 | | |

TABLE 9

| Surface/Group | First surface | Second surface | Third surface | Fourth surface | Fifth surface | Sixth surface |
|---|---|---|---|---|---|---|
| K | 0 | 0 | 0 | 0 | 0 | 0 |
| A4 | $-0.123454 \times 1$ | $0.961436 \times 10^{-1}$ | $-0.135963 \times 1$ | $-0.809979 \times 10^{-1}$ | $-0.913087 \times 1$ | $-0.494484 \times 1$ |
| A6 | $-0.130343E \times 1$ | $-0.341606 \times 1$ | $-0.536728E \times 1$ | $-0.108100 \times 10^{1}$ | $0.497380 \times 10^{1}$ | $0.210988 \times 10^{1}$ |
| A8 | $-0.126474 \times 10^{1}$ | $0.172892 \times 1$ | $0.748327 \times 1$ | $-0.897326 \times 10^{1}$ | $-0.100000 \times 10^{2}$ | $-0.666618 \times 10^{1}$ |
| A10 | $0.693736 \times 10^{1}$ | $0.103258 \times 10^{-1}$ | $-0.873461 \times 10^{1}$ | $0.597652 \times 10^{2}$ | $-0.100000 \times 10^{3}$ | $0.124103 \times 10^{2}$ |
| A12 | $-0.241810 \times 10^{2}$ | $-0.100000 \times 10^{2}$ | $0.100000 \times 10^{2}$ | $-0.100028 \times 10^{1}$ | $-0.100000 \times 10^{2}$ | $-0.100000 \times 10^{2}$ |

Figure 18:
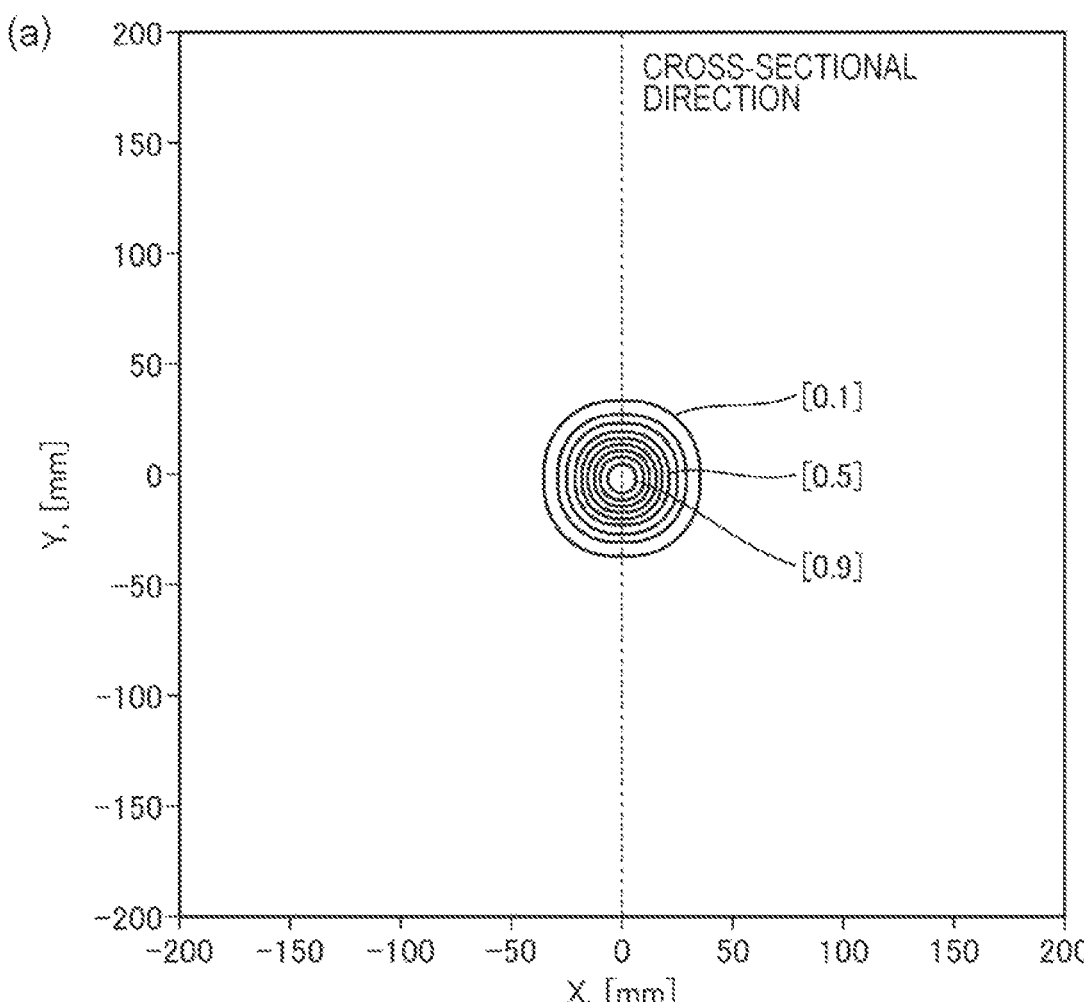
FIG. 18 is a diagram illustrating an example of a simulation result in a case where the first lens group is used in the modification of the first embodiment.
Figure 18:
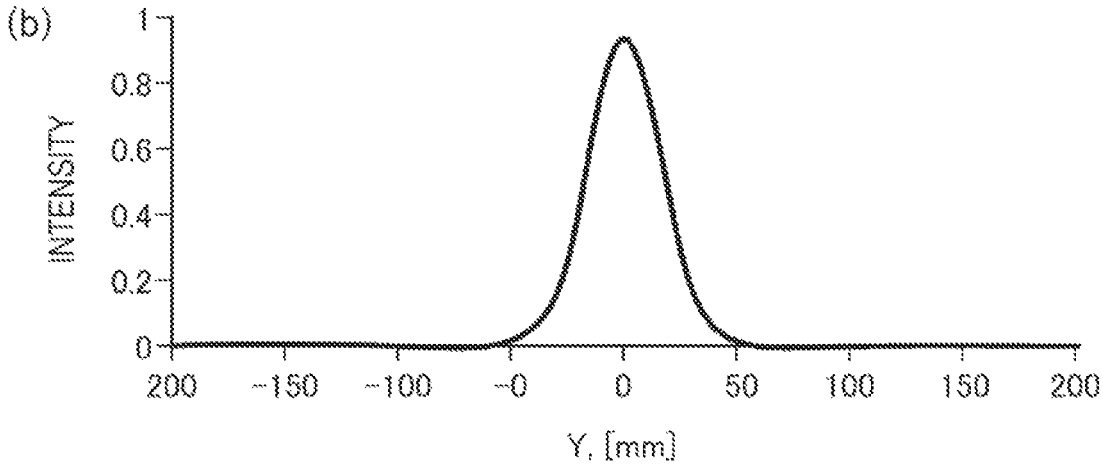

FIG. 18 is a diagram illustrating a simulation calculation result of the spot of the 61st region which is projected 10 m ahead under the configuration of FIG. 17 and the conditions of Tables 7 and 9. Section (a) in FIG. 18 illustrates the spot shape, the size, and the light intensity by using contour lines on the XY coordinate diagram of the light emitting surface. The numerical value in parentheses [ ] indicates the light intensity of each contour line and is normalized to a predetermined value. Section (b) in FIG. 18 illustrates the cross-sectional profile of the light intensity in the Y-axis direction. The beam diameter having an intensity of $1/e^2$ at the center of the spot is approximately 62 [mm] in the X direction and approximately 62 [mm] in the Y direction. As compared with the case of using FIG. 15, Table 5, and Table 6, it can be seen that the light is narrowed to a small region, and the light intensity at the center of the spot is also high.

Next, a simulation calculation result in the sixth region which is the off-axis region will be described. First, for comparison with the first embodiment, an example in which the first lens group G1 is not arranged but only the second lens group G2 (projection lens 230a) is arranged as illustrated in FIG. 15 described above will be described.

Figure 19:
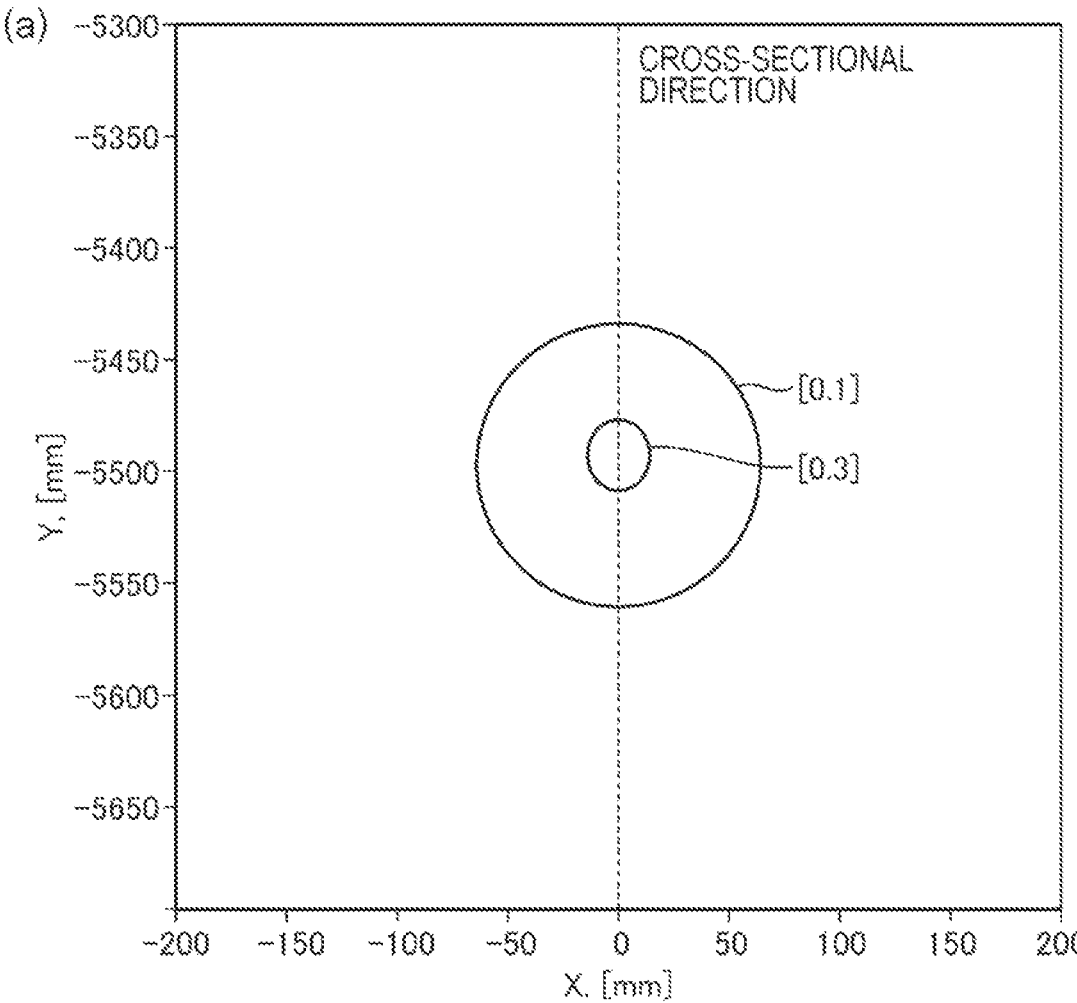
FIG. 19 is a diagram illustrating an example of a simulation result in an off-axis region in a case where the first lens group is not used in the modification of the first embodiment.
Figure 19:
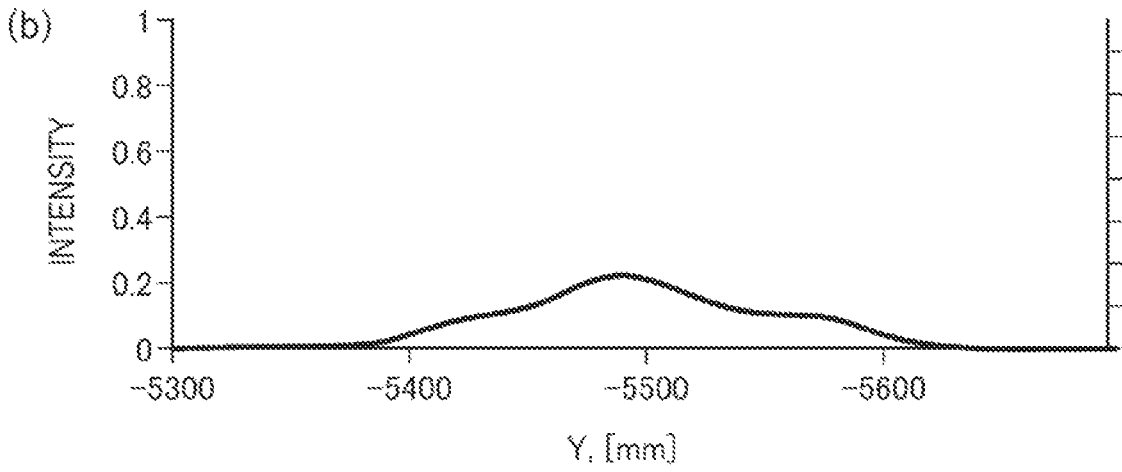

FIG. 19 is a diagram illustrating a simulation calculation result of the spot of the sixth region which is projected 10 m ahead in the configuration of FIG. 15. Note that in this example, it is assumed that the off-axis correction is not performed. Section (a) in FIG. 19 illustrates the spot shape, the size, and the light intensity by using contour lines on the XY coordinate diagram of the light emitting surface. The numerical value in parentheses [ ] indicates the light intensity of each contour line and is normalized to a predetermined value. Section (b) of FIG. 19 illustrates a cross-sectional profile of the light intensity. The beam diameter having an intensity of $1/e^2$ at the center of the spot is approximately 175 [mm] in the X direction and approximately 208 [mm] in the Y direction.

Next, an example of the simulation result in the sixth region in a case where the first lens group (microlens array 220) including the concave lens 221 and the second lens group (projection lens 230a) are arranged as illustrated in FIG. 17 described above will be described.

Figure 20:
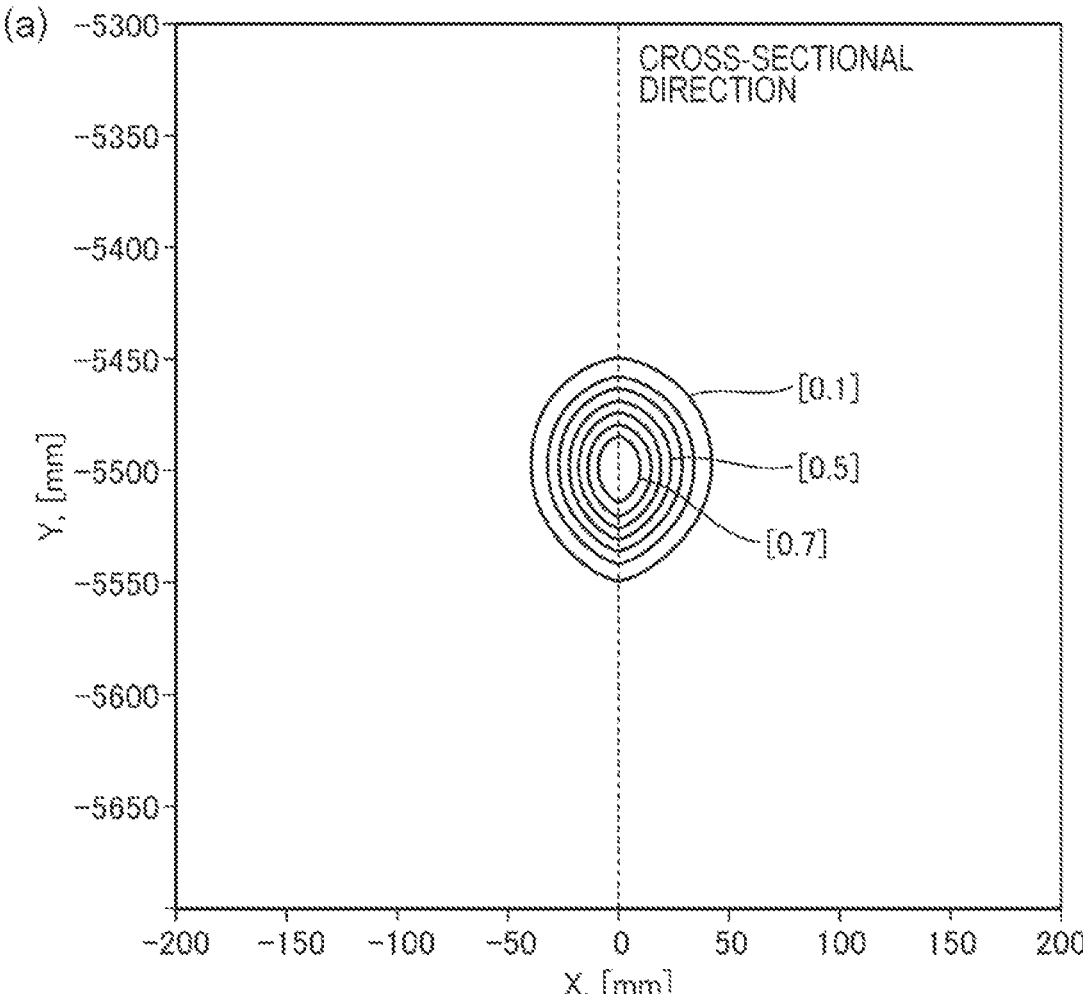
FIG. 20 is a diagram illustrating an example of a simulation result in the off-axis region in a case where the first lens group is used in the modification of the first embodiment.
Figure 20:
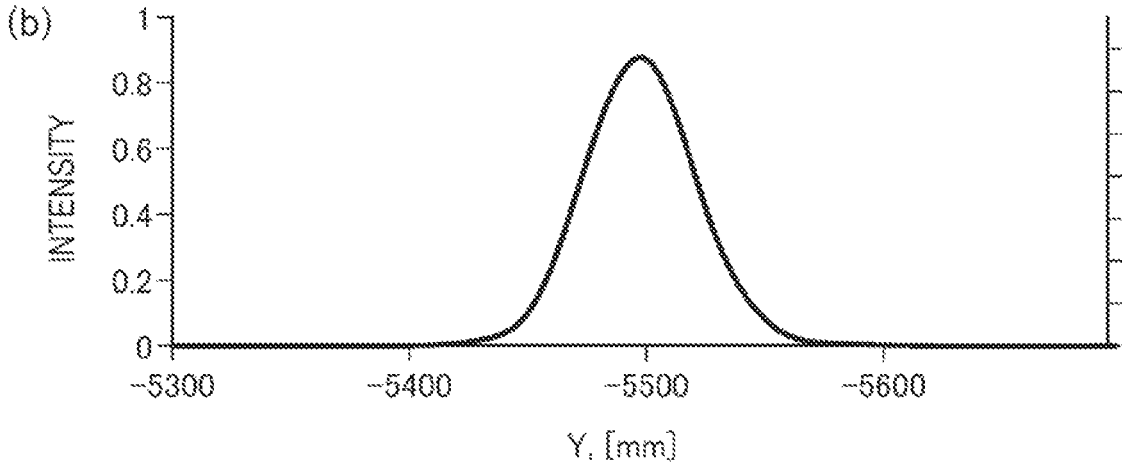

FIG. 20 is a diagram illustrating a simulation calculation result of the spot of the sixth region which is projected 10 m ahead in the configuration of FIG. 17. Note that in this example, it is assumed that the off-axis correction is not performed. Section (a) in FIG. 20 illustrates the spot shape, the size, and the light intensity by using contour lines on the XY coordinate diagram of the light emitting surface. The numerical value in parentheses [ ] indicates the light intensity of each contour line and is normalized to a predetermined value. Section (b) in FIG. 20 illustrates the cross-sectional profile of the light intensity in the Y-axis direction. The beam diameter having an intensity of $1/e^2$ at the center of the spot is approximately 74 [mm] in the X direction and approximately 92 [mm] in the Y direction. As compared with the case of using FIG. 15, it can be seen that the light is narrowed to a small region and the light intensity at the center of the spot is also high. On the other hand, according to Section (a) of FIG. 20, the ratio of the beam diameters in the X-axis direction and the Y-axis direction is about 4:5, and it can be seen that the spot is distorted in the Y-axis direction.

Next, the description will be given about an example of the simulation result in the sixth region in a case where the first lens group (microlens array 220) including the concave lens 221 and the second lens group (projection lens 230a) are arranged as illustrated in FIG. 17 described above, and the first surface of the first lens group is subjected to the off-axis correction by using an anamorphic shape as shown in Table 8.

Figure 21:
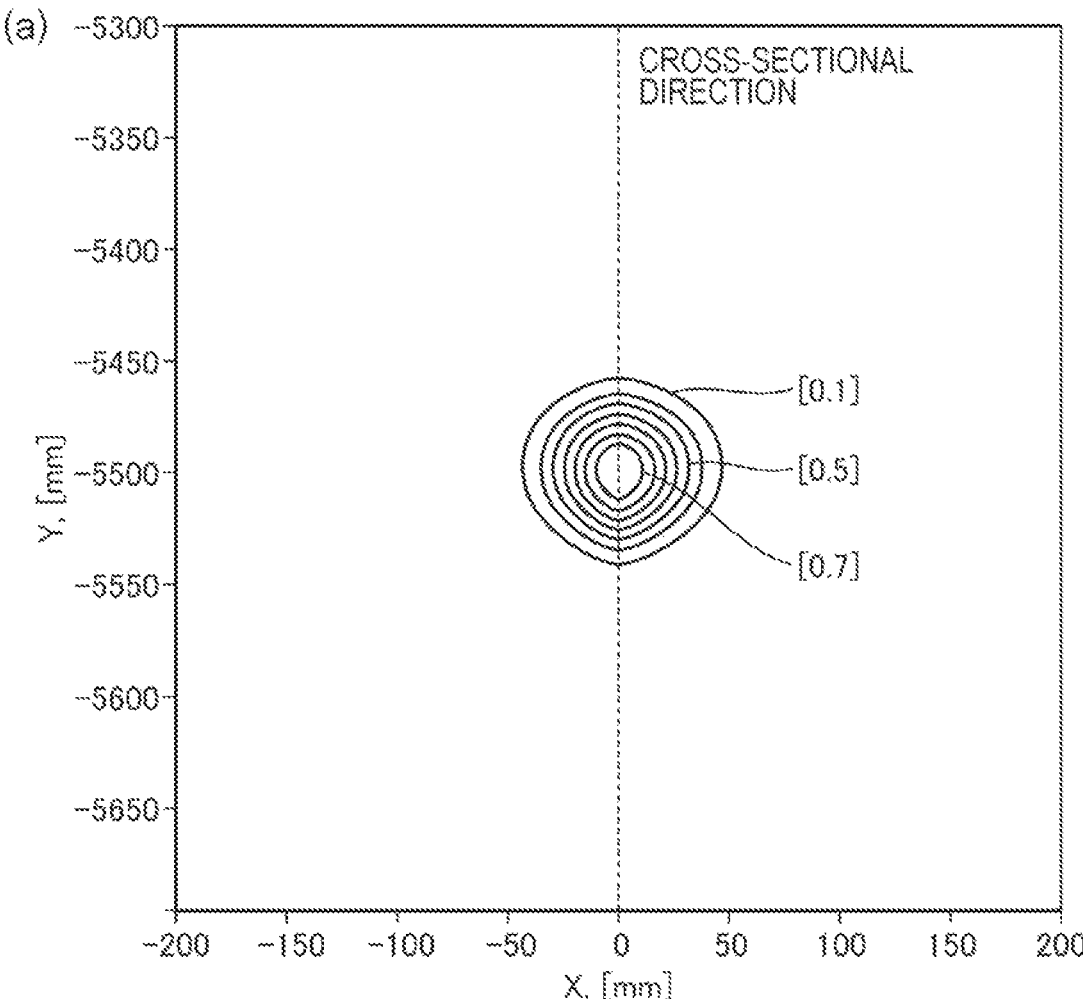
FIG. 21 is a diagram illustrating an example of a simulation result in the off-axis region in a case where the first lens group is used and the off-axis correction is performed in the modification of the first embodiment.
Figure 21:
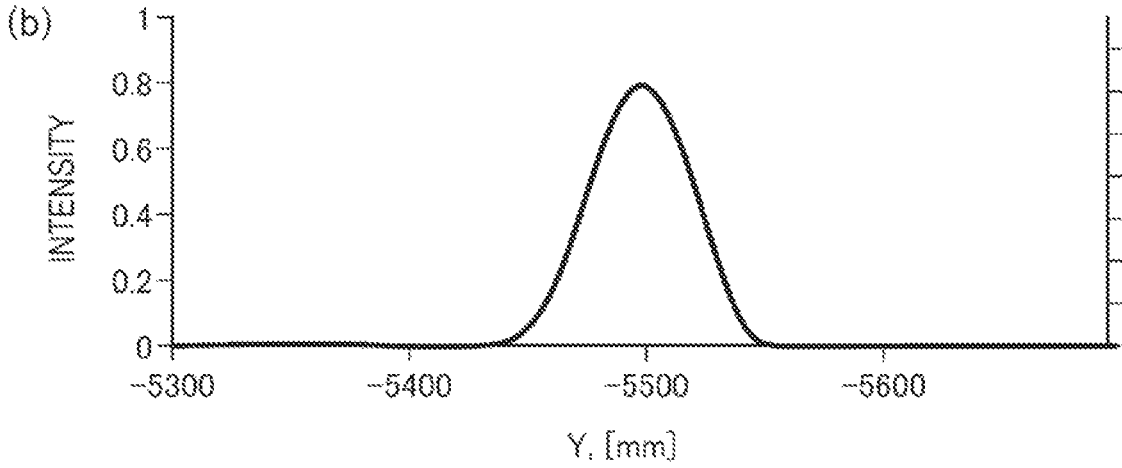

FIG. 21 is a diagram illustrating a simulation calculation result of the spot of the sixth region which is projected 10 m ahead in the configuration of FIG. 17. Section (a) in FIG. 21 illustrates the spot shape, the size, and the light intensity by using contour lines on the XY coordinate diagram of the light emitting surface. The numerical value in parentheses [ ] indicates the light intensity of each contour line and is normalized to a predetermined value. Section (b) in FIG. 21 illustrates the cross-sectional profile of the light intensity in the Y-axis direction. The beam diameter having an intensity of $1/e^2$ at the center of the spot is approximately 86 [mm] in the X direction and approximately 80 [mm] in the Y direction. As compared with the case of using FIG. 15, it can be seen that the light is narrowed to a small region. Moreover, according to Section (a) of FIG. 21, the ratio of the beam diameters in the X-axis direction and the Y-axis direction is about 9:8, and it can be seen that the distortion of the spot in the Y-axis direction in Section (a) of FIG. 20 is improved.

As described above, when the shape of each concave lens 221 included in the microlens array 220 is corrected according to the distance (image height) from the optical axis of the projection lens 230a, it is possible to reduce the distortion of the spot due to the laser light emitted from the region having a high image height. Therefore, therefore, by using the light source device 2 according to the first embodiment, it is possible to perform distance measurement with higher accuracy.

2-3. Second Modification of First Embodiment

Figure 22:
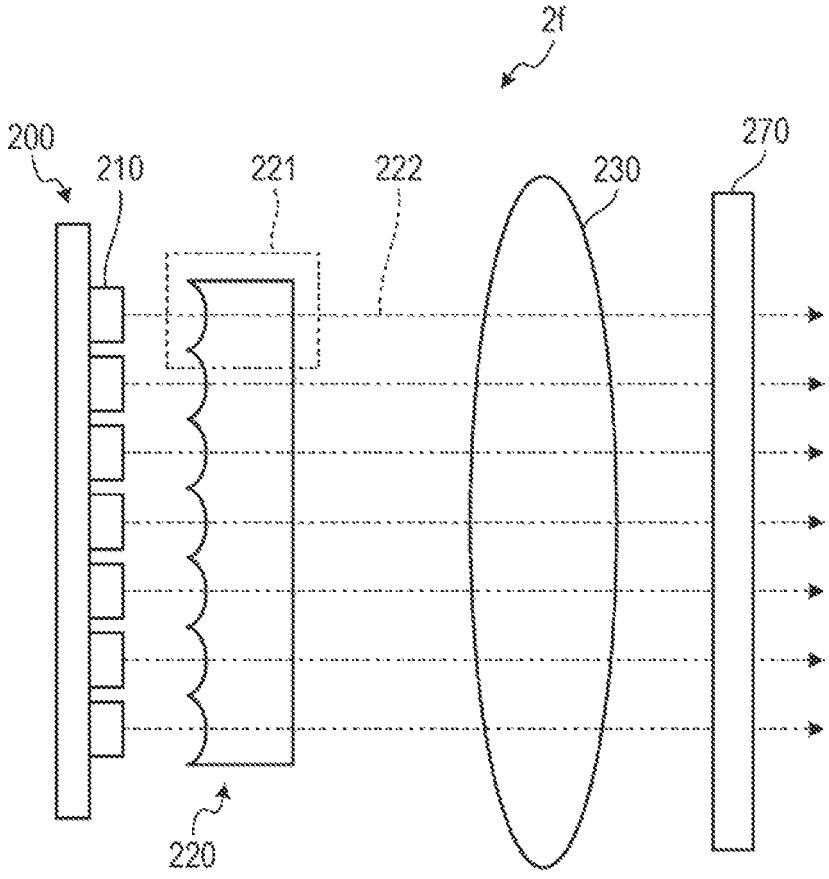
FIG. 22 is a schematic diagram illustrating a configuration of an example of the light source device according to a second modification of the first embodiment.

Next, a second modification of the first embodiment will be described. FIG. 22 is a schematic diagram illustrating a configuration of an example of a light source device according to the second modification of the first embodiment. In FIG. 22, in a light source device 2f according to the second modification of the first embodiment, a DOE 270 is added as a second optical element on the emission side of the projection lens 230 to the light source device 2 according to the first embodiment illustrated in FIG. 7. The DOE 270 projects a plurality of zeroth-order projection images formed by the microlens array 220 and the projection lens 230 side by side in a projection field.

As described above, even in a case where the DOE 270 is used, the concave lens 221 is used for the first lens group to suppress the increase in the beam diameter and emit the laser light without narrowing the spot interval, so that the projection image by the DOE 270 can be made clearer. Therefore, by using the light source device 2b according to the second modification of the first embodiment, a wide projection angle can be realized while maintaining the distance measurement performance in a long distance.

3. Second Embodiment

Next, a second embodiment of the present disclosure will be described. In the description of the first embodiment and the modifications thereof described above, the light source unit 200 and the first lens group (microlens array 220) are provided to be separated from each other. On the other hand, in the second embodiment, the light source unit 200 and the first lens group are brought into close contact with each other.

For example, referring to FIG. 7, the microlens array 220 as the first lens group is arranged such that the plane side of each concave lens 221 as the plano-concave lens faces the light source unit 200. In this state, a medium layer filled with a material having a refractive index substantially equal to that of the concave lens 221, for example, is provided between the microlens array 220 and the light source unit 200 without an air layer interposed between the medium layer and the light source unit 200. Then, a boundary surface of the microlens array 220 on a side far from the light emitting surface of the light source unit 200 has a negative refractive power.

When the microlens array 220 (first lens group) is formed directly on the light source unit 200 without interposing an air layer, the following advantages can be obtained. That is, the microlens array 220 can be formed in the semiconductor process of forming the light source unit 200. Therefore, each concave lens 221 can be arranged with high accuracy with respect to each light emitting element 210. In a case where the laser light emitted from a two-dimensional array such as the VCSEL array is projected, a spot may deteriorate at a position with a high image height due to the coma aberration or field curvature of the optical system. In the second embodiment, a lens having a negative refractive power for correcting the off-axis characteristic of the projection lens 230 is directly formed on the VCSEL array (light source unit 200). When the lens having a negative refractive power in which the shape of the optical surface is optimized according to the image height is arranged on the light source unit 200 without interposing the air layer, it is possible to more effectively perform the off-axis correction.

In general, when the distance from the light emitting unit 210a increases, the beam shape spreads, the overlap between the on-axis light flux and the off-axis light flux increases, and the on-axis and off-axis correction effects on the lens decrease. On the other hand, in the optical surface at a position close to the light source unit 200, the on-axis light flux and the off-axis light flux are separated with less overlap, and thus there is an advantage that off-axis aberration can be more easily corrected.

Furthermore, when the microlens array 220 is brought into close contact with the light source unit 200, it is possible to reduce the contact of wire bonds provided near the light source unit 200 with the microlens array 220.

Moreover, when the microlens array 220 is formed integrally with the light source unit 200, a configuration such as a lens holder for holding the microlens array 220 becomes unnecessary, and effects of reducing the number of components and cost can also be obtained.

Furthermore, when lenses having a negative refractive power are provided on a one-to-one basis with respect to the plurality of light emitting elements 210, the off-axis characteristic can be improved. That is, the influence of the off-axis aberration may be different between the on-axis region and the off-axis region (a region having a high image height). In such a case, the characteristic of the lens is changed between the off-axis region and the on-axis region, so that the off-axis aberration can be appropriately corrected for each of the off-axis region and the on-axis region.

4. Third Embodiment

Next, a third embodiment of the present disclosure will be described. The third embodiment is an example in which the first lens group is formed by processing a substrate on which each light emitting element is formed in the light source unit. Note that in the following description, it is assumed that the first lens group includes one concave lens.

Figure 23:
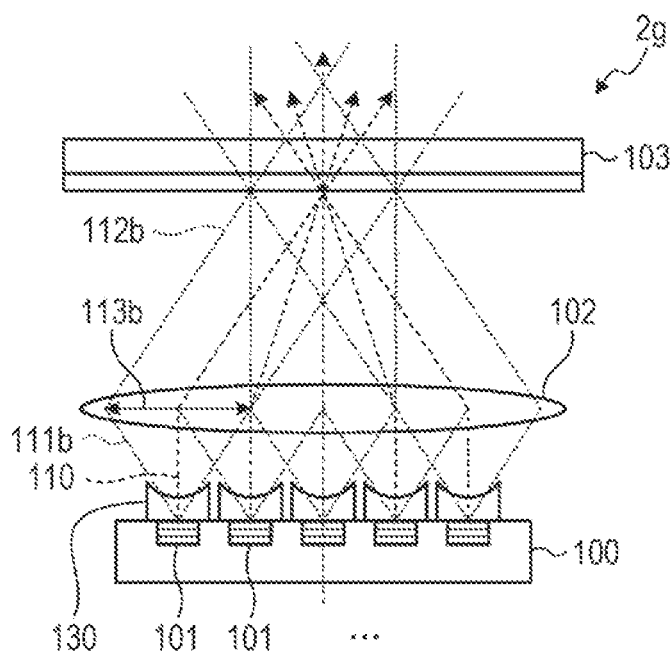
FIG. 23 is a schematic diagram illustrating a configuration of an example of a light source device according to a third embodiment.

FIG. 23 is a schematic diagram illustrating a configuration of an example of a light source device according to the third embodiment. Here, FIG. 23 is a diagram corresponding to FIG. 4 described above, and the portions corresponding to FIG. 4 are denoted by the same reference signs, and a detailed description thereof is omitted. In a light source device 2g illustrated in FIG. 23, each concave lens 130, which is the first lens group, is provided on a one-to-one basis with respect to each light emitting element 101 included in the VCSEL array 100. At this time, as will be described in detail later, each concave lens 130 is provided by processing a substrate on which the light emitting element 101 is formed in the VCSEL array 100.

Note that hereinafter, a length of a perpendicular drawn from a plane including the peripheral edge of the concave lens 130 to a position where the thickness of the concave lens 130 is thinnest is referred to as a depth of the concave lens 130. Furthermore, in the plane including the peripheral edge of the concave lens 130, the inside of the peripheral edge of the plane is referred to as a lens region.

Each laser light generated and emitted by each light emitting element 101 is incident on each concave lens 130. The laser light incident on the concave lens 130 is diverged when being emitted from concave lens 130 and is emitted as a laser light 111b of which the projection range expands at a short distance from concave lens 130. The laser light 111b emitted from the concave lens 130 enters the projection lens 102, which is a collimator lens, for example, and becomes a collimated beam 112b of substantially parallel light to be incident on the DOE 103.

Here, the laser light emitted from each light emitting element 101 is incident on the projection lens 102 via the concave lens 130 with a beam diameter 113b. At this time, the laser light 111b emitted from the concave lens 130 diverges according to the characteristic of the concave lens 130. Therefore, at the position of the projection lens 102, the beam diameter 113b having a size equal to the beam diameter 113a in FIG. 4 can be obtained at a distance shorter than the distance from the light emitting element 101 according to the existing technology illustrated in FIG. 4 to the projection lens 102.

Figure 24:
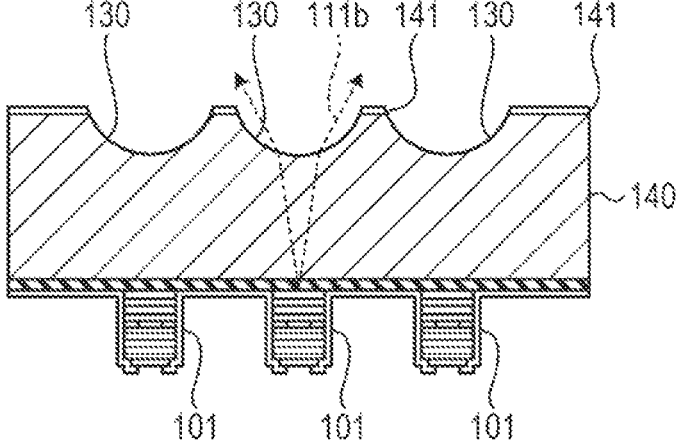
FIG. 24 is a cross-sectional view more specifically illustrating a configuration of the light source device according to the third embodiment.

FIG. 24 is a cross-sectional view more specifically illustrating a configuration of the light source device according to the third embodiment. Note that in FIG. 24, the projection lens 102 and the DOE 103 are omitted. In FIG. 24, when the emission side of the laser light 111*b* is a front surface (second surface), each light emitting element 101 is formed on the back surface side (first surface) of the substrate 140 including GaAs (gallium arsenide). That is, the laser light generated by each light emitting element 101 passes through the substrate 140 and is emitted as the laser light 111*b*. Note that the structures of the substrate 140 and the light emitting element 101 will be described later in detail.

The concave lens 130 is formed on the surface (second surface) of the substrate 140. The concave lens 130 is formed by processing the surface of the substrate 140 from the surface and non-planarizing the surface of the substrate 140. More specifically, the concave lens 130 is provided by forming a concave portion corresponding to the shape of the concave lens 130 on the surface of the substrate 140. The concave lens 130 is provided at a position corresponding to each light emitting element 101 on a one-to-one basis with respect to each light emitting element 101.

Furthermore, in the example of FIG. 24, a functional film 141 including at least one of an inorganic material or an organic material is provided in a region other than the lens region of the concave lens 130 in the entire region on the surface of the substrate 140. A method of forming the concave lens 130 on the substrate 140 and the details of the functional film 141 will be described later.

Figure 25:
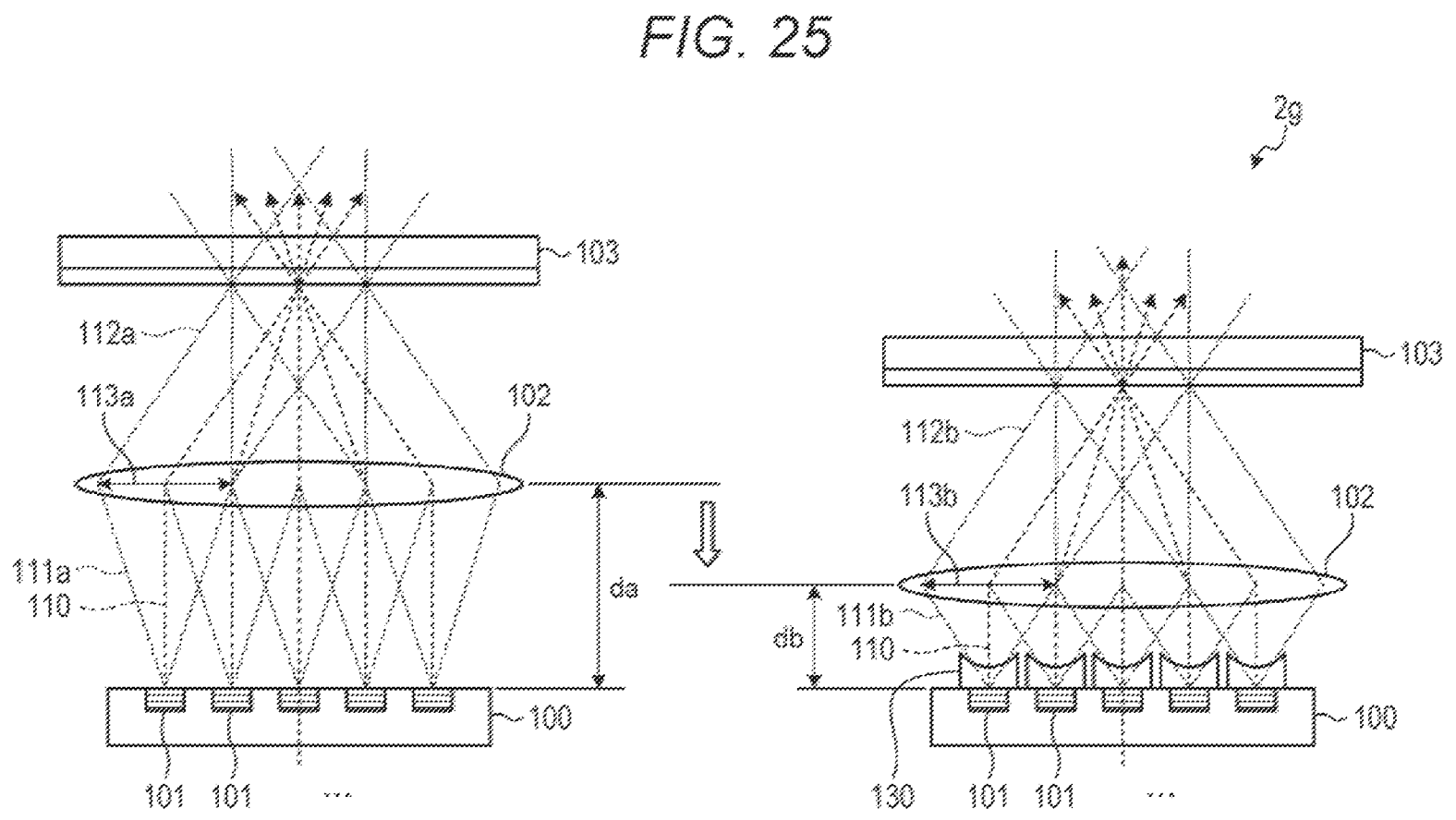

FIG. 25 is a diagram for comparing the light source device according to the existing technology illustrated in FIG. 4 with the light source device 2*g* according to the third embodiment illustrated in FIG. 24. The left example of FIG. 25 corresponds to the configuration of FIG. 4, and the right example corresponds to the configuration of FIG. 24. In the example of the existing technology on the left side, the beam diameter 113*a* is obtained at the position of the projection lens 102 at a distance da from the light emitting element 101 to the projection lens 102. On the other hand, in the example according to the third embodiment on the right side, the beam diameter 113*b* having the same diameter as the beam diameter 113*a* is obtained at the position of the projection lens 102 at the distance db from the light emitting element 101 to the projection lens 102.

In the example according to the third embodiment, as described above, the laser light generated by the light emitting element 101 is diverged and emitted by the concave lens 130, and thus the beam diameter 113*b* can be obtained at the distance db shorter than the distance da. Therefore, in the light source device 2*g* according to the third embodiment, height reduction can be achieved corresponding to the difference between the distance da and the distance db with respect to the light source device according to the existing technology illustrated in FIG. 4. Furthermore, in the light source device 2*g* according to the third embodiment, the height reduction is realized by the concave lens 130 formed on the surface of the substrate 140 on which the light emitting element 101 is provided. Therefore, it is possible to suppress the number of components as compared with the configuration of the existing technology that realizes a long distance of an optical path by using a folding mirror, a prism, or the like.

That is, in the existing technology, it is required to cause a beam to be incident on the DOE with a beam diameter of a certain value or more, and thus, it is necessary to provide a certain distance or more from the light source to the collimation position. That is, a space having a certain size is required between the light source and the projection lens, and this space affects the height reduction of the light source module. In this regard, in order to reduce the height of the light source module, for example, a configuration has been proposed in which the light source is arranged sideways with respect to the optical axis of the projection lens, and a beam is incident on the projection lens by changing the direction of the beam by using a folding mirror or a prism, thereby realizing the long distance of the optical path. However, this configuration has a problem that the number of components increases. As described above, according to the third embodiment, this problem can be solved.

The distance measuring device 1 as the electronic apparatus according to the present disclosure can be applied to an apparatus that performs distance measurement by the above-described direct ToF method. Furthermore, the distance measuring device 1 according to the present disclosure can also be applied to an apparatus which projects a light source light (for example, a laser light in an infrared region) modulated by, for example, pulse width modulation (PWM) onto an object, receives the reflected light by a light receiving element, and performs distance measurement by an indirect ToF method which measures a distance to the object on the basis of a phase difference in the received reflected light. Moreover, the distance measuring device 1 according to the present disclosure can be applied to a structured light by using the projection pattern by the DOE 103.

4-1. Creation Method According to Third Embodiment

Next, a method of creating the concave lens 130 in the light source device according to the third embodiment will be described. First, in order to facilitate understanding, the structure of the VCSEL array 100 will be described.

Figure 26:
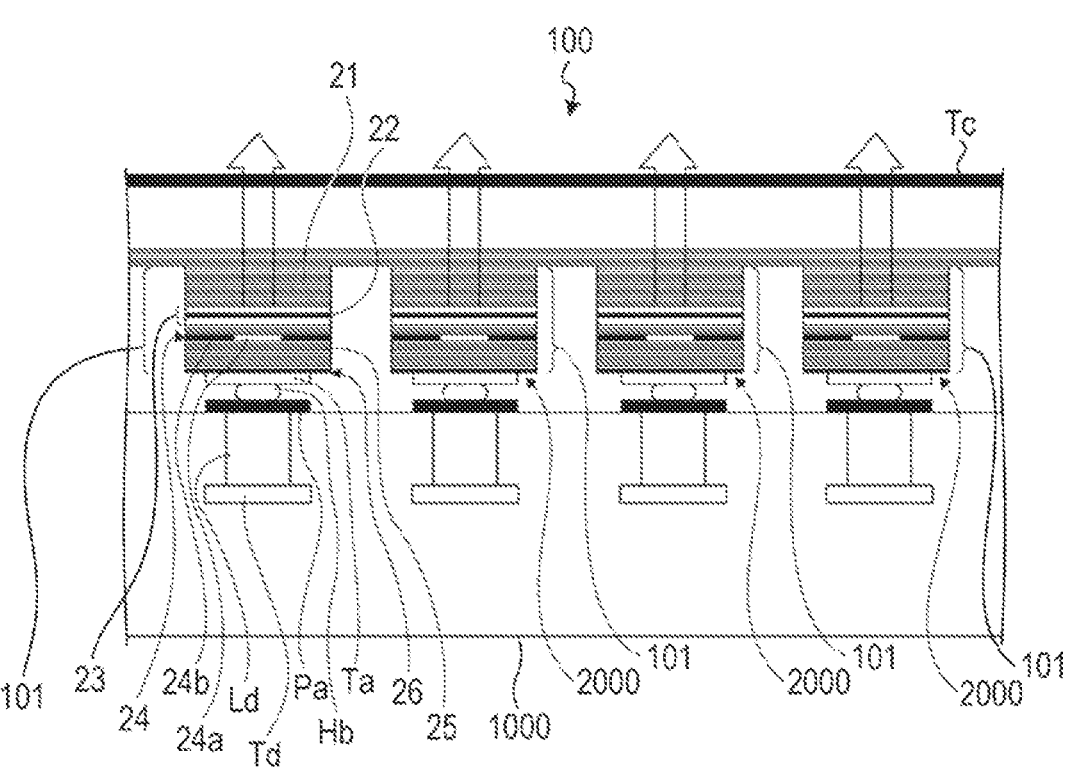
FIG. 26 is a cross-sectional view illustrating an example of a structure of a VCSEL array as a light source unit applicable to the third embodiment.

4-1-1. Configuration Example of Light Emitting Element Applicable to Third Embodiment FIG. 26 is a cross-sectional view illustrating an example of a structure of the VCSEL array 100 as a light source unit applicable to the third embodiment. The VCSEL array 100 corresponds to the light source unit 200 illustrated in FIG. 7. Note that FIG. 26 is a diagram for describing the light generation unit of the VCSEL array 100, and the concave lens 130 is omitted. As illustrated in FIG. 26, the VCSEL array 100 applicable to the third embodiment has a back surface emission type structure in which light is emitted from a first surface of a semiconductor substrate 20 (corresponding to the substrate 140 in FIG. 24) on which the mesa-shaped light emitting element 101 is provided to a second surface on an opposite side (a back surface side as viewed from the light emitting element 101) of the first surface.

As illustrated in FIG. 26, in the VCSEL array 100, a portion corresponding to a mesa 2000 is formed as the light emitting element 101 which generates and emits a laser light. In the VCSEL array 100, the semiconductor substrate 20 is used as the substrate thereof, and a cathode electrode Tc is formed on the upper layer side of the semiconductor substrate 20. For example, a gallium arsenide (GaAs) substrate is used as the semiconductor substrate 20.

In the semiconductor substrate 20, a first multi-layer film reflecting mirror layer 21, an active layer 22, a second multi-layer film reflecting mirror layer 25, a contact layer 26, and an anode electrode Ta are formed in order from the upper layer side to the lower layer side in each light emitting element 101. A current confinement layer 24 is formed in a part (specifically, an upper end portion) of the second multi-layer film reflecting mirror layer 25. Furthermore, a portion including the active layer 22 and sandwiched between the first multi-layer film reflecting mirror layer 21 and the second multi-layer film reflecting mirror layer 25 is a resonator 23.

The first multi-layer film reflecting mirror layer 21 includes a compound semiconductor exhibiting N-type conductivity, and the second multi-layer film reflecting mirror layer 25 includes a compound semiconductor exhibiting N-type conductivity.

The active layer 22 is a layer for generating a laser light, and the current confinement layer 24 is a layer which efficiently injects a current into the active layer 22 and brings about a lens effect. The current confinement layer 24 is selectively oxidized in a non-oxidized state after the light emitting element 101 is formed, and has an oxidized region (selectively oxidized region) 24a in the center portion and an unoxidized region 24b which is not oxidized around the oxidized region 24a. In the current confinement layer 24, a current confinement structure is formed by the oxidized region 24a and the unoxidized region 24b, and a current is conducted to a current confinement region as the unoxidized region 24b.

The contact layer 26 is provided to ensure ohmic contact with the anode electrode Ta.

Here, the cathode electrode Tc in the VCSEL array 100 is connected to the ground via a ground wire (not illustrated) formed in a wiring layer in the substrate 1000. Furthermore, in the drawing, a pad Pa represents a pad for the anode electrode Ta formed on the substrate 1000. The pad Pa is connected to a drive circuit (not illustrated) via wirings Ld and Td formed in the wiring layer of the substrate 1000. FIG. 26 illustrates that the anode electrode Ta is connected to one pad Pa via a solder bump Hb for one light emitting element 101, but the pad Pa and the wiring Ld for each light emitting element 101 are formed on the substrate 1000.

4-1-2. First Creation Method

Figure 27:
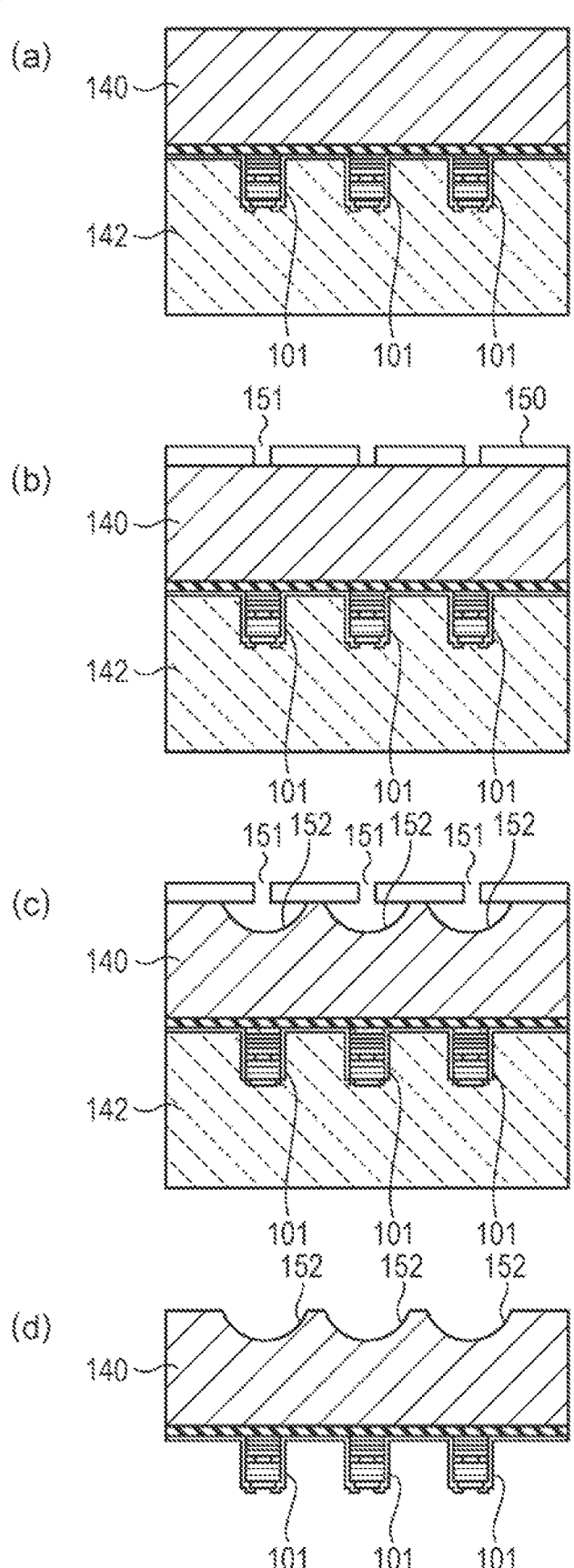
FIG. 27 is a schematic diagram for explaining a first method of creating a concave lens applicable to the third embodiment.

Next, a first method of creating the concave lens 130 applicable to the third embodiment will be described. FIG. 27 is a schematic diagram for explaining the first method of creating the concave lens 130 applicable to the third embodiment. Sections (a) to (d) of FIG. 27 illustrate a manufacturing process by the first method of creating the concave lens 130 in the VCSEL array 100 by a cross-sectional view.

In the section (a) of FIG. 27, the light emitting element 101 is formed on the lower surface (first surface) of the substrate 140 including GaAs via an insulating film, and a holding material 142 for holding the substrate 140 is provided. As the holding material 142, an adhesive tape, wax, an adhesive, or the like can be applied. Note that a method for forming the light emitting element 101 has little relevance to the subject of the present disclosure, and thus description thereof is omitted.

Next, as illustrated in Section (b) of FIG. 27, a resist film 150 is formed on the upper surface (second surface) of the substrate 140, and mask patterning is performed on the resist film 150 such that an opening 151 is formed at a position corresponding to the light emitting element 101. For example, by this mask patterning, a predetermined diameter of a position of the resist film 150 corresponding to the light emitting element 101, for example, a position of a central portion of the concave lens 130 to be provided corresponding to the light emitting element 101 is removed.

Furthermore, next, as illustrated in Section (c) of FIG. 27, etching processing is executed by wet etching or dry etching.

Therefore, etching proceeds isotropically (isotropic etching) on the substrate 140 side of the resist film 150 with the position exposed by the opening 151 of the substrate 140 as a starting point, and a concave portion 152 is formed.

When the shape of the concave portion 152 becomes a desired shape (a diameter, a depth, or the like) as the concave lens 130, the etching processing is terminated, and the resist film 150 is peeled off. Furthermore, the holding material 142 is also peeled off. Therefore, as illustrated in Section (d) of FIG. 27, the concave portion 152 as the concave lens 130 is formed on the second surface of the substrate 140.

4-1-3. Second Creation Method

Figure 28:
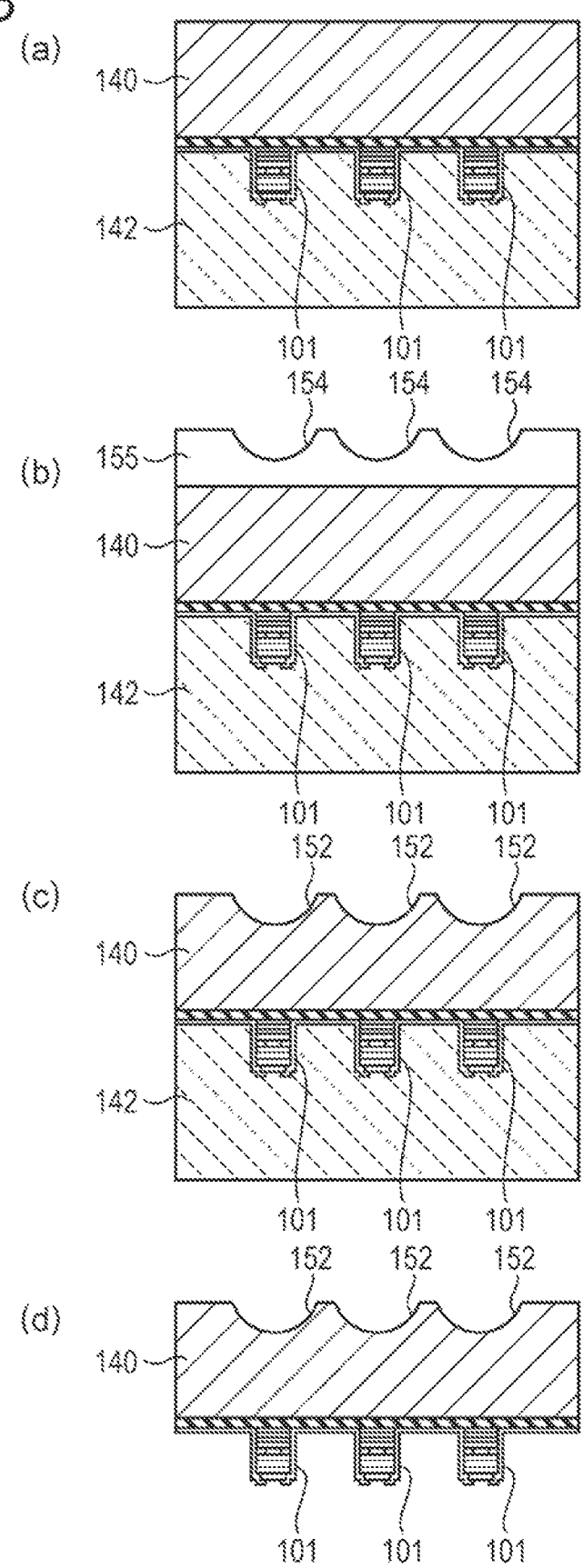
FIG. 28 is a schematic diagram for explaining a second method of creating the concave lens applicable to the third embodiment.

Next, a second method for creating the concave lens 130 applicable to the third embodiment will be described. FIG. 28 is a schematic diagram for explaining the second method of creating the concave lens 130 applicable to the third embodiment. Sections (a) to (d) of FIG. 28 illustrate a manufacturing process by the second method of creating the concave lens 130 in the VCSEL array 100 by a cross-sectional view.

Since Section (a) of FIG. 28 is common to Section (a) of FIG. 27 described above, the description thereof is omitted. The resist film 155 is formed on the substrate 140 in the state of Section (a) of FIG. 28 with a predetermined film thickness, for example, a film thickness thicker than the depth of the concave lens 130 to be formed. As illustrated in Section (b) of FIG. 28, the concave portion 154 having a shape corresponding to the shape of the concave lens 130 is formed on the resist film 155 by using a method such as grayscale lithography or imprint lithography.

Next, as illustrated in Section (b) of FIG. 28, the etching processing by dry etching is executed on the entire surface of the resist film 155 on which the concave portion 154 is formed in a direction perpendicular to the substrate 140 (anisotropic etching). In this etching processing, the resist film 155 is etched, and the substrate 140 exposed by removing the resist film 155 by etching is also etched. Therefore, as illustrated in Section (c) of FIG. 28, the shape of the concave portion 154 provided in the resist film 155 is transferred to the substrate 140, and the concave portion 152 as the concave lens 130 is formed on the second surface of the substrate 140.

When the entire resist film 155 is removed, the holding material 142 is peeled off (Section (d) in FIG. 28).

4-1-4. Third Creation Method

Figure 29:
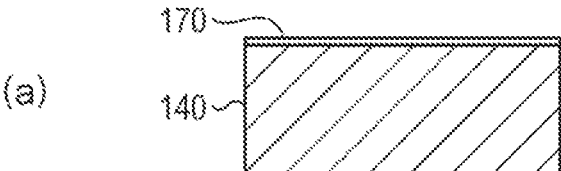
FIG. 29 is a schematic diagram for explaining a third method of creating the concave lens applicable to the third embodiment.
Figure 29:
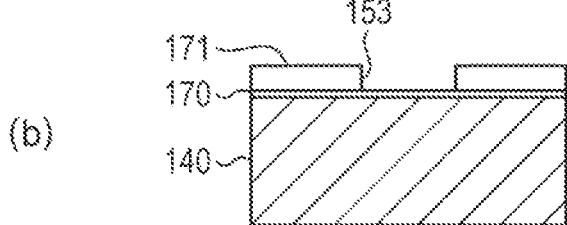
Figure 29:
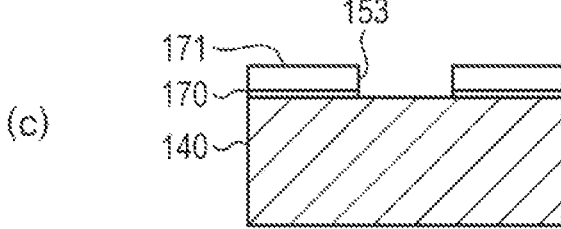
Figure 29:
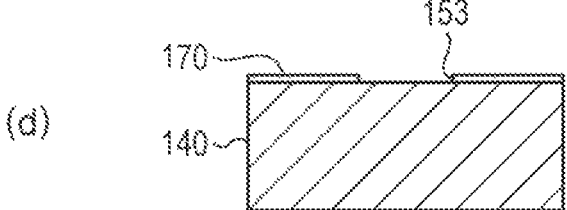
Figure 29:
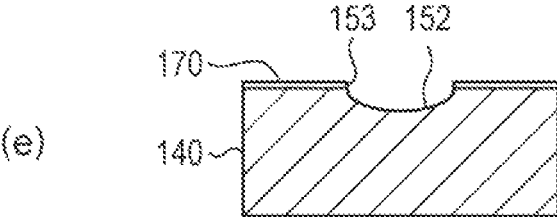

Next, a third method for creating the concave lens 130 applicable to the third embodiment will be described. FIG. 29 is a schematic diagram for explaining the third method of creating the concave lens 130 applicable to the third embodiment. Sections (a) to (e) of FIG. 29 illustrate a manufacturing process by the third method of creating the concave lens 130 in the VCSEL array 100 by a cross-sectional view. Furthermore, in FIG. 29, attention is paid to the substrate 140, and the light emitting element 101 and the holding material 142 are omitted.

First, as illustrated in Section (a) of FIG. 29, a hard mask 170 is formed on the substrate 140. It is assumed that the hard mask 170 has a higher hardness than the substrate 140. As a material of such a hard mask 170, for example, $SiO_2$, SiON, or SiN can be applied. Next, as illustrated in Section (b) of FIG. 29, a resist film 171 is formed on the hard mask 170, and mask patterning is performed on the resist film 171 to expose a region inside a peripheral edge portion 153 corresponding to the peripheral edge of the concave lens 130.

Next, the etching processing by, for example, dry etching is executed on the entire surface of the resist film 171 including the region inside the peripheral edge portion 153 in a direction perpendicular to the substrate 140 (anisotropic etching). In the etching processing, as illustrated in Section (c) of FIG. 29, the hard mask 170 exposed to the region inside the peripheral edge portion 153 is removed, and the region of the substrate 140 is exposed.

Next, the resist film 171 is peeled off from the state of Section (c) of FIG. 29. Therefore, as illustrated in Section (d) of FIG. 29, the hard mask 170 in which the region inside the peripheral edge portion 153 is opened is formed on the substrate 140. Chemical mechanical polishing (CMP) is performed with respect to the state of Section (d) in FIG. 29. In the region where the hard mask 170 is formed, the hard mask 170 serves as a stopper and maintains a flat state.

On the other hand, since the hardness of the region inside the peripheral edge portion 153 from which the hard mask 170 is removed is low with respect to the hard mask 170, so-called dishing occurs in which an abrasive enters to form a dent by the chemical mechanical polishing. The chemical mechanical polishing is executed until the portion scraped by the dishing has a desired depth as the concave lens 130. Therefore, as illustrated in Section (e) of FIG. 29, the concave portion 152 as the concave lens 130 is formed on the second surface of the substrate 140.

4-1-5. Fourth Creation Method

Figure 30:
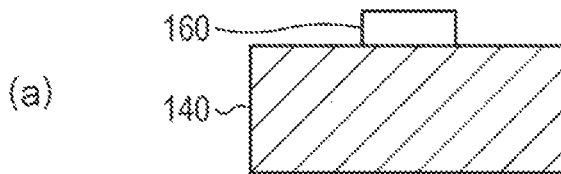
FIG. 30 is a schematic diagram for explaining a fourth method of creating the concave lens applicable to the third embodiment.
Figure 30:
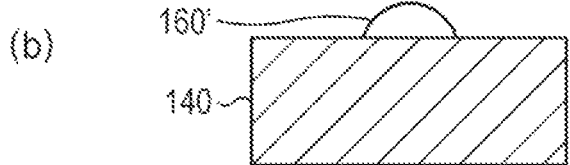
Figure 30:
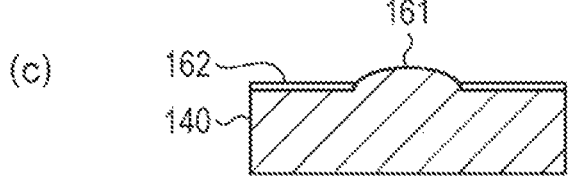
Figure 30:
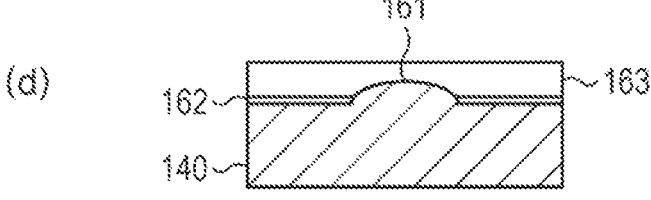
Figure 30:
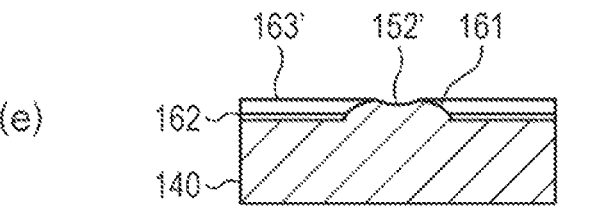
Figure 30:
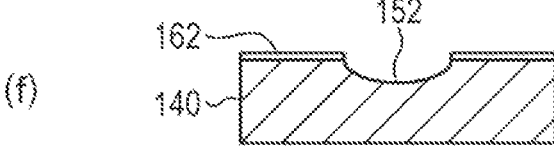

Next, a fourth method of creating the concave lens 130 applicable to the third embodiment will be described. FIG. 30 is a schematic diagram for explaining the fourth method of creating the concave lens 130 applicable to the third embodiment. Sections (a) to (f) of FIG. 30 illustrate a manufacturing process by the fourth method of creating the concave lens 130 in the VCSEL array 100 by a cross-sectional view. Furthermore, in FIG. 30, attention is paid to the substrate 140, and the light emitting element 101 and the holding material 142 are omitted.

First, as illustrated in Section (a) of FIG. 30, a resist film 160 is formed corresponding to the lens region of the concave lens 130 of the substrate 140 by resist patterning. At this time, the film thickness of the resist film 160 is made thicker than the desired depth of the concave lens 130. Next, reflow baking is performed on the formed resist film 160 to melt the resist film 160, and the resist film is deformed into a dome shape as illustrated as a resist film 160' in Section (b) of FIG. 30.

Next, the etching processing by, for example, dry etching is executed on the entire surface of the substrate 140 including the resist film 160' perpendicularly to the substrate 140. Here, the etching rate of the resist film 160' is higher than the etching rate of the substrate 140. Therefore, when the etching processing is continued until the resist film 160' is removed, a protrusion 161 corresponding to the shape of the resist film 160' is formed on the substrate 140 according to a selection ratio between the substrate 140 and the resist film 160'.

When the resist film 160' is removed by etching and the protrusion 161 is formed with respect to the substrate 140, an inorganic film 162 is formed in a region other than the protrusion 161 on the substrate 140 by patterning as illustrated in Section (c) of FIG. 30. In the inorganic film 162, for example, SiO₂, SiN, or SiON can be applied as a material.

Next, as illustrated in Section (d) of FIG. 30, a planarization film 163 as an auxiliary film is formed on the protrusion 161 and the inorganic film 162. The planarization film 163 is formed to have a film thickness larger than the height of the protrusion 161 with respect to the inorganic film 162, for example. The planarization film 163 is formed using a material having a low etching rate with respect to the substrate 140, for example, in dry etching using a chlorine-based gas. As a material of the planarization film 163, a silicon-based resin or a siloxane-based resin, for example, acrylic, styrene, epoxy, or the like can be applied. The planarization film 163 is formed by applying these materials by spin coating or the like. After the film formation, the surface of the planarization film 163 is planarized by, for example, chemical mechanical polishing.

Next, etching processing is executed on the entire surface of the planarization film 163 perpendicularly to the planarization film 163 (substrate 140), for example, by dry etching using a chlorine-based gas. Section (e) of FIG. 30 is a diagram illustrating the progress of the entire etching processing on the entire surface of the planarization film 163. As illustrated in Section (e) of FIG. 30, in a planarization film 163' obtained by etching the planarization film 163, the region corresponding to the protrusion 161 is removed according to the progress degree of the etching processing.

In the opening formed in the planarization film 163' by removing the region corresponding to the protrusion 161, the protrusion 161 is etched to form a concave portion 152'. Here, in accordance with a selection ratio between the planarization film 163' and the substrate 140 (protrusion 161), in the substrate 140 (protrusion 161), the concave portion 152' is dug down at a speed faster than the removal of the planarization film 163'. Therefore, when the planarization film 163' is completely removed, the concave portion 152 as the desired concave lens 130 is formed.

4-1-6. Fifth Creation Method

Figure 31:
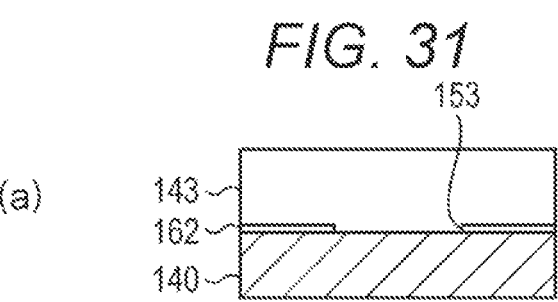
FIG. 31 is a schematic diagram for explaining a fifth method of creating the concave lens applicable to the third embodiment.
Figure 31:
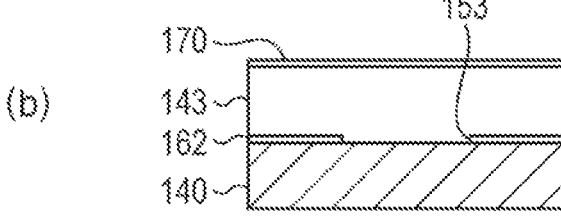
Figure 31:
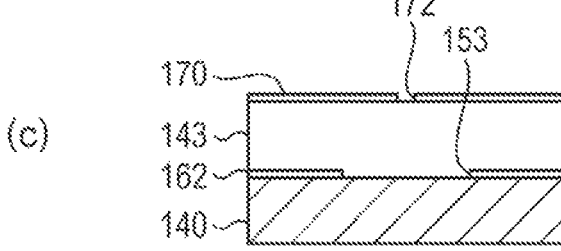
Figure 31:
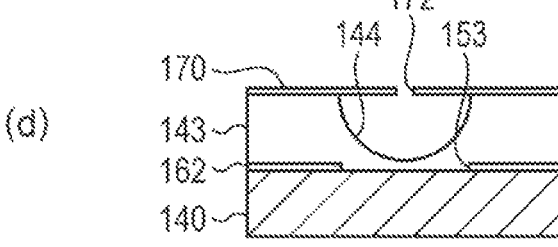
Figure 31:
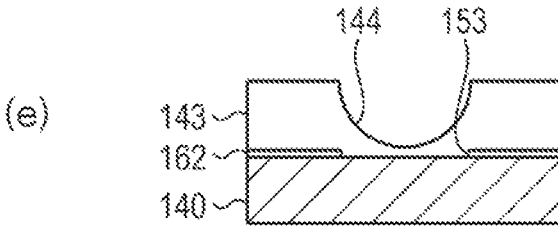
Figure 31:

Next, a fifth method of creating the concave lens 130 applicable to the third embodiment will be described. FIG. 31 is a schematic diagram for explaining the fifth method of creating the concave lens 130 applicable to the third embodiment. Sections (a) to (f) of FIG. 31 illustrate a manufacturing process by the fifth method of creating the concave lens 130 in the VCSEL array 100 by a cross-sectional view. Furthermore, in FIG. 31, attention is paid to the substrate 140, and the light emitting element 101 and the holding material 142 are omitted.

First, the inorganic film 162 is formed on the substrate 140 by SiO₂, SiN, SiON, or the like. For the formed inorganic film 162, a region inside the peripheral edge portion 153 corresponding to the peripheral edge of the concave lens 130 is removed by inorganic film patterning, and an organic film 143 as an auxiliary film is further formed. As a material of the organic film 143, for example, a silicon-based resin or a siloxane-based resin, for example, acrylic, styrene, epoxy, or the like can be applied, and the film is formed by applying these materials by spin coating or the like. A state where the inorganic film 162 is formed and patterned on the substrate 140 and the organic film 143 is further formed is illustrated in Section (b) of FIG. 31.

Next, as illustrated in Section (c) of FIG. 31, the hard mask 170 is formed on the organic film 143 by SiO₂, SiN, SiON, or the like, and a process of providing an opening 172 having a predetermined diameter at a position corresponding to the central portion of the concave lens 130 is performed on the hard mask 170.

Furthermore, next, as illustrated in Section (d) of FIG. 31, etching processing is executed by wet etching or dry etching. Therefore, etching proceeds isotropically (isotropic etching) on the organic film 143 side of the hard mask 170 with the position exposed by the opening 172 of the organic film 143 as a starting point, and a concave portion 144 is formed.

When the shape of the concave portion 144 becomes a desired shape, the etching processing is terminated. For example, when the diameter of the concave portion 144 reaches the diameter of the concave lens 130, the etching processing is terminated. As illustrated in Section (e) of FIG. 31, after the etching processing is terminated, the hard mask 170 is peeled off.

Next, etching processing is executed on the entire surface of the organic film 143 on which the concave portion 144 is formed perpendicularly to the substrate 140 by dry etching. Here, the dry etching is executed under the condition that the inorganic film 162 is not etched and the etching rate of the organic film 143 is higher than the etching rate of the substrate 140. Therefore, as illustrated in Section (f) of FIG. 31, when the organic film 143 is removed, the shape of the concave portion 144 is compressed in the vertical direction according to a selection ratio between the substrate 140 and the organic film 143 and transferred to the substrate 140, and the concave portion 152 is formed. By appropriately setting the film thickness of the organic film 143, it is possible to form the concave portion 152 as the concave lens 130.

4-2. First Modification

Next, a first modification of the third embodiment will be described. The first modification of the third embodiment is an example in which a functional film is provided on the substrate 140 on which the concave lens 130 (concave portion 152) is formed. First to fifth examples of the functional film according to the first modification of the third embodiment will be described with reference to FIGS. 32A to 32E.

In each of FIGS. 32A to 32E, Section (a) is a schematic diagram of the substrate 140 provided with the functional film as viewed from an upper surface (second surface), and Section (b) is a cross-sectional view of the light source device provided with the functional film. Note that the projection lens 102 and the DOE 103 are omitted in each of FIGS. 32A to 32E. Furthermore, in each of FIGS. 32A to 32E, Sections (a) and (b) are for description, and the position of the concave lens 130 illustrated in Section (a) does not necessarily coincide with the position of the concave lens 130 illustrated in Section (b).

4-2-1. First Example of Providing Functional Film

Figure 32A:
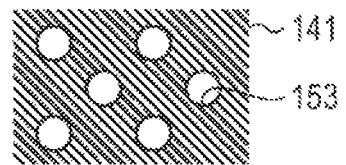
FIG. 32A is a diagram for explaining a first example in which a functional film is provided on a substrate according to the first modification of the third embodiment.
Figure 32A:
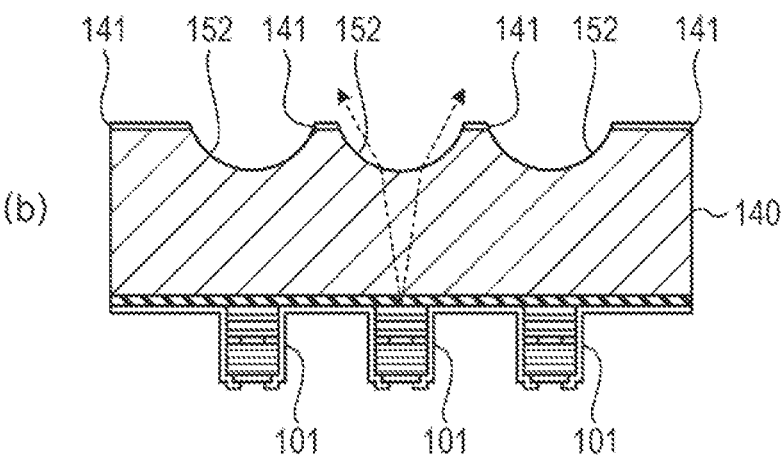

First, the first example in which the functional film is provided on the substrate 140 will be described. FIG. 32A is a diagram for explaining the first example in which the functional film is provided on the substrate 140 according to the first modification of the third embodiment. In the first example, as illustrated in Section (a) of FIG. 32A, the functional film 141 is provided in a region of the upper surface of the substrate 140 excluding the concave portion 152 as the concave lens 130. That is, as illustrated in Section (b) of FIG. 32A, the functional film 141 is not provided on the inner surface of each concave portion 152 corresponding to the concave lens 130.

The functional film 141 can be a light shielding film having a function of absorbing an incident laser light. By using the functional film 141 as the light shielding film, for example, the leakage of the laser light generated and emitted by the light emitting element 101 from, for example, the periphery of the concave portion 152 corresponding to the light emitting element 101 can be suppressed. Furthermore, it is possible to increase the separation degree of the laser light generated and emitted by each light emitting element 101.

The functional film 141 is not limited to the light shielding film. For example, a heat dissipation film having a function of high heat dissipation property can be applied as the functional film 141. Furthermore, for example, a protective film for protecting the surface of the substrate 140 can be applied as the functional film 141. In a case where the protective film is applied as the functional film 141, for example, a pick-up performance in a case where a plurality of VCSEL arrays 100 formed on a wafer is diced into individual pieces can be improved. A film having another function may be further applied as the functional film 141.

4-2-2. Second Example of Providing Functional Film

Figure 32B:
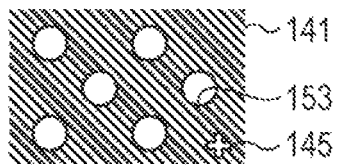
FIG. 32B is a diagram for explaining a second example in which the functional film is provided on the substrate according to the first modification of the third embodiment.
Figure 32B:
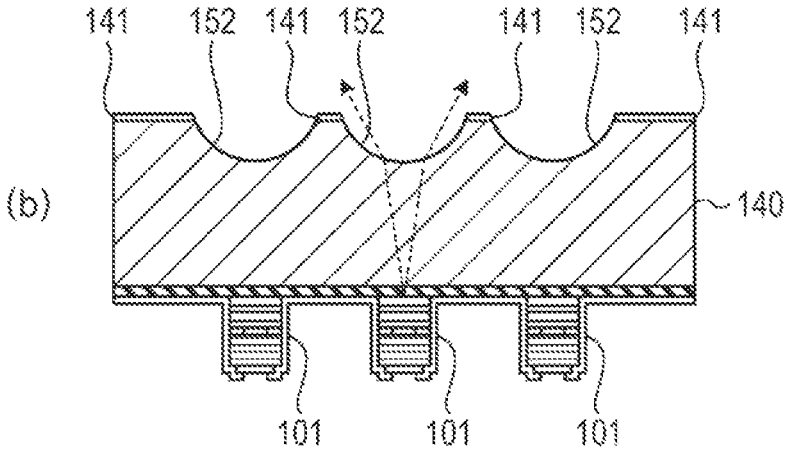

Next, the second example in which the functional film is provided on the substrate 140 will be described. FIG. 32B is a diagram for explaining the second example in which the functional film is provided on the substrate 140 according to the first modification of the third embodiment. In the second example, as illustrated in Section (a) of FIG. 32B, for example, a mark 145 having a predetermined shape is provided at a predetermined position with respect to the functional film 141 provided in the region of the upper surface of the substrate 140 excluding the concave portion 152 as the concave lens 130. The cross-sectional structure illustrated in Section (b) of FIG. 32B is similar to Section (b) of FIG. 32A described above, and thus the description thereof is omitted here.

In the example of FIG. 32B, the mark 145 has a cross shape and is suitably used as an alignment mark. For example, in a case where a light shielding film is applied as the functional film 141, it is difficult to confirm an alignment mark provided on a wiring portion or the like in the lower layer of the substrate 140 from the upper surface side of the substrate 140. As in the second example, this problem can be solved by providing the mark 145 on the functional film 141 provided on the upper surface of the substrate 140.

4-2-3. Third Example of Providing Functional Film

Figure 32C:
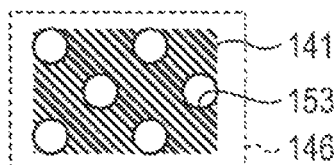
FIG. 32C is a diagram for explaining a third example in which the functional film is provided on the substrate according to the first modification of the third embodiment.
Figure 32C:
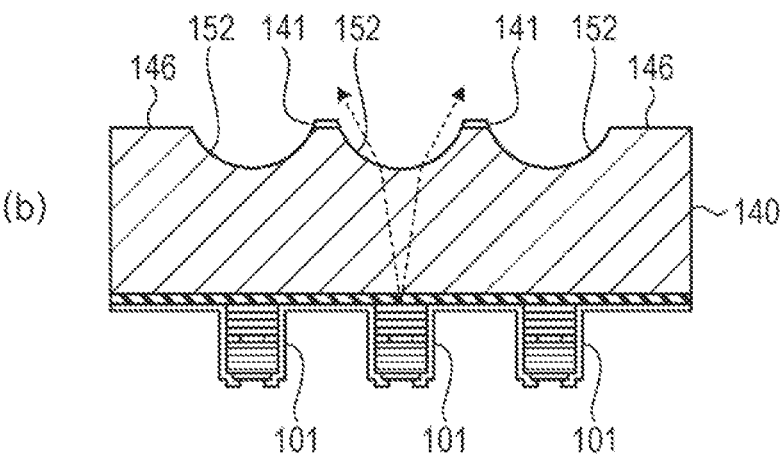

Next, the third example in which the functional film is provided on the substrate 140 will be described. FIG. 32C is a diagram for explaining the third example in which the functional film is provided on the substrate 140 according to the first modification of the third embodiment. In the third example, as illustrated in Section (a) of FIG. 32C, the functional film 141 is provided on the upper surface of the substrate 140 except for the concave portion 152 as the concave lens 130 and, for example, a region 146 outside a rectangular region including a predetermined number of concave lenses 130. Section (b) in FIG. 32C schematically illustrates a region where the functional film 141 is provided and a region where the functional film 141 is not provided on the upper surface of the substrate 140.

For example, the rectangular region corresponds to one VCSEL array 100, and the region 146 not provided with the functional film 141 can be a scribe region which is a margin used when scribing is executed to dice the plurality of VCSEL arrays 100 formed on the wafer into individual pieces. As described above, when the functional film 141 is provided except for the scribe region, it is possible to prevent generation of dust due to cracking of the functional film 141 by scribing.

4-2-4. Fourth Example of Providing Functional Film

Figure 32D:
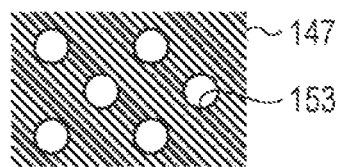
FIG. 32D is a diagram for explaining a fourth example in which the functional film is provided on the substrate according to the first modification of the third embodiment.
Figure 32D:
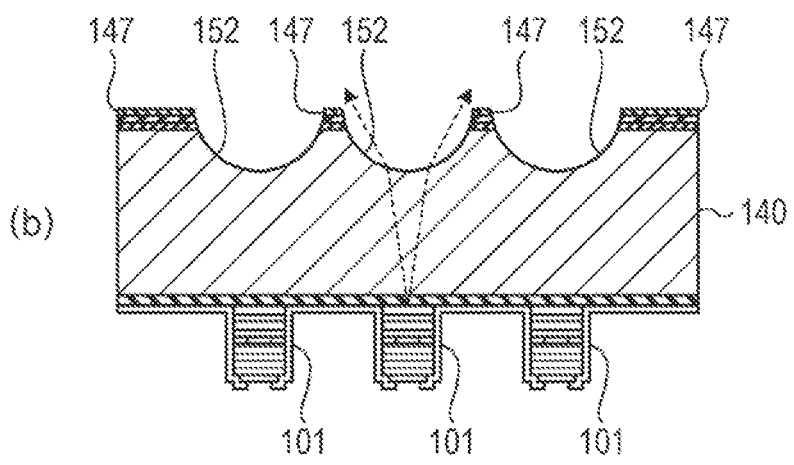

Next, the fourth example in which the functional film is provided on the substrate 140 will be described. FIG. 32D is a diagram for explaining the fourth example in which the functional film is provided on the substrate 140 according to the first modification of the third embodiment. In the fourth example, as illustrated in Section (b) of FIG. 32D, a laminated functional film 147 in which a plurality of functional films is laminated is provided on the upper surface of substrate 140.

In the fourth example, similarly to the first example described above, as illustrated in Section (a) of FIG. 32D, the laminated functional film 147 is provided in the region of the upper surface of the substrate 140 excluding the concave portion 152 as the concave lens 130. Various combinations of the plurality of functional films included in the laminated functional film 147 can be considered. As an example, the laminated functional film 147 can include a light shielding film and a heat dissipation film. Therefore, it is possible to enhance the light shielding property of the laser light emitted from the light emitting element 101 and the heat dissipation property of the heat generated by the light emitting element 101 by the laser light generation.

The present invention is not limited to this, and a protective film can be further included in the laminated functional film 147. By providing the protective film, for example, on the uppermost layer of the laminated functional film 147, it is possible to improve the pick-up performance at the time of dicing the VCSEL array 100 formed on the wafer into individual pieces.

4-2-5. Fifth Example of Providing Functional Film

Figure 32E:
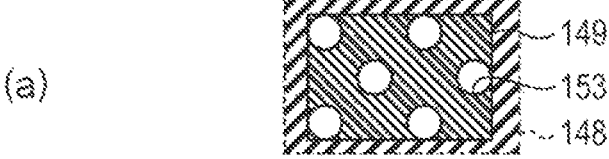
FIG. 32E is a diagram for describing a fifth example in which the functional film is provided on the substrate according to the first modification of the third embodiment.
Figure 32E:
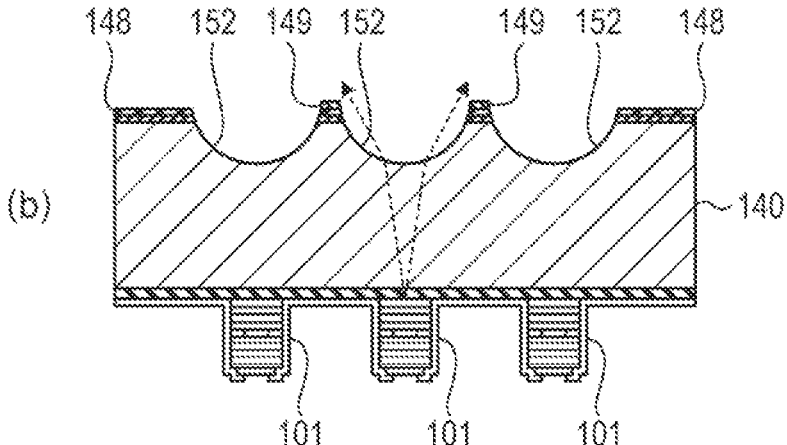

Next, the fifth example in which the functional film is provided on the substrate 140 will be described. FIG. 32E is a diagram for explaining the fifth example in which the functional film is provided on the substrate 140 according to the first modification of the third embodiment. The fifth example is an example in which laminated functional films having different laminated structures are provided depending on the positions on the substrate 140.

More specifically, in the fifth example, as illustrated in Sections (a) and (b) of FIG. 32E, a first laminated functional film 148 in which a plurality of different functional films is laminated and a second laminated functional film 149 in which a plurality of functional films is laminated in a laminated structure different from that of the first laminated functional film 148 are provided depending on the positions on the upper surface of the substrate 140. Therefore, it is possible for the functional films to realize functions depending on the positions on the substrate 140.

As an example, the first laminated functional film 148 includes only a protective film, and the second laminated functional film 149 includes a protective film and a light shielding film. In the example of Sections (a) and (b) of FIG. 32E, the second laminated functional film 149 is provided between the concave portions 152, and the first laminated functional film 148 is provided in a region where there is no adjacent concave portion 152.

According to this arrangement, for example, leakage from the periphery of the concave portion 152 corresponding to the light emitting element 101 can be suppressed, the separation degree of the laser light generated and emitted by each light emitting element 101 can be increased, and the pick-up performance at the time of dicing the VCSEL array 100 formed on the wafer into individual pieces can be improved.

Note that the first to fifth examples described above can be combined and implemented within a range in which no contradiction occurs.

4-2. Second Modification

Figure 33:
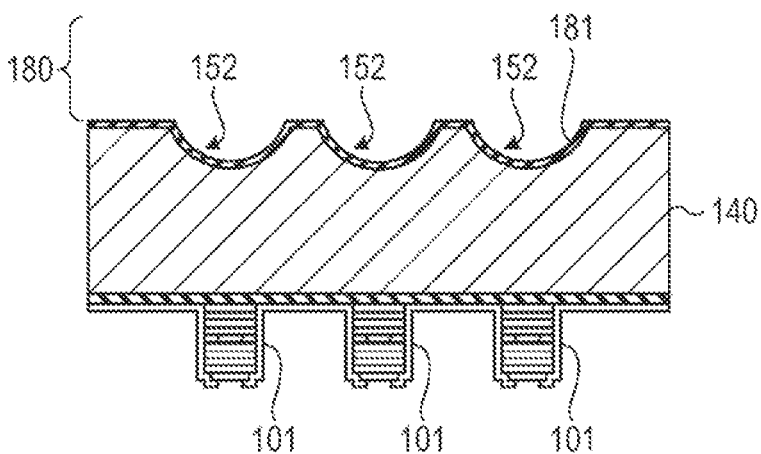
FIG. 33 is a cross-sectional view illustrating an example of the configuration of the light source device according to a second modification of the third embodiment.

Next, a second modification of the third embodiment will be described. The second modification of the third embodiment is an example in which an antireflection film is provided on the inner surface of the concave portion 152 as the concave lens 130. FIG. 33 is a cross-sectional view illustrating an example of a configuration of a light source device according to the second modification of the third embodiment. Note that in FIG. 33, the projection lens 102 and the DOE 103 are omitted.

In FIG. 33, an antireflection film 181 is provided on the entire upper surface (second surface) of the substrate 140 including the inner surface of the concave portion 152 as the concave lens 130. The antireflection film 181 is provided for the purpose of suppressing reflection of a laser light inside the substrate 140.

That is, the laser light generated in the light emitting element 101 is emitted from the concave portion 152 provided corresponding to the light emitting element 101 to a space 180 having a refractive index lower than that of the inside of the substrate 140. At this time, when the laser light is reflected by the outer surface of the concave portion 152 (the surface on the inner side of the substrate 140), there is a possibility that the reflected laser light is incident on the light emitting element 101 again. The re-incidence of the laser light into the light emitting element 101 results in the output of the laser light in the light emitting element 101. Furthermore, the reflected laser light is absorbed inside the substrate 140 and converted into heat, for example, resulting in the heat generation of the VCSEL array 100.

The reflection of the laser light generated by the light emitting element 101 on the outer surface of the concave portion 152 can be suppressed by providing the antireflection film 181 on the entire surface including the inner surface of the concave portion 152 on the upper surface of the substrate 140. Therefore, it is possible to suppress a decrease in laser output due to the re-incidence of the reflected laser light on the light emitting element 101 and heat generation due to the absorption of the reflected laser light.

4-3. Third Modification

Figure 34:
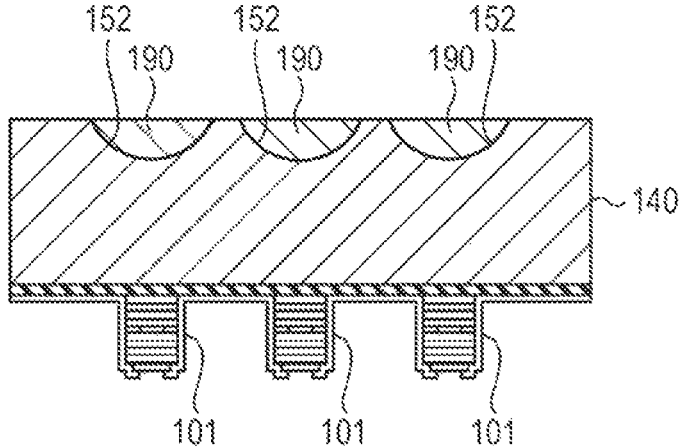
FIG. 34 is a cross-sectional view illustrating an example of the configuration of the light source device according to a third modification of the third embodiment.

Next, a third modification of the third embodiment will be described. The third modification of the third embodiment is an example in which a material having a refractive index lower than that of the substrate 140 is embedded in the concave portion 152 provided as the concave lens 130 with respect to the substrate 140. FIG. 34 is a cross-sectional view illustrating an example of a configuration of a light source device according to a third modification of the third embodiment. Note that in FIG. 34, the projection lens 102 and the DOE 103 are omitted.

In FIG. 34, a low refractive index material 190 embedded in the concave portion 152 is a material having a refractive index lower than that of the substrate 140 at the wavelength of the laser light generated by the light emitting element 101 and having a refractive index higher than that of air.

That is, the refractive index of GaAs, which is the material of the substrate 140, is 3 to 4, whereas the refractive index of air filled in the concave portion 152 as the concave lens 130 is about 1, which is a large difference. Therefore, when there is a variation in the shape of the concave portion 152, the optical trace of the laser light generated by the light emitting element 101 and emitted through the concave portion 152 appears with a larger variation.

In the third modification of the third embodiment, the concave portion 152 is filled with the low refractive index material 190 having a refractive index lower than that of the substrate 140 and having a refractive index higher than that of air. Therefore, a change in the refractive index with respect to the laser light emitted from the concave portion 152 toward the space is alleviated, and it is possible to suppress the variation in the optical trace of the laser light emitted from the concave portion 152 due to the variation in the shape of the concave portion 152.

4-4. Fourth Modification

Next, a fourth modification of the third embodiment will be described. The fourth modification of the third embodiment is an example in which the light source device according to the third embodiment described with reference to FIGS. 23 and 24 is packaged.

Figure 35:
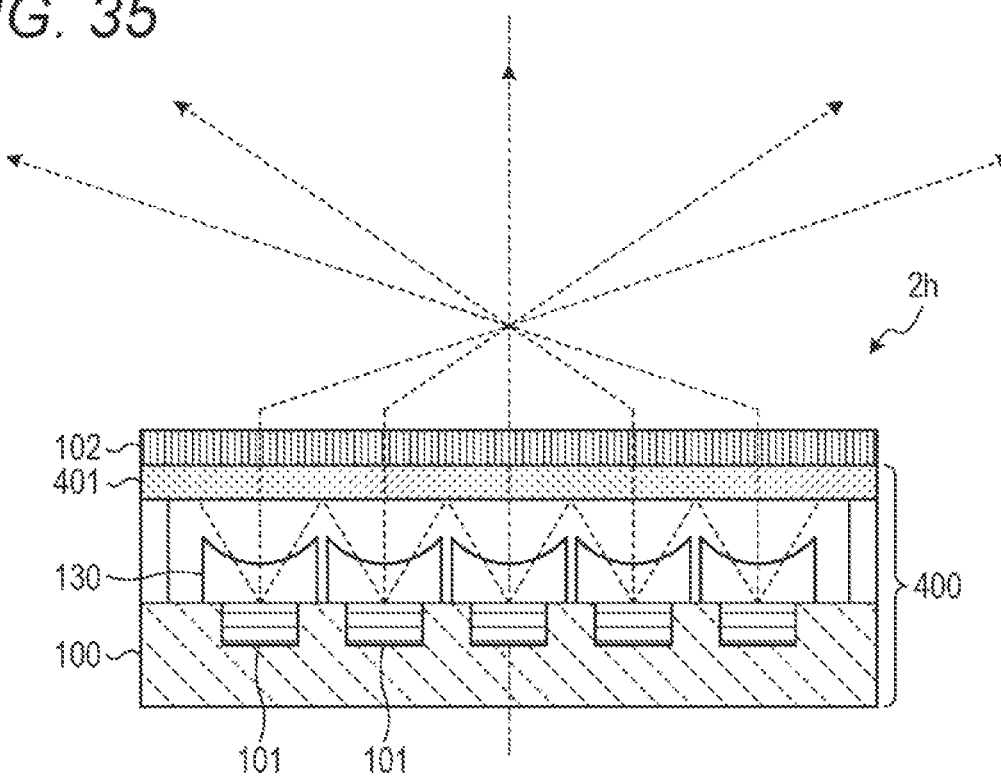
FIG. 35 is a cross-sectional view illustrating a first example of the configuration of the light source device according to a fourth modification of the third embodiment.

FIG. 35 is a cross-sectional view illustrating a first example of a configuration of a light source device according to the fourth modification of the third embodiment. In a light source device 2h illustrated in FIG. 35, the VCSEL array 100 includes the plurality of light emitting elements 101 and the concave lenses 130 corresponding to respective light emitting elements 101. Note that, in FIG. 35, the substrate 140 on which the concave lens 130 is formed is omitted. The top surface of the VCSEL array 100 is sealed with a glass 401, and the side surface thereof is sealed with a resin or the like, thereby configuring a chip size package (CSP) 400.

A binary lens is formed as the projection lens 102 on the glass 401 on the upper surface of the chip size package 400. The chip size package 400 and the projection lens 102 configures one package.

In the light source device configured as described above, the VCSEL array 100 can obtain a high resolution by miniaturizing the pitch between the light emitting elements 101. Furthermore, since the concave lens 130 is provided for each light emitting element 101, the beam diameter of the laser light emitted from each light emitting element 101 is widened in a short distance, and the height can be reduced. Furthermore, since the concave lens 130 is formed by processing the substrate 140 on which each light emitting element 101 is provided, the concave lens 130 and the light emitting element 101 can be aligned with extremely high accuracy.

Figure 36:
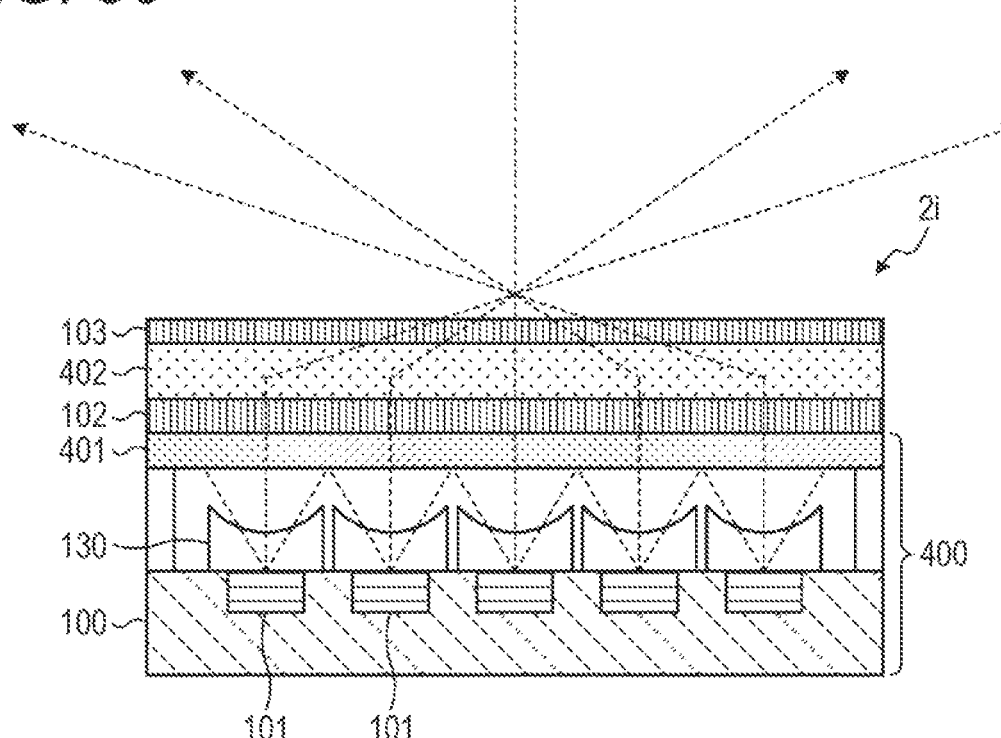
FIG. 36 is a cross-sectional view illustrating a second example of the configuration of the light source device according to the fourth modification of the third embodiment.

FIG. 36 is a cross-sectional view illustrating a second example of the configuration of the light source device according to the fourth modification of the third embodiment. A light source device 2i illustrated in FIG. 36 is an example in which a separately prepared DOE is attached to the surface of the projection lens 102 with, for example, an adhesive having a refractive index similar to that of the glass 401 in the configuration of the light source device 2h described with reference to FIG. 35. As described above, the DOE is attached to the package in which the VCSEL array

100 to the projection lens 102 are integrally formed, so that, for example, a light source device that projects a pattern according to the request of a customer can be easily manufactured.

4-5. Fifth Modification

Next, a fifth modification of the third embodiment will be described. In the third embodiment described above, the concave lens 130 is provided on a one-to-one basis for each light emitting element 101 included in the VCSEL array 100. On the other hand, in the fifth modification of the third embodiment, in each light emitting element 101 included in the VCSEL array 100, the light emitting element 101 provided with the concave lens 130 and the light emitting element 101 not provided with the concave lens 130 are mixed.

Figures 37, 38:
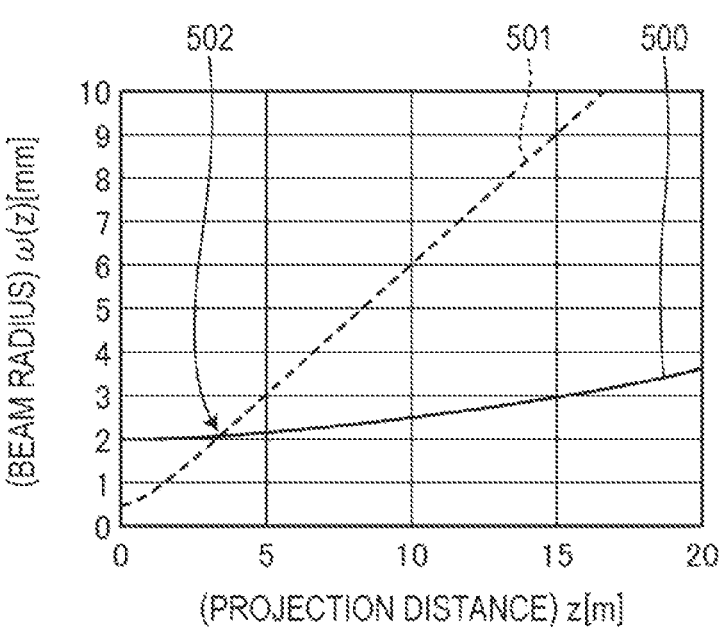
FIG. 37 is a cross-sectional view illustrating an example of the configuration of the light source device according to a fifth modification of the third embodiment.
FIG. 38 is a graph illustrating an example of distance dependence of beam diameter spread depending on the presence or absence of the concave lens.

FIG. 37 is a cross-sectional view illustrating an example of a configuration of a light source device according to the fifth modification of the third embodiment. In a light source device 2j illustrated in FIG. 37, a light emitting element 101a provided with the concave lens 130 and a light emitting element 101b not provided with the concave lens 130 are alternately arranged in the VCSEL array 100. The light emitting elements 101a and 101b have the same distance from the projection lens 102. Therefore, a beam diameter 113c when a laser light 111c generated and emitted by the light emitting element 101b is incident on the projection lens 102 is smaller than the beam diameter 113b when the laser light 111b generated by the light emitting element 101a and emitted through the concave lens 130 is incident on the projection lens 102.

Here, referring to FIG. 6 and Expression (2) described above, when the beam diameter in the projection lens 102 is larger, the spread of the beam diameter at a long distance is smaller, and a high resolution can be obtained at a long distance. On the other hand, in a case where the beam diameter in the projection lens 102 is smaller, the spread of the beam diameter at a long distance is larger, but a beam diameter smaller than the case of a long distance can be obtained up to a certain distance of a short distance.

FIG. 38 is a graph illustrating an example of distance dependence of beam diameter spread depending on the presence or absence of the concave lens 130. In FIG. 38, a characteristic line 500 indicates an example of a change in the beam diameter with respect to the projection distance in a case where the beam radius $\omega_0$ of the beam waist is 2 [mm], and a characteristic line 501 indicates an example of a change in the beam diameter with respect to the projection distance in a case where the beam radius $\omega_0$ of the beam waist is 0.5 [mm]. The characteristic line 500 corresponds to an example of the light emitting element 101a provided with the concave lens 130, and the characteristic line 501 corresponds to an example of a light generating element 102b not provided with the concave lens 130.

In this example, as indicated by the characteristic line 500, in a case where the beam radius $\omega_0$ of the beam waist is 2 [mm], a beam radius $\omega(z)$ at the position z where the projection distance is 15 [m] is 3 [mm], which is 1.5 times the beam radius $\omega_0$ of the beam waist. On the other hand, in a case where the beam radius $\omega_0$ of the beam waist is 0.5 [mm], the beam radius $\omega(z)$ at the position where the distance is 15 [m] is 9 [mm], which is 18 times the initial beam radius $\omega_0$ of the beam waist.

Here, a projection distance (approximately 3 [m]) of an intersection point 502 between the characteristic line 500 and the characteristic line 501 in FIG. 38 is considered. At a shorter distance than the intersection point 502, the beam diameter indicated by the characteristic line 501 is smaller than the beam diameter indicated by the characteristic line 500, and it can be seen that a high resolution can be realized when the initial beam diameter is smaller. On the other hand, at a longer distance than the intersection point 502, the beam diameter indicated by the characteristic line 501 exceeds the beam diameter indicated by the characteristic line 500, and it can be seen that a high resolution can be realized when the initial beam diameter is larger.

In this regard, in the configuration of the light source device 2j illustrated in FIG. 37, in the case of use that requires a high resolution at a shorter distance than the distance of the intersection point 502, the light emitting element 101b not provided with the concave lens 130 is selectively driven to generate and emit a laser light. On the other hand, in the case of use that requires a high resolution at a longer distance than the distance of the intersection point 502, the light emitting element 101a provided with the concave lens 130 is selectively driven to generate and emit a laser light.

As described above, by switching the light emitting elements 101a and 101b that generate and emit a laser light in accordance with applications at a short distance and a long distance, it is possible to emit the laser light suitable for each of the long distance and the short distance.

Note that the present technology can also have the following configurations.

(1)

A light source device including:

a light source unit that includes a plurality of light emitting elements and is divided into a plurality of regions having at least one light emitting element in one region; and an optical unit that includes a plurality of first lens groups having a first focal length and corresponding to the plurality of regions of the light source unit on a one-to-one basis, each of the plurality of first lens groups including one or more lenses, and a second lens group having a second focal length and emitting light having passed through the plurality of first lens groups, the second lens group including one or more lenses, in which in the optical unit, for each of the plurality of regions, the first focal length is smaller than zero, the second focal length is larger than zero, and each composite focal length of each of the plurality of first lens groups and the second lens group is larger than the second focal length.

(2)

The light source device according to (1), in which the plurality of first lens groups includes an integrated first optical element.

(3)

The light source device according to (1) or (2), in which at least one optical surface of the plurality of first lens groups has an aspherical shape.

(4)

The light source device according to any one of (1) to (3), in which at least one optical surface of the second lens group has a free-form surface shape.

(5)

The light source device according to any one of (1) to (4), in which in each of the plurality of first lens groups, a medium layer filled with a material having a refractive index substantially same as a refractive index of the plurality of first lens groups is arranged without an air layer interposed between the medium layer and the light source unit, and a boundary surface on a side far from an emission surface of the light source unit is an optical surface having a negative refractive power.

(6)

The light source device according to any one of (1) to (5), further including:

a second optical element that is arranged on an emission surface side of the second lens group, in which the second optical element projects a plurality of zeroth-order projection images formed by the plurality of first lens groups and the second lens group side by side on a projection field.

(7)

The light source device according to any one of (1) to (6), in which the plurality of light emitting elements is provided on a first surface of a substrate, and generated light is emitted through the substrate from a second surface opposite to the second surface, and each of the plurality of first lens groups is arranged at a position corresponding to each of the plurality of light emitting elements on a one-to-one basis on the second surface of the substrate.

(8)

The light source device according to (7), in which each of the plurality of first lens groups is a concave portion provided in the second surface of the substrate.

(9)

The light source device according to (8), further including an antireflection film that is provided on an inner surface of the concave portion and prevents reflection of light from the first surface.

(10)

The light source device according to (8) or (9), further including a low refractive index film that is provided in the concave portion and has a refractive index lower than a refractive index of the substrate, in which a region other than the concave portion in the substrate and a surface of the low refractive index film form a plane.

(11)

The light source device according to any one of (8) to (10), further including one or more layers of functional films that are provided in at least a part of a non-lens region excluding a region of each of the plurality of lenses on the second surface of the substrate.

(12)

The light source device according to (11), in which the functional film is provided by laminating a plurality of functional films.

(13)

The light source device according to (12), in which the functional film has a structure in which different numbers of the functional films are laminated depending on positions on the substrate.

(14)

The light source device according to any one of (11) to (13), in which the functional film includes an alignment mark.

(15)

The light source device according to any one of (11) to (14), in which the functional film is provided in a region other than a scribe region used when the substrate is diced into individual pieces on the second surface of the substrate.

(16)

The light source device according to any one of (8) to (15), in which the concave portion is positioned in a region corresponding to each of the plurality of light emitting elements on a one-to-one basis on the second surface of the substrate.

(17)

The light source device according to (16), in which the concave portion is a groove formed using dishing generated by chemical mechanical polishing.

(18)

An electronic apparatus including:

a light source device including a light source unit that includes a plurality of light emitting elements and is divided into a plurality of regions having at least one light emitting element in one region, and an optical unit that includes a plurality of first lens groups having a first focal length and corresponding to the plurality of regions of the light source unit on a one-to-one basis, each of the plurality of first lens groups including one or more lenses, and a second lens group having a second focal length and emitting light having passed through the plurality of first lens groups, the second lens group including one or more lenses, in which in the optical unit, for each of the plurality of regions, the first focal length is smaller than zero, the second focal length is larger than zero, and each composite focal length of each of the plurality of first lens groups and the second lens group is larger than the second focal length; and a driving unit that drives the plurality of light emitting elements to cause each of the plurality of light emitting elements to generate light.

(19)

The electronic apparatus according to (18), further including a distance measuring device that includes a light receiving unit configured to receive light and that performs distance measurement on the basis of a timing at which light is generated by the driving unit and a timing at which the light is received by the light receiving unit.

REFERENCE SIGNS LIST

1 Distance measuring device
2, 2b, 2c, 2d, 2e, 2f, 2g, 2h, 2i, 2j Light source device
6 Electronic apparatus
100 VCSEL array
101, 101a, 101b, 210 Light emitting element
102 Projection lens
103, 270 DOE
111a, 111b, 111c, 222 Laser light
113a, 113b, 113c Beam diameter
130, 221 Concave lens
140 Substrate
141 Functional film
148 First laminated functional film 149 Second laminated functional film
152 Concave portion
153 Peripheral edge portion
181 Antireflection film
190 Low refractive index material
200, 200a, 200b Light source unit
210a Light emitting unit
220 Microlens array
230, 230a Projection lens
400 Chip size package

What is claimed is:

1. A light source device, comprising:

a light source unit that includes a plurality of light emitting elements and is divided into a plurality of regions having at least one light emitting element in one region; and an optical unit that includes a plurality of first lens groups having a first focal length and corresponding to the plurality of regions of the light source unit on a one-to-one basis, each of the plurality of first lens groups including one or more lenses, and a second lens group having a second focal length and emitting light having passed through the plurality of first lens groups, the second lens group including one or more lenses, wherein in the optical unit, for each of the plurality of regions, the first focal length is smaller than zero, the second focal length is larger than zero, and each composite focal length of each of the plurality of first lens groups and the second lens group is larger than the second focal length, and wherein in each of the one or more lenses included in each of the plurality of first lens groups, a medium layer filled with a material having a refractive index substantially same as a refractive index of the one or more lenses is arranged without an air layer interposed between the medium layer and the light source unit, and a boundary surface on a side far from an emission surface of the light source unit is an optical surface having a negative refractive power.

2. The light source device according to claim 1, wherein at least one optical surface of the plurality of first lens groups has an aspherical shape.

3. The light source device according to claim 1, wherein at least one optical surface of the second lens group has a free-form surface shape.

4. The light source device according to claim 1, wherein the plurality of first lens groups includes an integrated first optical element.

5. A light source device, comprising:

a light source unit that includes a plurality of light emitting elements and is divided into a plurality of regions having at least one light emitting element in one region;

an optical unit that includes a plurality of first lens groups having a first focal length and corresponding to the plurality of regions of the light source unit on a one-to-one basis, each of the plurality of first lens groups including one or more lenses, and a second lens group having a second focal length and emitting light having passed through the plurality of first lens groups, the second lens group including one or more lenses, wherein in the optical unit, for each of the plurality of regions, the first focal length is smaller than zero, the second focal length is larger than zero, and each composite focal length of each of the plurality of first lens groups and the second lens group is larger than the second focal length; and a second optical element that is arranged on an emission surface side of the second lens group, wherein the second optical element projects a plurality of zeroth-order projection images formed by the plurality of first lens groups and the second lens group side by side on a projection field.

6. The light source device according to claim 1, wherein the plurality of light emitting elements is provided on a first surface of a substrate, and generated light is emitted through the substrate from a second surface opposite to the first surface, and each of the plurality of first lens groups is arranged at a position corresponding to each of the plurality of light emitting elements on a one-to-one basis on the second surface of the substrate.

7. A light source device comprising:

a light source unit that includes a plurality of light emitting elements and is divided into a plurality of regions having at least one light emitting element in one region; and an optical unit that includes a plurality of first lens groups having a first focal length and corresponding to the plurality of regions of the light source unit on a one-to-one basis, each of the plurality of first lens groups including one or more lenses, and a second lens group having a second focal length and emitting light having passed through the plurality of first lens groups, the second lens group including one or more lenses, wherein in the optical unit, for each of the plurality of regions, the first focal length is smaller than zero, the second focal length is larger than zero, and each composite focal length of each of the plurality of first lens groups and the second lens group is larger than the second focal length, wherein the plurality of light emitting elements is provided on a first surface of a substrate, and generated light is emitted through the substrate from a second surface opposite to the first surface, and each of the plurality of first lens groups is arranged at a position corresponding to each of the plurality of light emitting elements on a one-to-one basis on the second surface of the substrate, and wherein each of the plurality of first lens groups is a concave portion provided in the second surface of the substrate.

8. The light source device according to claim 7, further comprising an antireflection film that is provided on an inner surface of the concave portion and prevents reflection of light from the first surface.

9. The light source device according to claim 7, further comprising a low refractive index film that is provided in the concave portion and has a refractive index lower than a refractive index of the substrate, wherein a region other than the concave portion in the substrate and a surface of the low refractive index film form a plane.

10. The light source device according to claim 7, further comprising one or more layers of functional films that are provided in at least a part of a non-lens region excluding a region of each of the plurality of first lens groups on the second surface of the substrate.

11. The light source device according to claim 10, wherein the functional film is provided by laminating a plurality of functional films.

12. The light source device according to claim 11, wherein the functional film has a structure in which different numbers of the functional films are laminated depending on positions on the substrate.

13. The light source device according to claim 10, wherein the functional film includes an alignment mark.

14. The light source device according to claim 10, wherein the functional film is provided in a region other than a scribe region used when the substrate is diced into individual pieces on the second surface of the substrate.

15. The light source device according to claim 7, wherein the concave portion is positioned in a region corresponding to each of the plurality of light emitting elements on a one-to-one basis on the second surface of the substrate.

16. The light source device according to claim 15, wherein the concave portion is a groove formed using dishing generated by chemical mechanical polishing.

17. The light source device according to claim 5, wherein the plurality of first lens groups includes an integrated first optical element.

18. The light source device according to claim 5, wherein at least one optical surface of the plurality of first lens groups has an aspherical shape.

19. The light source device according to claim 5, wherein at least one optical surface of the second lens group has a free-form surface shape.

20. The light source device according to claim 5, wherein the plurality of light emitting elements is provided on a first surface of a substrate, and generated light is emitted through the substrate from a second surface opposite to the first surface, and each of the plurality of first lens groups is arranged at a position corresponding to each of the plurality of light emitting elements on a one-to-one basis on the second surface of the substrate.

* * * * *